(12) United States Patent
Shikatani et al.

(10) Patent No.: US 10,126,417 B2
(45) Date of Patent: Nov. 13, 2018

(54) RADAR APPARATUS AND OBJECT DETECTING METHOD

(71) Applicant: Panasonic Corporation, Osaka (JP)

(72) Inventors: Maiko Shikatani, Kanagawa (JP);
Asako Hamada, Kanagawa (JP);
Takaaki Kishigami, Tokyo (JP)

(73) Assignee: Panasonic Corporation, Osaka (JP)

( * ) Notice: Subject to any disclaimer, the term of this patent is extended or adjusted under 35 U.S.C. 154(b) by 277 days.

(21) Appl. No.: 14/647,060

(22) PCT Filed: Jun. 19, 2014

(86) PCT No.: PCT/JP2014/003314
§ 371 (c)(1),
(2) Date: May 22, 2015

(87) PCT Pub. No.: WO2015/045224
PCT Pub. Date: Apr. 2, 2015

(65) Prior Publication Data
US 2015/0309167 A1     Oct. 29, 2015

(30) Foreign Application Priority Data

Sep. 27, 2013  (JP) ................................ 2013-202228

(51) Int. Cl.
*G01S 13/04* (2006.01)
*G01S 13/56* (2006.01)
(Continued)

(52) U.S. Cl.
CPC .............. *G01S 13/04* (2013.01); *G01S 7/285* (2013.01); *G01S 7/288* (2013.01); *G01S 13/18* (2013.01);
(Continued)

(58) Field of Classification Search
CPC .......... G01S 13/04; G01S 7/285; G01S 7/288; G01S 13/18; G01S 13/26; G01S 13/42;
(Continued)

(56) References Cited

U.S. PATENT DOCUMENTS 3,154,778 A * 10/1964 Kock .................... G01S 13/003
342/139
4,258,341 A * 3/1981 Snyder .................... H04B 1/12
333/109
(Continued)

FOREIGN PATENT DOCUMENTS

GB     1 388 165 A       3/1975
GB     1388165 A   *  3/1975   ........... G01S 13/526
(Continued)

OTHER PUBLICATIONS

Introduction to Radar Systems, Chapter 4, Second Edition, Merill I. Skolink, McGraw-Hill Book Company, Nov. 30, 2009.*
(Continued)

*Primary Examiner* — Peter M Bythrow
*Assistant Examiner* — Nuzhat Pervin
(74) *Attorney, Agent, or Firm* — Seed IP Law Group LLP

(57) ABSTRACT

A radar transmitter (Tx) transmits a radio-frequency radar transmission signal from a transmission antenna (Tx_ant1). An antenna branch processor (D1) receives a reflection signal produced by reflection, by an object, of the radar transmission signal by a reception antenna (Rx-ant1) and calculates correlation between the reflection signal and the radar transmission signal. An object detection processor (10) detects presence or absence of an object by using, based on (Tp+1) outputs of the antenna branch processor (D1), where Tp is an integer, amplitude differences between an amplitude
(Continued)

of a (Tp+1)-th output of the antenna branch processor (D1) and amplitudes of first to Tp-th outputs of the antenna branch processor (D1).

6 Claims, 25 Drawing Sheets

(51) Int. Cl.
| | | |
|---|---|---|
| G01S 7/285 | (2006.01) | |
| G01S 7/288 | (2006.01) | |
| G01S 13/42 | (2006.01) | |
| G01S 13/18 | (2006.01) | |
| G01S 13/26 | (2006.01) | |
| G01S 13/58 | (2006.01) | |
| G01S 13/72 | (2006.01) | |
| G01S 13/62 | (2006.01) | |

(52) U.S. Cl.
CPC .............. *G01S 13/26* (2013.01); *G01S 13/42* (2013.01); *G01S 13/56* (2013.01); *G01S 13/582* (2013.01); *G01S 13/723* (2013.01); *G01S 13/589* (2013.01); *G01S 13/62* (2013.01); *G01S 2007/2886* (2013.01)

(58) Field of Classification Search
CPC ...... G01S 13/56; G01S 13/582; G01S 13/723; G01S 13/589; G01S 13/62; G01S 2007/2886; G01S 13/34; G01S 13/36; G01S 13/93; G01S 13/931; G01S 13/4445; G01S 13/4454; G01S 13/4463; G01S 13/003; G01S 7/032; G01S 7/292; G01S 13/91; G01S 7/023; G01S 7/02; G01S 13/726; G01S 7/03; G01S 13/526; H01P 5/12; G01H 3/08
USPC .......................................................... 342/27
See application file for complete search history.

(56) References Cited

U.S. PATENT DOCUMENTS

| | | | | | |
|---|---|---|---|---|---|
| 4,837,574 | A * | 6/1989 | Hill | ........................ | G01S 13/04 342/27 |
| 5,828,997 | A * | 10/1998 | Durlach | ................... | G01H 3/08 704/233 |
| 6,275,180 | B1 * | 8/2001 | Dean | ....................... | G01S 7/032 342/128 |
| 7,777,671 | B2 * | 8/2010 | Schnitzer | ................ | G01S 7/292 342/193 |
| 9,201,141 | B1 * | 12/2015 | Manickann | ........... | G01S 13/726 |
| 9,389,310 | B2 * | 7/2016 | Osterfeld | .................. | G01S 7/03 |
| 2007/0013577 | A1 * | 1/2007 | Schnitzer | ................ | G01S 7/292 342/90 |
| 2013/0113653 | A1 * | 5/2013 | Kishigami | .............. | G01S 7/285 342/189 |
| 2014/0085127 | A1 * | 3/2014 | Kishigami | .............. | G01S 13/91 342/108 |
| 2014/0240168 | A1 * | 8/2014 | Osterfeld | .................. | G01S 7/03 342/118 |
| 2014/0327567 | A1 | 11/2014 | Kishigami et al. | | |
| 2015/0061915 | A1 * | 3/2015 | Kishigami | .............. | G01S 7/023 342/27 |
| 2015/0253415 | A1 * | 9/2015 | Mazzaro | .................. | G01S 7/02 342/27 |

FOREIGN PATENT DOCUMENTS

| | | | | |
|---|---|---|---|---|
| GB | 1388165 A | * | 3/1975 | .......... G01S 13/526 |
| JP | 2006194716 A | | 7/2006 | |
| JP | 2007327814 A | | 12/2007 | |
| JP | 2008070258 A | | 3/2008 | |
| JP | 2010078367 A | | 4/2010 | |
| JP | 2010-127645 A | | 6/2010 | |
| JP | 2011214972 A | | 10/2011 | |
| JP | 2012-137432 A | | 7/2012 | |
| WO | 2013/080570 A1 | | 6/2013 | |
| WO | 2013/140747 A1 | | 9/2013 | |

OTHER PUBLICATIONS

Notification of Reasons for Refusal, dated Apr. 4, 2017, for the related Japanese Patent Application No. 2013-202228, 6 pages (with English translation).

Skolnik, Merrill I., "Introduction to Radar Systems," Second Edition, McGraw-Hill Book Company, Nov. 30, 2009, 52 pages.

Extended European Search Report dated Jul. 25, 2016, for corresponding EP Application No. 14847550.2-1812 / 3051308, 10 pages.

International Search Report dated Sep. 22, 2014, for corresponding International Application No. PCT/JP2014/003314, 2 pages.

\* cited by examiner

RADAR APPARATUS AND OBJECT DETECTING METHOD

TECHNICAL FIELD

The present disclosure relates to a radar apparatus and an object detecting method for detecting a target object.

BACKGROUND ART

Among related art techniques relating to methods for detecting a target (object) using a radar apparatus is the object detecting device that is disclosed in Patent Literature 1.

The object detecting device disclosed in Patent Literature 1 receives, with a reception antenna, reflection waves that are produced by reflection of radar pulses transmitted from a transmission antenna by a target (e.g., an object existing in a detection range of the radar pulses). The object detecting device detects a moving object (e.g., pedestrian or vehicle) by analyzing reflection waves (reception signal) received in a first period.

The object detecting device detects a small-movement object (e.g., a sitting person or a standing person who is moving slowly) by using a second period that is longer than the first period, that is, a larger number of data in analyzing received reflection waves (reception signal).

CITATION LIST

Patent Literature

Patent Literature 1: JP-A-2012-137432

SUMMARY OF INVENTION

Technical Problem

However, in the above-described Patent Literature 1, the measurement time that is taken by processing for detecting a small-movement object is longer than that taken by processing for detecting a moving object. As a result, it takes long time to perform each set of processing for detecting a moving object and processing for detecting a small-movement object; it is difficult to perform such measurements in a short time.

To solve the above-described problem of the related art, the present disclosure provides a radar apparatus and an object detecting method that make it possible to suppress lowering of object detection accuracy and to detect an object in a shorter measurement time.

The present disclosure provides a radar apparatus including: a radar transmitter which transmits, from a transmission antenna, a radar transmission signal having radio-frequency repetitive waveforms; an antenna branch processor which receives, by a reception antenna, a signal including repetitive waveforms of a reflection signal produced by reflection, by an object, of the radar transmission signal, and samples the signal including the repetitive waveforms of the reflection signal for each predetermined discrete time; and an object detection processor which detects presence or absence of a target object using amplitude differences in respective (Tp+1) sampling points by sampling on the signal including the repetitive waveforms of the reflection signal, where Tp is an integer.

The present disclosure provides an object detection method in a radar apparatus, the object detection method including the steps of: transmitting, from a transmission antenna, a radar transmission signal having radio-frequency repetitive waveforms; receiving, by a reception antenna, a signal including repetitive waveforms of a reflection signal produced by reflection, by an object, of the radar transmission signal; sampling the signal including the repetitive waveforms of the reflection signal for each predetermined discrete time; and detecting presence or absence of a target object using amplitude differences in respective (Tp+1) sampling points by sampling on the signal including the repetitive waveforms of the reflection signal, where Tp is an integer.

Advantageous Effects of Invention

The present disclosure makes it possible to suppress lowering of object detection accuracy and to detect an object in a shorter measurement time.

DESCRIPTION OF EMBODIMENT (Background of Radar Apparatuses and Object Detecting Methods According to Embodiments of the Present Disclosure)

Before describing radar apparatuses and object detecting methods according to respective embodiments of the present disclosure, their background will be described first.

In the object detection processing employed in the above-described Patent Literature 1, different frequency analyses are performed for a moving object and a small-movement object. For example, in the processing for detecting a small-movement object, it is necessary to perform a frequency analysis at a higher resolution because the frequency used for measurement of a movement of a small-movement object is lower than that used for measurement of a movement of a moving object. Therefore, the processing for detecting a small-movement object requires a longer measurement time than the processing for detecting a moving object.

For example, in Patent Literature 1, the cycle of a body shake of a sitting person or a standing person (small-movement object) is assumed to be about 3 seconds. In this case, a frequency resolution of about 0.3 Hz ($=\frac{1}{3}(1/s)$) is necessary theoretically. However, to obtain sufficient separation performance in the processing for detecting a small-movement object, two times as high a frequency resolution is necessary. In view of this, in Patent Literature 1, a frequency analysis is performed using a measurement time of 6 seconds for a small-movement object whose movement cycle is assumed to be about 3 seconds.

As described above, in Patent Literature 1, the processing for detecting a small-movement object requires a measurement time that is at least two times an assumed movement cycle of a small-movement object.

Furthermore, in the object detecting device disclosed in Patent Literature 1, a judgment threshold value for object detection is set at a fixed value irrespective of the environment of a detection target object in the processing for detecting a moving object and a small-movement object. For a certain environment of an object, using the fixed threshold value uniformly may cause lowering of detection accuracy.

In view of the above, each embodiment to be described below is directed to an example a radar apparatus and an object detecting method that make it possible to suppress lowering of object detection accuracy and to detect an object in a shorter measurement time.

Radar apparatuses and object detecting methods according to respective embodiments of the present disclosure will be hereinafter described with reference to the drawings. In the embodiments, the same constituent elements will be given the same reference symbols and descriptions therefor will be simplified or omitted.

(Embodiment 1)

Figure 1:
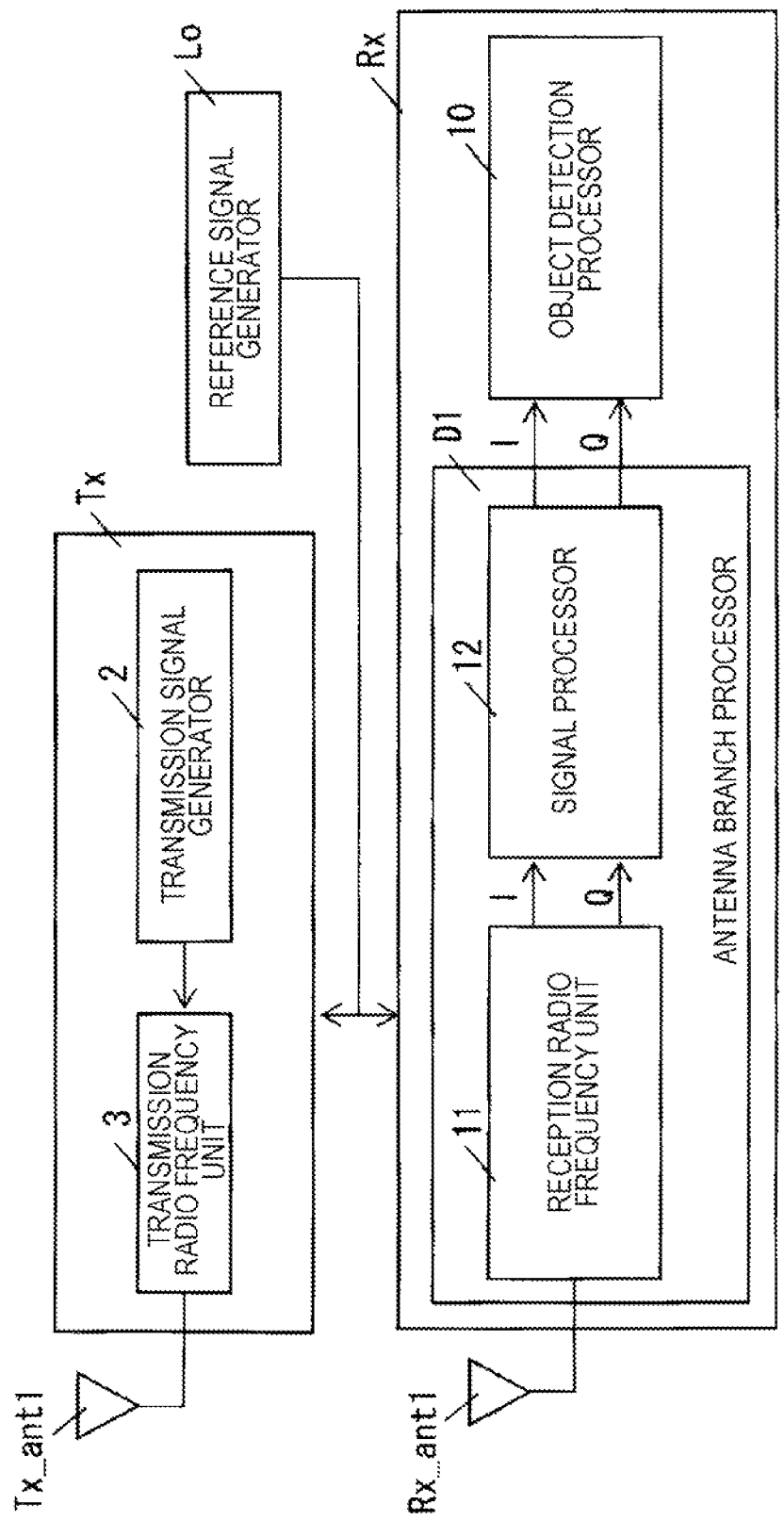
FIG. 1 is a block diagram showing, in a simplified manner, the internal configuration of a radar apparatus according to a first embodiment.
Figure 2:
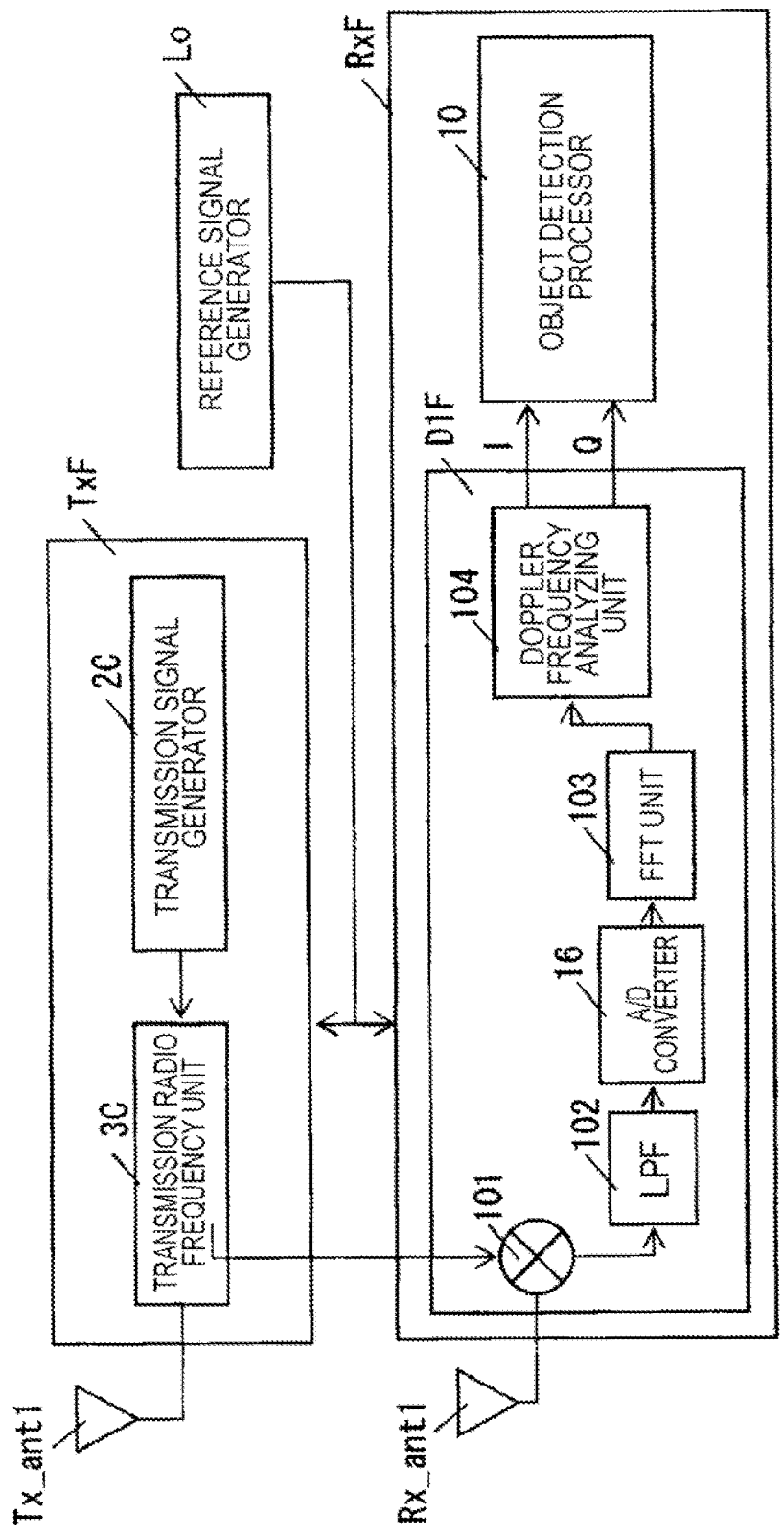
FIG. 2 is a block diagram showing, in a simplified manner, the internal configuration of a radar apparatus according to the first embodiment in which a radar transmitter transmits a frequency-modulated radar transmission signal.
Figure 3:
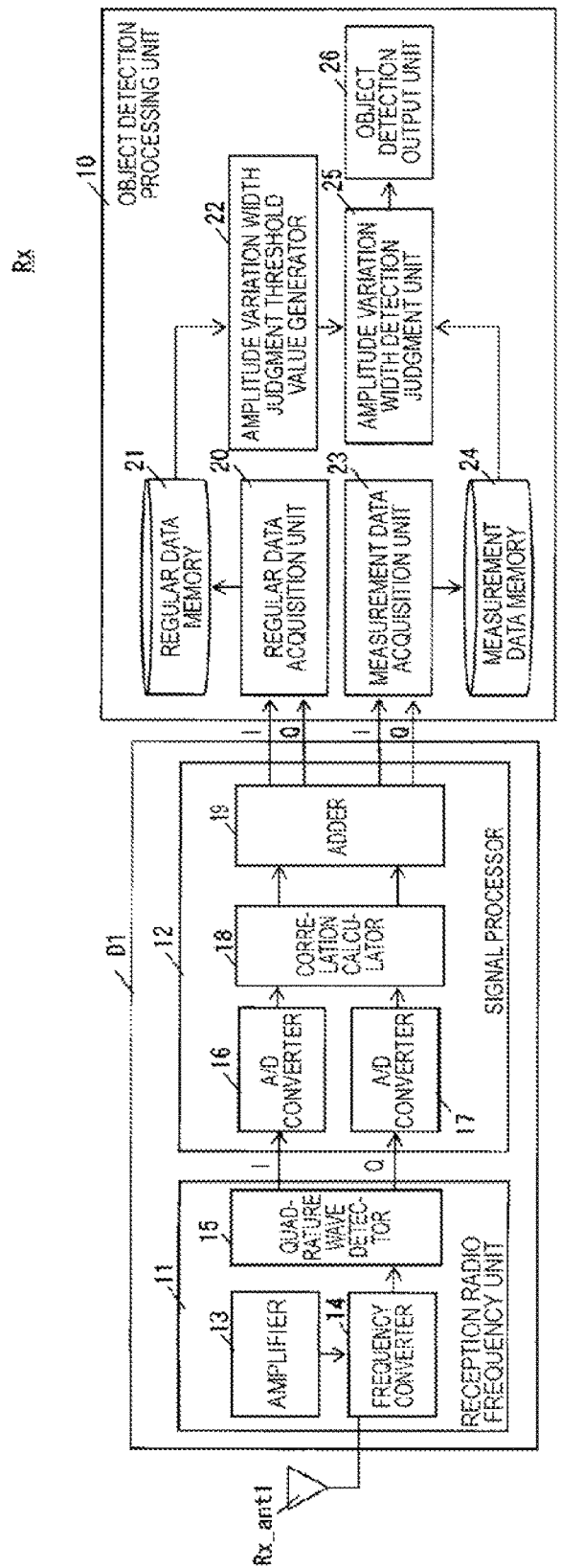
FIG. 3 is a block diagram showing, in detail, the internal configuration of a radar receiver of the radar apparatus according to the first embodiment.

The configuration and operation of a radar apparatus 1 according to a first embodiment will be described with reference to FIGS. 1 to 12. FIG. 1 is a block diagram showing, in a simplified manner, the internal configuration of the radar apparatus 1 according to the first embodiment. FIG. 2 is a block diagram showing, in a simplified manner, the internal configuration of a radar apparatus 1F according to the first embodiment in which a radar transmitter TxF transmits a frequency-modulated radar transmission signal. FIG. 3 is a block diagram showing, in detail, the internal configuration of a radar receiver Rx of the radar apparatus 1 according to the first embodiment.

The radar apparatus 1 shown in FIG. 1 transmits, from a transmission antenna Tx_ant1, a radio-frequency radar transmission signal generated by a radar transmitter Tx. The radar apparatus 1 receives, by a reception antenna Rx_ant1, a reflection signal that is a radar transmission signal as reflected by an object (target; not shown). The radar apparatus 1 detects presence or absence of an object (target) and its position by performing signal processing on the reflection signal received by the reception antenna.

An object (target) is a target of detection of the radar apparatus 1 and includes a person and a vehicle, for example. This also applies to the following embodiments.

First, the configurations of individual units of the radar apparatus 1 will be described in a simplified manner with reference to FIG. 1.

The radar apparatus 1 shown in FIG. 1 includes a reference signal generator Lo, the radar transmitter Tx, and the radar receiver Rx.

The reference signal generator Lo is connected to the radar transmitter Tx and the radar receiver Rx. The reference signal generator Lo supplies a common reference signal to the radar transmitter Tx and the radar receiver Rx and thereby causes them to perform processing in a synchronized manner.

The radar transmitter Tx is equipped with a transmission signal generator 2 and a transmission radio (RF) unit 3 to which the transmission antenna Tx_ant1 is connected.

The transmission signal generator 2 generates a transmission reference clock signal by multiplying the frequency of the reference signal generated by the reference signal generator Lo by a predetermined factor. The transmission signal generator 2 operates on the transmission reference clock signal.

A baseband transmission signal generated by the transmission signal generator 2 is modulated using No samples of the transmission reference clock signal per one code of a code sequence $C_n$ having a code length L in, for example, a transmission interval Tw of a transmission cycle Tr for a radar transmission signal, where n varies from 1 to L ($>0$) and L (integer) is the code length of the code sequence $C_n$.

Having a sampling rate (No×L)/Tw, the transmission signal generator 2 performs modulation using Nr (=No×L) samples in the transmission interval Tw(s) of a transmission cycle Tr. In a signal-less interval (Tr−Tw) (s) of a transmission cycle Tr, the transmission signal generator 2 performs modulation using Nu samples.

The transmission signal generator 2 periodically generates baseband transmission signals r(k, M) of Formula (1) by modulating the code sequence $C_n$ having the code length L. Symbol j means the imaginary unit that satisfies $j^2=-1$. Time k is a discrete time (range bin) having, as a reference (k=1), a start time of a transmission cycle Tr, takes a discrete value from 1 to (Nr+Nu), and represents generation timing of a transmission signal.

M is an ordinal number representing a transmission cycle Tr of a radar transmission signal. The transmission signal r(k, M) means a transmission signal at the discrete time k in an M-th transmission cycle Tr and is an addition result of an in-phase signal component I(k, m) and a quadrate signal component Q(k, M) multiplied by the imaginary unit j (see Formula (1)).

[Formula 1]

$$r(k,M)=I(k,M)+jQ(k,M) \quad (1)$$

The transmission radio frequency unit 3 generates a transmission reference signal in a carrier frequency band by multiplying the frequency of the reference signal generated by the reference signal generator Lo by a predetermined factor. The transmission signal generator 2 and the transmission radio frequency unit 3 may generate frequency-multiplied signals through multiplication by either the same factor or different factors. The transmission radio frequency unit 3 operates on the transmission reference signal.

The transmission antenna Tx_ant1 radiates the radar transmission signal generated by the transmission radio frequency unit 3 to the space. The radar transmission signal is transmitted in the transmission interval Tw of a transmission cycle Tr and is not transmitted in the non-transmission interval (Tr−Tw).

The common reference signal generated by the reference signal generator Lo is input to the transmission radio frequency unit 3 and a reception radio (RF) unit 11 of an antenna branch processor D1. The transmission radio frequency unit 3 operates on the transmission reference signal obtained by multiplying the frequency of the reference signal by the predetermined factor. The reception radio frequency unit 11 of the antenna branch processor D1 operates on a reception reference signal obtained by multiplying the frequency of the reference signal by the same predetermined factor as it is multiplied in the transmission radio frequency unit 3. Therefore, the transmission radio frequency unit 3 and the reception radio frequency unit 11 of the antenna branch processor D1 perform processing in a synchronized manner.

The radar receiver Rx is equipped with the antenna branch processor D1 to which a single reception antenna Rx_ant1 is connected and an object detection processor 10.

The antenna branch processor D1 is equipped with the reception radio frequency unit 11 to which the reception antenna Rx_ant1 is connected and a signal processor 12. The antenna branch processor D1 samples each of repetitive waveforms of a reflection signal for each predetermined discrete time (range bin) k and calculates IQ data (e.g., amplitude or power value; hereinafter simply referred to as "data") of the sampled reflection signal.

The object detection processor 10 determines, for each time predetermined data acquisition timing arrives, an amplitude variation width to serve as a judgment threshold value for judgment of presence or absence of a person using amplitude variation widths of acquired data, and successively judges presence or absence of a person based on amplitude variation width differences of acquired data using the determined amplitude variation width (judgment threshold value).

A frequency-modulated radar transmission signal (e.g., chirp pulses) will be described with reference to FIG. 2.

A transmission signal generator 2C in a radar transmitter TxF generates a saw-tooth modulation subject signal for each transmission cycle Tc, generates a radar transmission signal by frequency-modulating the modulation subject signals, and outputs the radar transmission signal to a transmission radio frequency unit 3C. The transmission radio frequency unit 3C outputs part of the radar transmission signal generated by the radar transmitter TxF to a mixer 101 of a radar receiver RxF and transmits the remaining part of the radar transmission signal from a transmission antenna Tx_ant1.

An antenna branch processor D1F is equipped with the mixer 101 to which a single reception antenna Rx_ant1 is connected, an LPF 102 which is an example filter unit, an A/D converter 16, an FFT unit 103, and a Doppler frequency analyzing unit 104.

The mixer 101, which is an example mixer unit, mixes a reception wave signal received by the reception antenna Rx_ant1 with a radar transmission signal that is output from the transmission radio frequency unit 3C, and causes a mixing result signal to pass through the LPF 102. As a result, a signal of a beat frequency corresponding to a reception delay time of the reflection signal is output from the LPF 102 to the A/D converter 16.

The FFT unit 103 performs FFT processing on Ndata discrete sample values of a beat frequency signal obtained from the A/D converter 16 in each transmission cycle Tc, whereby a frequency spectral response $CI\_c(f_b, m)$ for each beat frequency corresponding to a reception delay time of the reflection signal is obtained. Parameter m is an ordinal number representing a transmission cycle Tc, and $f_b$ is a frequency bin number of FFT (fast Fourier transform) performed by the FFT unit 103 and varies from 1 to Ndata/2.

The Doppler frequency analyzing unit 104 performs coherent addition in units of frequency spectral responses CI_c($f_b$, Nc(w−1)+1) to CI_c($f_b$, Nc×w) which are Nc outputs of the FFT unit 103 obtained for the respective beat frequencies $f_b$ (see Formula (3)) using, as correction coefficients, phase variations θ($f_s$) corresponding to 2Nf different Doppler frequency components $f_s\Delta\theta$ (see Formula (2)). The Doppler frequency analyzing unit 104 outputs a result of the Nc times of coherent addition to an object detection processor 10.

[Formula 2]

$$\theta(f_s) = 2\pi f_s(Tc)\Delta\theta \quad (2)$$

[Formula 3]

$$FT\_CI^{Nant}(f_b, f_s, w) = \sum_{q=1}^{Nc} CI\_c(f_b, Nc(w-1)+q)\exp[-jq\theta(f_s)] \quad (3)$$

$$= \sum_{q=1}^{Nc} CI\_c(f_b, Nc(w-1)+q)\exp[-jq2\pi f_s Tc]$$

In Formula (3), $FT\_CI^{Nant}(f_b, f_s, w)$ represents a w-th output of the Doppler frequency analyzing unit 104, that is, a coherent addition result corresponding to a Doppler frequency component $f_s\Delta\theta$ of each beat frequency of an Nant-th antenna branch processor. Parameter k varies from 1 to (Nr+Nu)×Ns/No, and fs takes values −Nf+1, ..., 0, ..., Nf. Symbol j is the imaginary unit and $\Delta\theta$ is a phase rotation unit (predetermined value).

Next, the configurations and operations of the individual units of the radar receiver Rx shown in FIG. 1 will be described in detail with reference to FIG. 3.

The reception radio frequency unit 11 of the antenna branch processor D1 is equipped with an amplifier 13, a frequency converter 14, and a quadrature wave detector 15. The signal processor 12 of the antenna branch processor D1 is equipped with two A/D converters 16 and 17, a correlation calculator 18, and an adder 19. The radar receiver Rx performs calculations periodically using each transmission cycles Tr of a radar transmission signal as a signal processing interval of the signal processor 12 of the antenna branch processor D1.

The reception antenna Rx_ant1 receives a reflection signal that is produced by reflection, by an object, of a radar transmission signal transmitted from the radar transmitter Tx. A radio-frequency reception signal received by the reception antenna Rx_ant1 is input to the reception radio frequency unit 11.

Like the transmission radio frequency unit 3, the reception radio frequency unit 11 generates a reception reference signal in a carrier frequency band by multiplying the reference signal generated by the reference signal generator Lo by a predetermined factor. The individual units of the reception radio frequency unit 11 operate on the reception reference signal.

The amplifier 13 receives a radar reception signal received by the reception antenna Rx_ant1, amplifies its signal level into a predetermined signal level, and outputs a resulting signal to the frequency converter 14.

The frequency converter 14 generates a baseband reception signal by down-converting the radio-frequency radar reception signal as amplified by the amplifier 13 into a baseband signal using the reception reference signal, and outputs the baseband reception signal to the quadrature wave detector 15.

The quadrature wave detector 15 generates a reception signal that comprises an in-phase signal and a quadrate signal by quadrature-detecting the baseband reception signal generated by the frequency converter 14.

The quadrature wave detector 15 outputs the in-phase signal and the quadrate signal of the baseband reception signal to the A/D converters 16 and 17, respectively.

The A/D converter 16 converts the in-phase signal (analog data) generated by the quadrature wave detector 15 into digital data by sampling the baseband in-phase signal at each discrete time k, and outputs the in-phase signal component (digital data) to the correlation calculator 18.

The A/D converter 16 samples Ns times per one pulse width (pulse time) Tps (=Tw/L) of a transmission signal r(k, M) generated by the radar transmitter Tx. That is, the sampling rate of the A/D converter 16 is (Ns×L)/Tw=Ns/Tps; the oversampling number per pulse is equal to Ns.

The A/D converter 17 operates for the baseband quadrate signal generated by the quadrature wave detector 15 in the same manner as the A/D converter 16, and outputs a quadrate signal component (digital data) to the correlation calculator 18. The sampling rate of the A/D converter 17 is Ns/Tps; the oversampling number per pulse is equal to Ns.

In the following, a baseband reception signal as an output of the A/D converters 16 and 17 at a discrete time k in an M-th transmission cycle Tr is represented by a complex signal x(k, M) (see Formula (4)) using the in-phase signal component Ir(k, M) and the quadrate signal component Qr(k, M).

[Formula 4]

$$x(k,M)=Ir(k,M)+jQr(k,M) \quad (4)$$

The correlation calculator 18 periodically generates transmission codes $C_n$ having the code length L at discrete times k based on a reception reference clock signal obtained by multiplying the reference signal generated by the reference signal generator Lo by a predetermined factor, where n is an integer that varies from 1 to L and L is the code length of the code sequence $C_n$.

The correlation calculator 18 calculates a sliding correlation value AC(k, M) between discrete sample values Ir(k, M) and Qr(k, M) that are outputs of the A/D converters 16 and 17, that is, discrete sample values x(k, M) as a reception signal, and the transmission code $C_n$. AC(k, M) represents a sliding correlation value at a discrete time k in an M-th transmission cycle.

More specifically, the correlation calculator 18 calculates sliding correlation values AC(k, M) for discrete times k=1 to Ns(Nr+Nu)/No according to Formula (5). The correlation calculator 18 outputs, to the adder 19, the sliding correlation values AC(k, M) calculated for the discrete times k according to Formula (5). Symbol "*" (asterisk) in Formula (5) is the complex conjugate operator.

[Formula 5]

$$AC(k, M) = \sum_{n=1}^{L} x(k+Ns(n-1), M)C_n^* \quad (5)$$

The correlation calculator 18 may restrict the discrete time (range bin) k range that indicates a measurement range, that is, a calculation range of a sliding correlation value AC(k, M), according to a range of presence of an object as a measurement target of the radar apparatus 1. With this measure, in the radar apparatus 1, the amount of calculation of the correlation calculator 18 can be reduced. And the reduction in the amount of calculation of the signal processor 12 enables reduction in the power consumption of the radar receiver Rx.

In calculating sliding correlation values AC(k, m) in a discrete time k range Ns(L+1) to Ns(Nr+Nu)No−NsL, the radar apparatus 1 may exclude the transmission interval Tw of the transmission cycle Tr of a radar transmission signal from the measurement period.

In this case, even if a radar transmission signal goes around to enter the radar receiver Rx directly, the radar apparatus 1 can perform a measurement without being affected by the signal going around. Where the measurement range (i.e., discrete time k range) is restricted, the adder 19 and the individual units of the object detection processor 10 also operate in the same restricted measurement range. Therefore, the processing amounts of processing of those units can be reduced and the power consumption of the radar receiver Rx can be reduced further.

The adder 19 performs in-phase addition on the sliding correlation values AC(k, M) calculated by the correlation calculator 18 for each discrete time k of the M-th transmission cycle Tr over a period (Np×Tr) of a predetermined number Np of transmission cycles Ir.

More specifically, the adder 19 calculates an addition value CI(k, m) of an m-th set of Np transmission cycles Tr according to Formula (6) for each discrete time k by adding together, for each discrete time k, sliding correlation values AC(k, NO calculated by the correlation calculator 18 over a period (Np×Tr) of a predetermined number Np of transmission cycles Tr. Np is a predetermined value indicating the number of times of addition of the adder 19. Parameter m is an ordinal number representing an output of Np times of in-phase addition (coherent addition) performed by the adder 19. For example, m=1 means a first coherent addition output of the adder 19. The adder 19 outputs the coherent addition values CI(k, m) as sampling point output values to the object detection processor 10.

[Formula 6]

$$CI(k, m) = \sum_{g=1}^{Np} AC(k, Np(m-1)+g) = I_{CI}(k, m) jQ_{CI}(k, m) \quad (6)$$

By adding together Np sliding correlation values AC(k, M), the adder 19 can suppress noise components contained in a reflection signal and thereby improve the reception quality (SNR: signal-to-noise ratio) of the reception wave signal in a discrete time k range where the reflection signal coming from an object exhibits high correlation. Furthermore, capable of improving the reception quality of a reception wave signal, the adder 19 can increase the accuracy of estimation of an incoming direction of a reflection signal reflected from an object.

To obtain an ideal addition gain, it is necessary that phase components of sliding correlation values AC(k, M) be within a certain narrow range in the addition interval of Np sliding correlation values AC(k, M). Since movement of an object (target) causes a phase variation, it is preferable that the number Np of times of addition be set based on an assumed maximum movement speed of an object.

As the assumed maximum movement speed of an object increases, the variation amount of a Doppler frequency included in a reflection signal reflected from the object becomes large and the discrete time interval having a large correlation value becomes shorter, resulting in a smaller number Np of times of addition. For example, when the discrete time interval is halved, the number Np of times of addition is also halved, which lowers the gain enhancement effect of the in-phase addition of the adder 19.

The object detection processor 10 is equipped with a regular data acquisition unit 20, a regular data memory 21, an amplitude variation width judgment threshold value generator 22, a measurement data acquisition unit 23, a measurement data memory 24, an amplitude variation width detection judgment unit 25, and an object detection output unit 26.

The object detection processor 10 determines, for each time predetermined data acquisition timing arrives, an amplitude variation width of a power value to serve as a judgment threshold value for judgment of presence or absence of a person using an amplitude variation width of acquired data, and successively judges presence or absence of a person using the determined amplitude variation width or power value (judgment threshold value).

The object detection processor 10 receives an addition value CI(k, m) calculated in the antenna branch processor D1 for each discrete time k (hereinafter referred to as a "range bin k") over an m-th set of Np transmission cycles Tr (see Formula (6)). The range bin k means a minimum processor for calculation of a distance from the radar apparatus 1 to an object.

First, a description will be made of processing that is performed in the object detection processor 10 to determine an amplitude variation width of a power value to serve as a judgment threshold value for judgment of presence or absence of a person using acquired data for each time predetermined data acquisition timing arrives.

For each time predetermined data acquisition timing arrives, the regular data acquisition unit 20 acquires To addition values CI(k, m) from the antenna branch processor D1. The total number of data, To, is larger than a minimum number Tp of data that are necessary for performing object detection processing. That is, the regular data acquisition unit 20 acquires addition values CI(k, m) that are output values at To sampling points.

For example, it is assumed that data acquisition timing arrives once per day. However, the disclosure is not limited to such a case. For example, where the radar apparatus 1 is installed for an infrastructure purpose, the frequency of occurrence of data acquisition timing may be varied as appropriate according to the timing of change of the situation of the surroundings of the installation location; that is, the frequency may be once per week or plural times per day. "Once per day" means, for example, that To data are acquired in several seconds starting from noon.

The data acquisition timing and parameters To and Tp may be changed as appropriate in response to an input manipulation of a user of the radar apparatus 1 and stored in the regular data acquisition unit 20. Tp, which is the minimum number of data that are necessary for the object detection processor 10 to judge (detect) presence or absence of an object (target), is set based on a variation cycle $T_{human}$ (described later). When the variation cycle $T_{human}$ is equal to 1 second and one sample is acquired in 0.1 seconds, Tp is set at 1/0.1=10.

The regular data memory 21 stores data of a total of To addition values (hereinafter referred to as "regular addition values") CI(k, m) acquired by the regular data acquisition unit 20. Parameter m, which indicates timing of acquisition of a regular addition value CI(k, m), that is, timing of passage of m×Np×Tr (Tr: transmission cycle), is an integer that varies in a range of To×(Q−1)+1 to To×Q, where Q is an integer that is larger than or equal to 1.

Now, to simplify the description of the operations of the regular data acquisition unit 20, the regular data memory 21, and the amplitude variation width judgment threshold value generator 22, m of an example case of Q=1 is replaced by an integer Co and a description will be made using Co (in this case, m varies in a range of 1 to To). However, the following description of the operations (hereinafter referred to as "regular processing") of the regular data acquisition unit 20, the regular data memory 21, and the amplitude variation width judgment threshold value generator 22 (Co varies from 1 to To) is likewise applicable to the case that the integer Q is larger than 1 in which the integer m varies in the range of To×(Q−1)+1 to To×Q.

The amplitude variation width judgment threshold value generator 22, which is an example of a first judgment threshold value generator, calculates, for each range bin k, an amplitude Am(k, Co) of a regular addition value CI(k, Co) that is stored in the regular data memory 21 according to Formula (7). Co is an integer that satisfies a relationship 1≤Co≤To.

[Formula 7]

$$Am(k,Co) = \sqrt{I_{CI}(k,Co)^2 + Q_{CI}(k,Co)^2} \quad (7)$$

The amplitude variation width judgment threshold value generator 22 calculates, according to Formulae (8), a total of Tp amplitude differences between a Cu-th-calculated amplitude Am(k, Cu) among a total of Co amplitudes Am(k, Co) calculated according to Formula (7) and latest Tp amplitudes Am(k, Cu−Tp) to Am(k, Cu−1) that have been calculated before the calculation of the amplitude Am(k, Cu).

Figure 4:
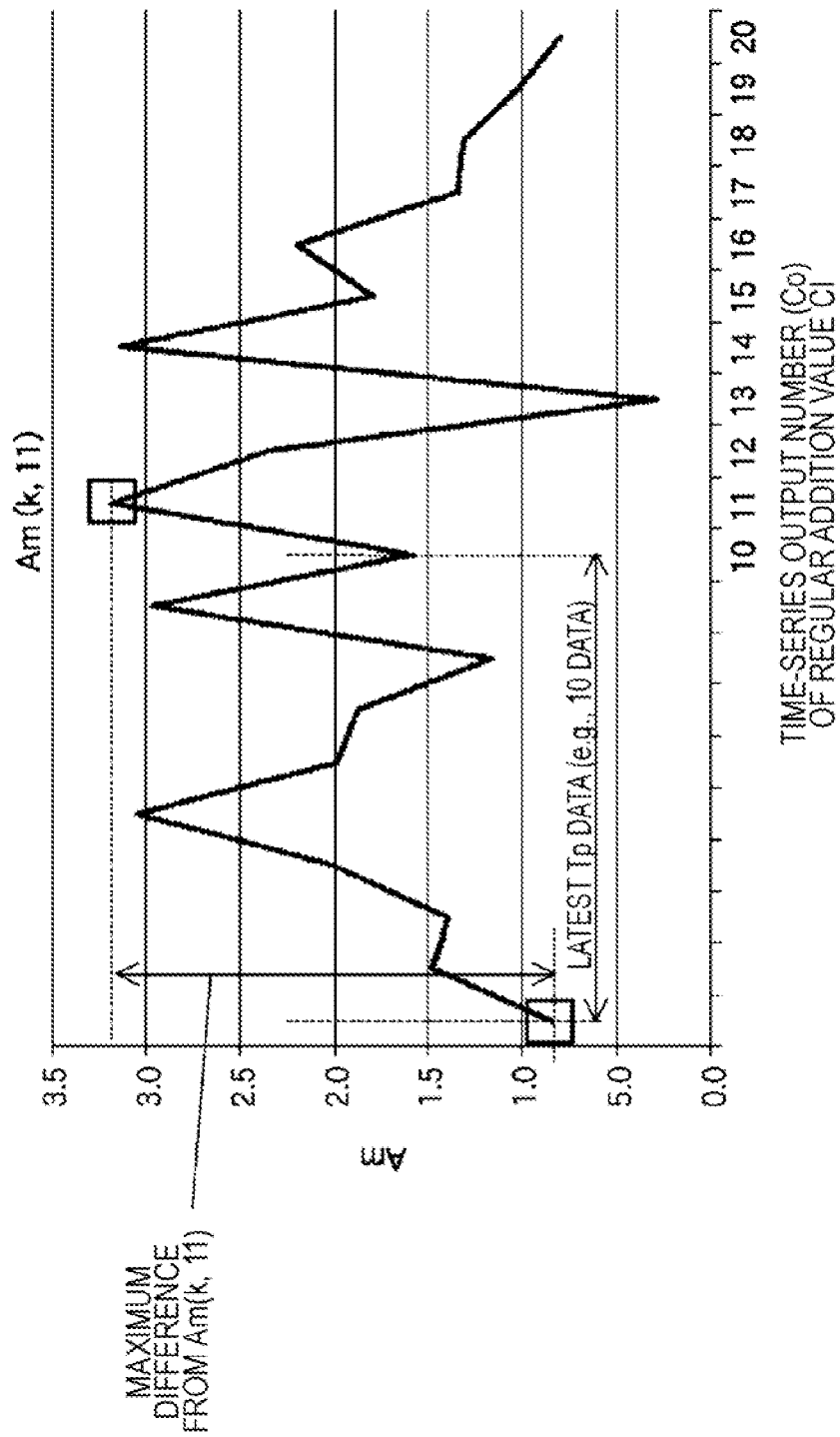
FIG. 4 is a graph showing a relationship between the time-series output number of a regular addition value CI and the amplitude of the regular addition value CI.
Figure 5:
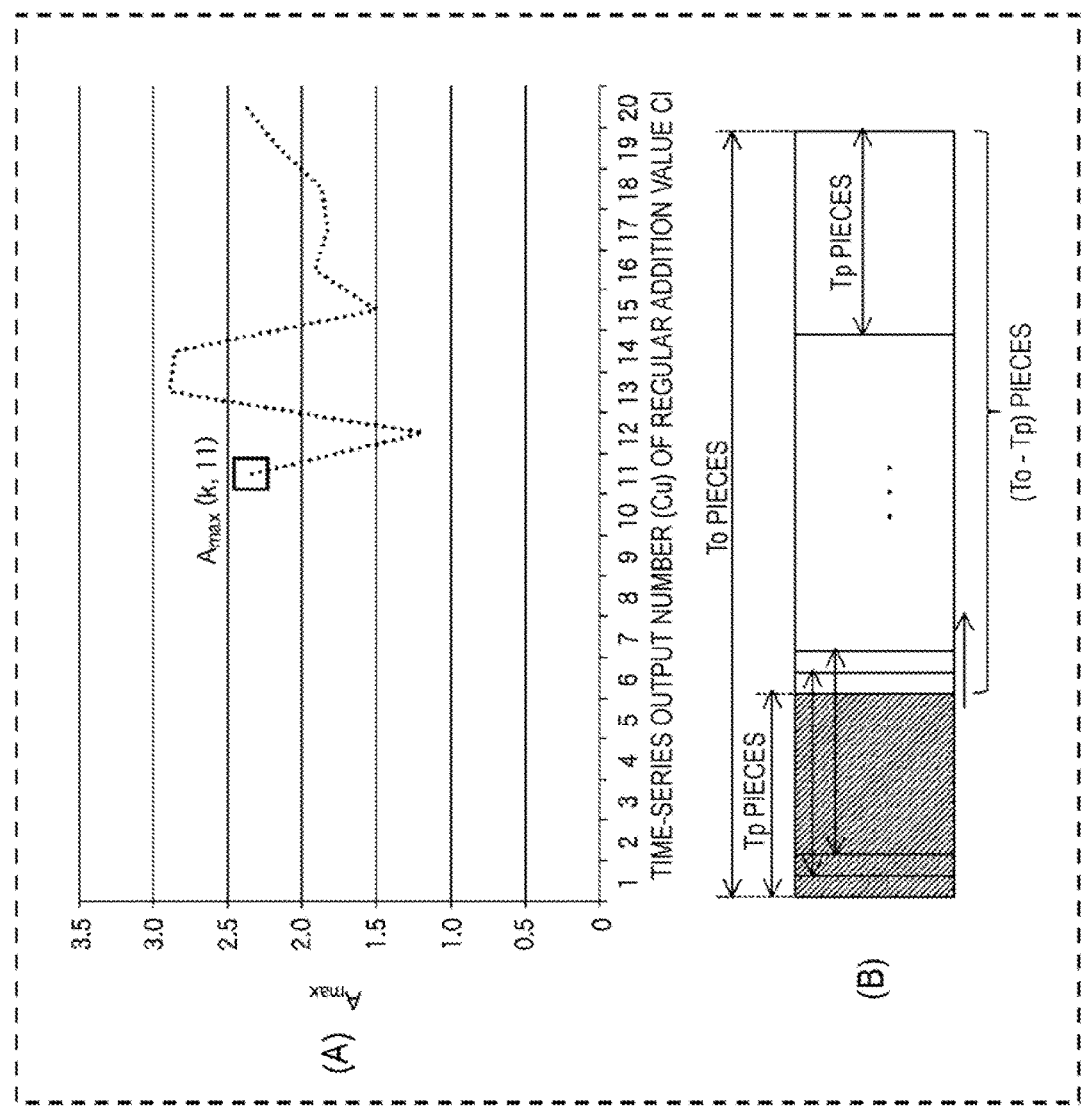
FIG. 5 includes (A) a graph showing a relationship between the time-series output number of a regular addition value CI and the maximum amplitude difference (absolute value) $A_{max}$, and (B) illustrating how a maximum amplitude difference (absolute value) $A_{max}(k, Cu)$ is calculated.

FIG. 4 is a graph showing a relationship between the time-series output number of a regular addition value CI and the amplitude of the regular addition value CI. The horizontal axis of FIG. 4 represents the output number that satisfies a relationship 1≤Co≤To, that is, the time-series output number of a Co-th-calculated regular addition value CI(k, Co) calculated for each range bin k. The vertical axis of FIG. 4 represents the amplitude Am(k, Co) of the Co-th-calculated regular addition value CI(k, Co) calculated for each range bin k. In FIG. 4, a relationship 1≤Co≤20 holds because of an example setting that Tp=10 (which corresponds to one cycle) and To=20.

For example, when Co=11, the amplitude variation width judgment threshold value generator 22 sets, at 1, Cp that provides a maximum value of a maximum amplitude difference (absolute value) between an amplitude Am (k, 11) and an amplitude Am(k, 11−Cp) (1≤Cp≤10). After finding Cp, the amplitude variation width judgment threshold value generator 22 calculates a maximum amplitude difference (absolute value) $A_{max}$(k, 11), that is, Am(k, 11)−Am(k, 1).

In Formulae (8), parameter Cu is an integer that satisfies a relationship Tp≤Cu≤To and parameter Cp is an integer that satisfies a relationship 1≤Cp≤Tp. Among a total of Co amplitudes Am(k, Co), an amplitude Am(k, Cu−1) is a (Cu−1)-th-calculated amplitude and Am(k, Cu−Tp) is a (Cu−Tp)-th-calculated amplitude.

[Formulae 8]

$$\begin{aligned}&Am(k, Cu) - Am(k, Cu - 1), \\ &Am(k, Cu) - Am(k, Cu - 2), \\ &Am(k, Cu) - Am(k, Cu - 3), \\ &\vdots \\ &Am(k, Cu) - Am(k, Cu - Tp)\end{aligned} \quad (8)$$

When Cu=11 and Tp=10, Formulae (8) become Formulae (9).

[Formulae 9]

$$\begin{aligned}&Am(k, 11) - Am(k, 11 - 1 = 10), \\ &Am(k, 11) - Am(k, 11 - 2 = 9), \\ &Am(k, 11) - Am(k, 11 - 3 = 8), \\ &\vdots \\ &Am(k, 11) - Am(k, 11 - 10 = 1)\end{aligned} \quad (9)$$

The amplitude variation width judgment threshold value generator 22 calculates, according to Formula (10), a maximum amplitude difference (absolute value) $A_{max}$(k, Cu) based on a total of Tp amplitude differences calculated according to Formulae (8).

That is, the amplitude variation width judgment threshold value generator 22 calculates a total of (To−Tp) maximum amplitude differences (absolute values) $A_{max}$(k, Cu) according to Formula (7) ((To−Tp) corresponds to the possible range of Cu).

[Formula 10]

$$A_{max}(k,Cu) = \max_{1 \leq Cp \leq Tp} |\sqrt{I_{CI}(k,Cu)^2 + Q_{CI}(k,Cu)^2} - \sqrt{I_{CI}(k,Cu-Cp)^2 + Q_{CI}(k,Cu-Cp)^2}| \quad (10)$$

For example, when Cu=12, the amplitude variation width judgment threshold value generator 22 searches for Cp that provides a maximum amplitude difference (absolute value) between an amplitude Am(k, 12) and an amplitude Am(k, 12−Cp) (1≤Cp≤10). After finding such Cp, the amplitude variation width judgment threshold value generator 22 calculates a maximum amplitude difference (absolute value) $A_{max}$(k, 12), that is, Am(k, 12)−Am(k, Cp).

That is, the amplitude variation width judgment threshold value generator 22 calculates differences between (Tp+1)-th data and first to Tp-th data and then calculates differences between (Tp+2)-th data and second to (Tp+1)-th data. In this manner, the amplitude variation width judgment threshold value generator 22 repeatedly performs the processing of calculating differences between To-th data and (To−1−Tp)-th to (To−1)-th data.

As described above, the amplitude variation width judgment threshold value generator 22 calculates a total of (To−Tp) (=20−10=10) maximum amplitude differences (absolute values) $A_{max}$(k, Cu) by calculating a maximum amplitude difference (absolute value) $A_{max}$(k, Cu) using an amplitude Am(k, Cu) and latest Tp amplitudes (Cu is incremented by 1 each time until reaching 20) (see FIGS. 5(A) and 5(B)). FIG. 5(B) illustrates how a maximum amplitude difference (absolute value) $A_{max}$(k, Cu) is calculated.

FIG. 5(A) is a graph showing a relationship between the time-series output number of a regular addition value CI and the maximum amplitude difference (absolute value) $A_{max}$. The horizontal axis of FIG. 5(A) represents Cu that satisfies a relationship Tp<Cu (=1+Tp)≤To, that is, the time-series output number of a Cu-th-calculated regular addition value CI calculated for each range bin k. The vertical axis of FIG. 5(A) represents the maximum amplitude difference (absolute value) $A_{max}(k, Cu)$ (W). Since FIG. 5(A) also employs the example setting that Tp=10 and To=20, on the horizontal axis of FIG. 5(A) Cu starts from 11 and ends at 20.

Furthermore, the amplitude variation width judgment threshold value generator 22 calculates, for each range bin k, a judgment threshold value $A_{thre}(k)$ for detection of presence or absence of an object (target) using a total of (To−Tp) maximum amplitude differences (absolute values) $A_{max}(k, Cu)$. A method for calculating a judgment threshold value $A_{thre}(k)$ will be described below for each of a case that an object (e.g., person) exists and a case that no object exists when timing for the regular data acquisition unit 20 to acquire regular addition values CI(k, Co) has arrived.

If no object (e.g., person) exists when timing for the regular data acquisition unit 20 to acquire regular addition values CI(k, Co) has arrived, the amplitude variation width judgment threshold value generator 22 calculates a judgment threshold value $A_{thre}(k)$ according to Formula (11) using a total of (To−Tp) maximum amplitude differences (absolute values) $A_{max}(k, Cu)$.

[Formula 11]

$$A_{thre}(k) = \max_{Tp < Cu \le To} |A_{max}(k, Cu)| \quad (11)$$

Figure 6:
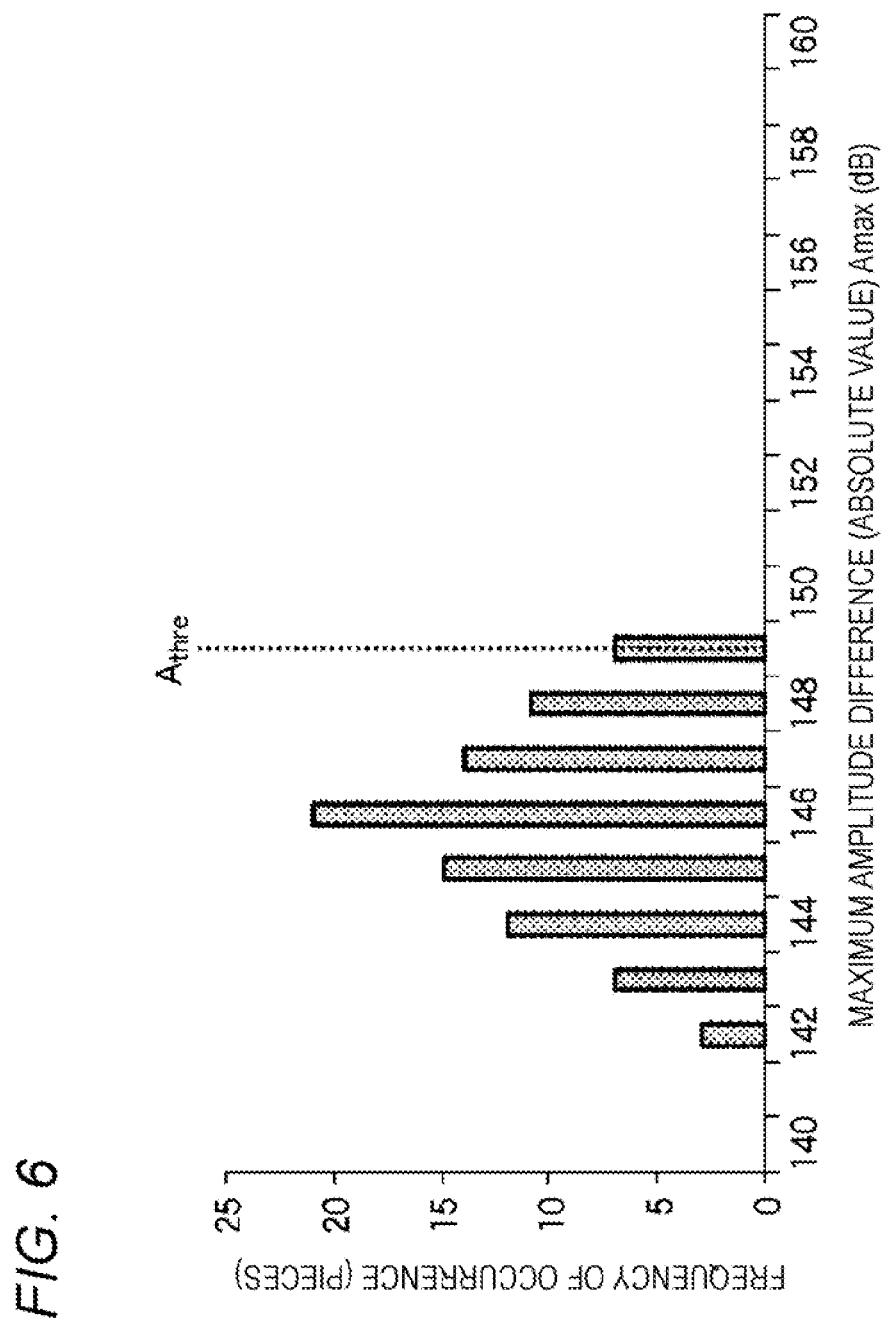
FIG. 6 is a graph showing a relationship between the maximum amplitude difference (absolute value) $A_{max}(k, Cu)$ and its frequency of occurrence.

When timing for the regular data acquisition unit 20 to acquire regular addition values CI(k, Co) has arrived, the amplitude variation width judgment threshold value generator 22 calculates a judgment threshold value $A_{thre}(k)$ based on a distribution of (To−Tp) maximum amplitude differences (absolute values) $A_{max}(k, Cu)$ (e.g., a distribution shown in FIG. 5(A)) (see FIG. 6).

FIG. 6 is a graph showing a relationship between the maximum amplitude difference (absolute value) $A_{max}(k, Cu)$ and its frequency of occurrence. Since FIG. 6 is a graph of a case that no person is involved, data of maximum amplitude differences (absolute values) $A_{max}(k, Cu)$ are smaller than or equal to 149 dB.

The horizontal axis of FIG. 6 represents the result of the operation $20 \times \log(A_{max}(k, Cu))$ (dB) performed on the maximum amplitude difference (absolute value) $A_{max}(k, Cu)$ calculated by the amplitude variation width judgment threshold value generator 22 in an example case that To=100, Tp=10, and Cu=11 to 100. The vertical axis of FIG. 6 represents the frequency of occurrence of the maximum amplitude difference (absolute value) $A_{max}(k, Cu)$ on the horizontal axis of FIG. 6 in a case that To=100.

The maximum value and the minimum value of the amplitudes of regular addition values CI(k, Co) as shown in FIG. 4 (measurement values) vary depending on the range bin k. Therefore, the amplitude variation width judgment threshold value generator 22 can calculate a judgment threshold value $A_{thre}(k)$ that makes it possible to judge (detect) presence or absence of an object with high accuracy by calculating maximum amplitude differences (absolute values) $A_{max}(k, Cu)$ for each range bin k.

Figure 7:
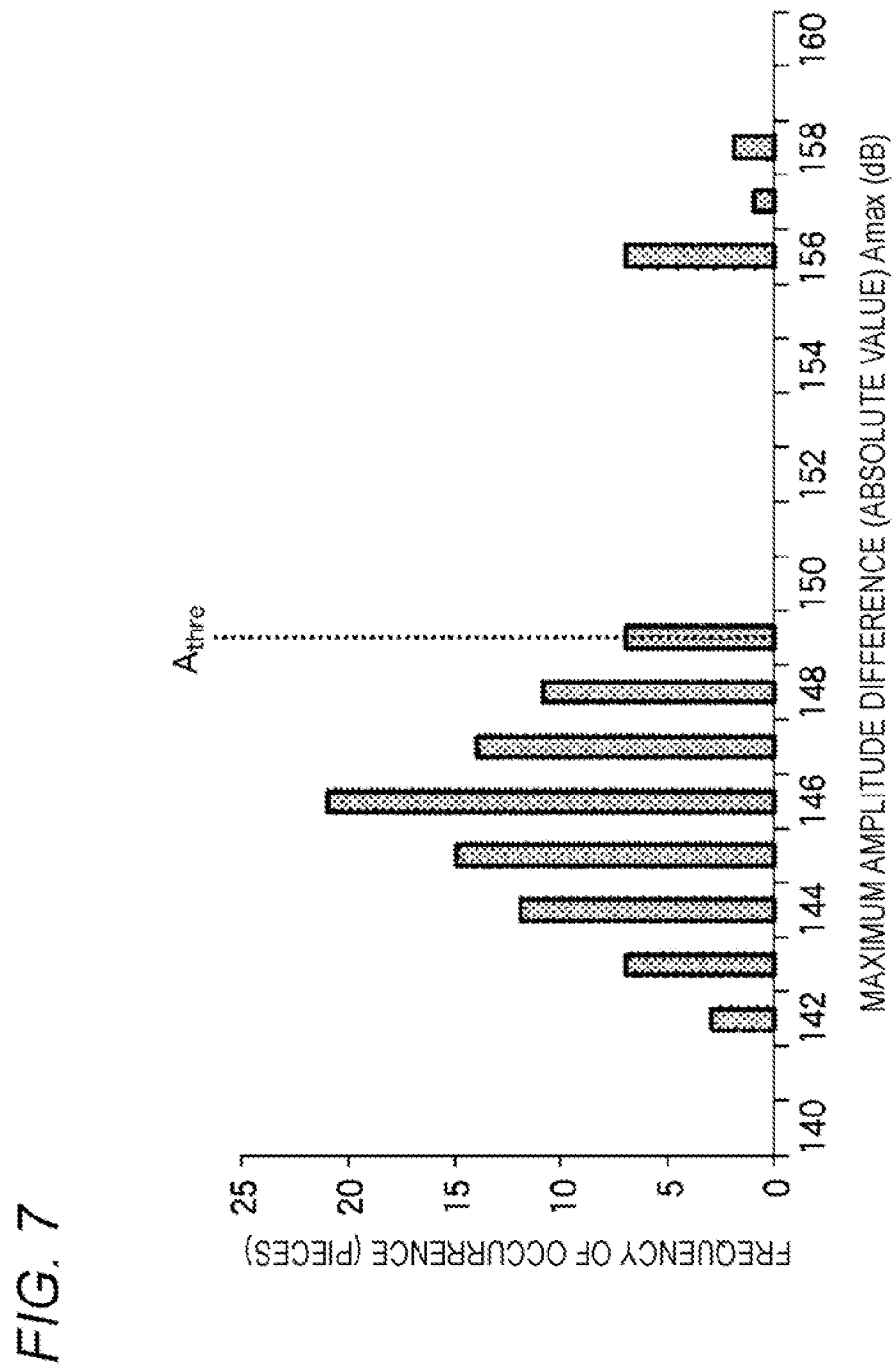
FIG. 7 is a graph showing a relationship between the maximum amplitude difference (absolute value) $A_{max}(k, Cu)$ and its frequency of occurrence in a case that data obtained with presence of a person are included.

On the other hand, when as shown in a graph of FIG. 7 data exist in a range of 156 to 158 dB in addition to maximum amplitude differences (absolute values) $A_{max}(k, Cu)$ of 142 to 149 dB when timing for the regular data acquisition unit 20 to acquire regular addition values CI(k, Co) has arrived, that is, when maximum amplitude differences (absolute values) $A_{max}(k, Cu)$ are separated into two groups, it is judged that an object (e.g., person) exists. The amplitude variation width judgment threshold value generator 22 calculates a judgment threshold value $A_{thre}(k)$ based on a distribution of maximum amplitude differences (absolute values) $A_{max}(k, Cu)$ like the one shown in FIG. 5(A).

When the data shown in FIG. 7 have been acquired, the regular data acquisition unit 20 may store maximum amplitude differences (absolute values) $A_{max}(k, Cu)$ obtained by eliminating the data of 156 to 158 dB in the regular data memory 21. FIG. 7 is a graph showing a relationship between the maximum amplitude difference (absolute value) $A_{max}(k, Cu)$ and its frequency of occurrence in a case that data obtained with presence of a person are included.

In the distribution of the maximum amplitude differences (absolute values) $A_{max}(k, Cu)$ shown in FIG. 7, when there are, for example, two groups of maximum amplitude differences (absolute values) $A_{max}(k, Cu)$, power values of the regular addition values CI(k, Co) without presence of a person, that is, maximum amplitude differences (absolute values) $A_{max}(k, Cu)$ on the horizontal axis of FIG. 7 tend to be small. Therefore, the amplitude variation width judgment threshold value generator 22 determines a judgment threshold value $A_{thre}(k)$ by employing the maximum amplitude differences (absolute values) $A_{max}(k, Cu)$ of the smaller-values group.

Next, a description will be made of processing for judging presence or absence of a person for data that are acquired successively in units of (Tp+1) data, using a judgment threshold value $A_{thre}(k)$ (amplitude variation width or power) determined by the amplitude variation width judgment threshold value generator 22.

The measurement data acquisition unit 23 acquires addition values CI(k, m) successively from the antenna branch processor D1. Parameter m, which indicates timing of acquisition of an addition value CI(k, m), is an integer that varies in a range of Cq+1 to Cq+Tp+1 (Cq: integer that is larger than or equal to 0). The measurement data acquisition unit 23 stores a total of (Tp+1) addition values CI(k, m) in the measurement data memory 24 for each time it acquires those data. That is, the measurement data acquisition unit 23 acquires measured addition values CI(k, m) as output value of Tp sampling points.

The measurement data memory 24 stores the (Tp+1) addition values (hereinafter referred to as "measurement addition values") CI(k, m) in total acquired by the measurement data acquisition unit 23. Parameter m, which indicates timing of acquisition of a measurement addition value CI(k, n), is an integer that varies in a range of Cq+1 to Cq+Tp+1. Cq, which is a data number of data acquire by the measurement data acquisition unit 23, is an integer that is larger than or equal to 0.

Now, to simplify the description of the operations of the measurement data acquisition unit 23, the measurement data memory 24, and the amplitude variation width detection judgment unit 25, m of an example case of Cq=0 is replaced by an integer Cr and a description will be made using Cr (in this case, m varies in a range of 1 to Tp+1). However, the following description of the operations (hereinafter referred to as "successive processing") of the measurement data acquisition unit 23, the measurement data memory 24, and the amplitude variation width detection judgment unit 25 (Cr varies from 1 to Tp+1) is likewise applicable to the case that the integer Cq is larger than 1 in which the integer m varies in a range of Cq+1 to Cq+Tp+1.

Tp that is found in the term "the number Tp+1 of output addition values CI(k, m)" and used in the measurement data acquisition unit 23 is set so as to correspond to a variation cycle $T_{human}$ of the amplitude or power value of an object (e.g., person) as a detection target of the radar apparatus 1 (hereinafter referred to simply as a "variation cycle $T_{human}$";

described later in detail with reference to FIGS. 8 and 9). That is, a relationship of Formula (12) holds. Parameter Tp may be changed as appropriate in response to an input manipulation of a user of the radar apparatus 1 and stored in the measurement data acquisition unit 23.

For example, when Tp=10, $T_{human}$=1 s, and the transmission cycle Tr is 1 µs, the number Np of times of in-phase addition (coherent addition) of sliding correlation values AC(k, M) is equal to $1 \times 10^5$.

[Formula 12]

$$Np \times Tr \times Tp \approx T_{human} \quad (12)$$

The amplitude variation width detection judgment unit 25, which is an example of an amplitude difference judging unit, calculates, for each range bin k, amplitudes Am(k, Cr) of the measurement addition values CI(k, Cr) stored in the measurement data memory 24 according to Formula (13). Cr is an integer that satisfies a relationship 1≤Cr≤Tp+1.

[Formula 13]

$$Am(k,Cr) = \sqrt{I_{CI}(k,Cr)^2 + Q_{CI}(k,Cr)^2} \quad (13)$$

First, the amplitude variation width detection judgment unit 25 calculates, according to Formulae (11), a total of Tp amplitude differences between a (Tp+1)-th-calculated amplitude Am(k, Tp+1) among a total of (Tp+1) amplitudes Am(k, Cr) calculated according to Formula (13) and latest Tp amplitudes Am(k, 1) to Am(k, Tp) that have been calculated before the calculation of the amplitude Am(k, Tp+1).

[Formulae 14]

$$Am(k, Tp + 1) - Am(k, Tp), \quad (14)$$
$$Am(k, Tp + 1) - Am(k, Tp - 1),$$
$$Am(k, Tp + 1) - Am(k, Tp - 2),$$
$$\vdots$$
$$Am(k, Tp + 1) - Am(k, 1)$$

The amplitude variation width detection judgment unit 25 calculates, according to Formula (15), a maximum amplitude difference (absolute value) $A_{rt\_max}(k)$ based on a total of Tp amplitude differences calculated according to Formulae (14).

[Formula 15]

$$A_{rt\_max}(k) = \max_{1 \leq Cr \leq Tp} |\sqrt{I_{CI}(k,Tp+1)^2 + Q_{CI}(k,Tp+1)^2} - \sqrt{I_{CI}(k,Tp+1-Cr)^2 + Q_{CI}(k,Tp+1-Cr)^2}| \quad (15)$$

The amplitude variation width detection judgment unit 25 compares the maximum amplitude difference (absolute value) $A_{max}(k)$ calculated according to Formula (15) with a judgment threshold value $A_{thre}(k)$ calculated by the amplitude variation width judgment threshold value generator 22 according to Formula (11). The amplitude variation width detection judgment unit 25 judges (detects) presence or absence of an object (target) according to a result of the comparison between the maximum amplitude difference (absolute value) $A_{max}(k)$ and the judgment threshold value $A_{thre}(k)$ (the details will be described later with reference to FIG. 10(B)). The amplitude variation width detection judgment unit 25 outputs a result of the judgment (detection) as to presence or absence of an object to the object detection output unit 26.

The object detection output unit 26 outputs the judgment result of the amplitude variation width detection judgment unit 25 to the downstream stage (not shown). When receiving, from the amplitude variation width detection judgment unit 25, a judgment result to the effect that an object has been detected, the object detection output unit 26 calculates a distance D(k) from the radar apparatus 1 to the object (target) according to Formula (16) using a range bin k that gives the judgment result to the effect that the object has been detected. The object detection output unit 26 outputs the distance D(k) to the downstream stage. In Formula (16), Co represents the speed of light. The calculation according to Formula (16) may be performed by the amplitude variation width detection judgment unit 25.

[Formula 16]

$$D(k) = \frac{k}{2} \times C_0 \quad (16)$$

Figure 8:
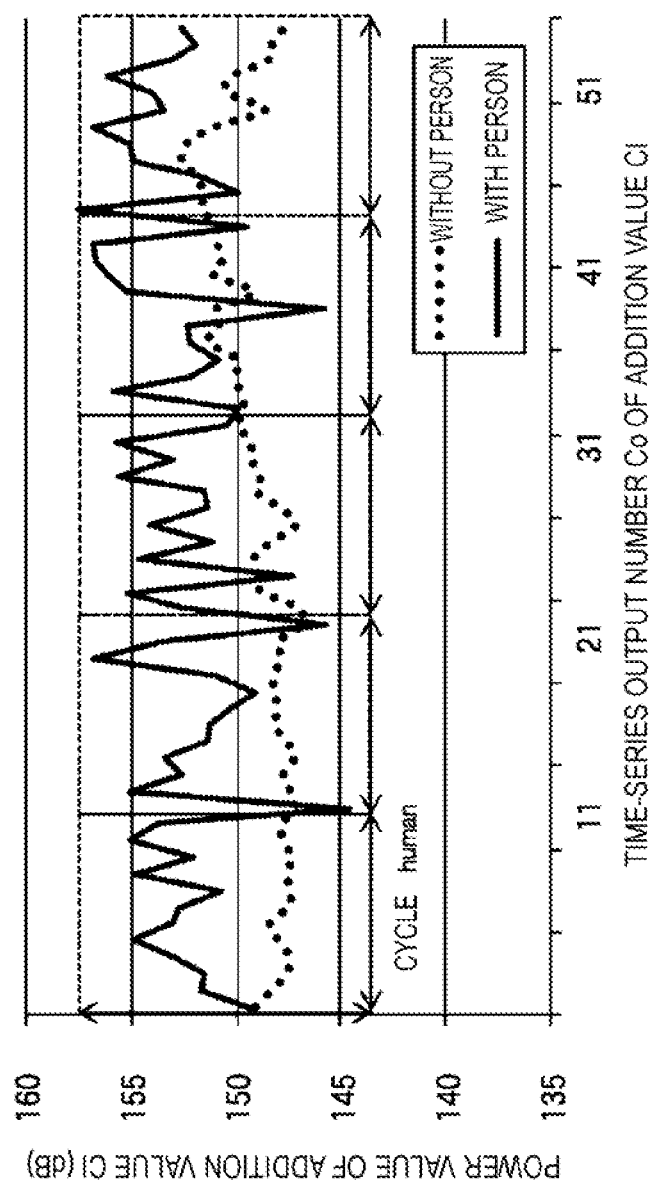
FIG. 8 is a graph showing a relationship between the time-series output number of a regular addition value CI(k, Co) and its power value in each of a case that a person exists at a position of a distance corresponding to a range bin k and a case that no person exists.

FIG. 8 is a graph showing a relationship between the time-series output number of a regular addition value CI(k, Co) and its power value in each of a case that a person exists at a position of a distance corresponding to a range bin k and a case that no person exists. In FIG. 8, Co is an integer that satisfies a relationship 1≤Co≤60.

The horizontal axis of FIG. 8 represents Co which satisfies the relationship 1≤Co≤60, that is, the time-series output number of a regular addition value CI(k, Co) corresponding to a range bin k. The vertical axis of FIG. 8 represents the result of the operation 20×log(CI(k, Cu)) (dB) performed on the regular addition value CI(k, Co).

The solid-like curve in FIG. 8 represents regular addition values CI(k, Co) in the case that a person exists, and the broken-line curve in FIG. 8 represents regular addition values CI(k, Co) in the case that no person exists. Where a person exists, the power value of the regular addition value CI(k, Co) varies to a large extent at constant intervals (constant variation cycles $T_{human}$) unlike in the case that no person exists. On the other hand, in the case where no person exists, it is seen that the variation of the power value of the regular addition value CI(k, Co) is small and the absolute values of regular addition values CI(k, Co) are smaller than in the case that a person exists. These differences result from increase of reflection waves due to the presence of a person.

In this example, it is judged that the power values of the solid-like curve in FIG. 8 vary periodically at constant intervals (constant variation cycles $T_{human}$) which are 1 to 11, 12 to 23, 24 to 35, and 36 to 47 in terms of the value Co on the horizontal axis. On the other hand, it is judged that the power values of the broken-like curve in FIG. 8 do not vary periodically at constant intervals (constant variation cycles $T_{human}$) which are 1 to 11, 12 to 23, 24 to 35, and 36 to 47 in terms of the value Co on the horizontal axis.

Therefore, the object detection processor 10 can judge (detect) presence or absence of an object (target) such as a person using a feature that the power value varies at constant intervals (constant variation cycles $T_{human}$). That is, the object detection processor 10 can judge (detect) presence or absence of an object (target) such as a person using at least data of addition values CI(k, Co) that vary at constant intervals (constant variation cycles $T_{human}$). Therefore, an object can be detected in a shorter measurement time that is equal to a movement cycle of a small-movement object (variation cycle $T_{human}$) in contrast to conventional cases in which a measurement time is necessary that is at least two times as long as a variation cycle $T_{human}$.

Figure 9:
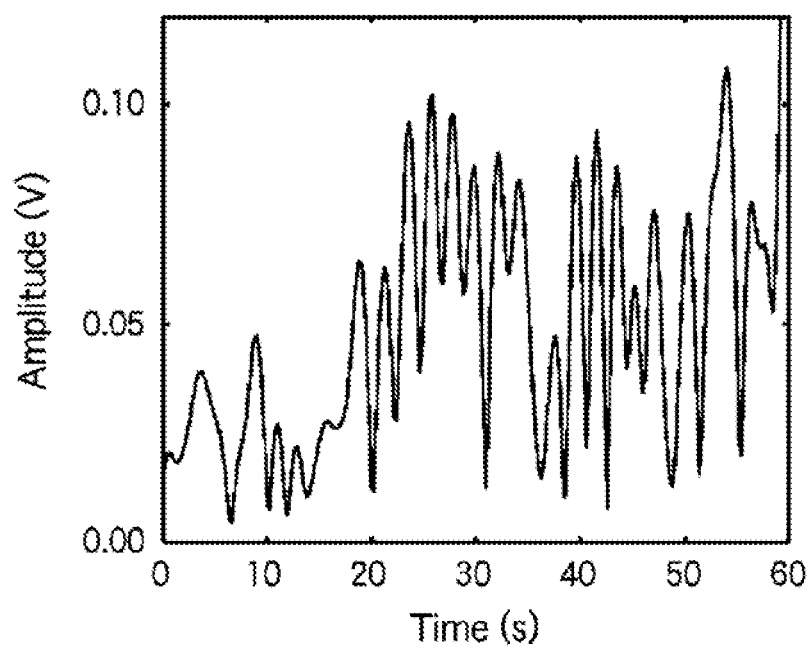
FIG. 9 is a graph showing a relationship between the measurement time and the amplitude instantaneous value in object detection that is found in reference Non-Patent Literature 1.

FIG. 9 is a graph showing a relationship between the measurement time and the amplitude instantaneous value in object detection that is found in Non-patent document 1. The horizontal axis of FIG. 9 represents the measurement time (s) and the vertical axis of FIG. 9 represents the amplitude instantaneous value. FIG. 9 shows a measurement result of a case that a person is sitting. A measurement cycle for detection of a person is about 2 seconds. In FIG. 9, after 20 s (a person (target) is sitting), the amplitude instantaneous value varies to a large extent at intervals of 2 seconds. Also in the above-mentioned Patent Literature 1, the measurement cycle of a small-movement object (e.g., a person whose body is swinging) is about 6 seconds.

(Reference Non-Patent Literature 1) "Human Detection Algorithm for Doppler Radar Using Prediction Error in Autoregressive Model," Instrumentation and Control Technology (ISICT), July 2012, 8th IEEE International Symposium on, pp. 37-40.

On the other hand, in the radar apparatus 1 according to the embodiment in which presence or absence of a person is judged based on voltage differences between acquired data, presence or absence of a person can be judged (detected) in a shorter measurement time (e.g., the variation cycle $T_{human}$ is equal to about 1 s) than the measurement cycles of the above-mentioned Patent Literature 1 and Reference Non-patent Literature 1.

As a result, with realization of object detection in a short time, the processing of the disclosure could be utilized in a wide variety of scenes. More specifically, whereas in a scene of an object being stationary the object can be detected as a person when the object is kept stationary for a certain time, also in a scene that an object is moving the object can be detected as a person when the object is observed for a one-cycle time of the same range bin.

Figure 10:
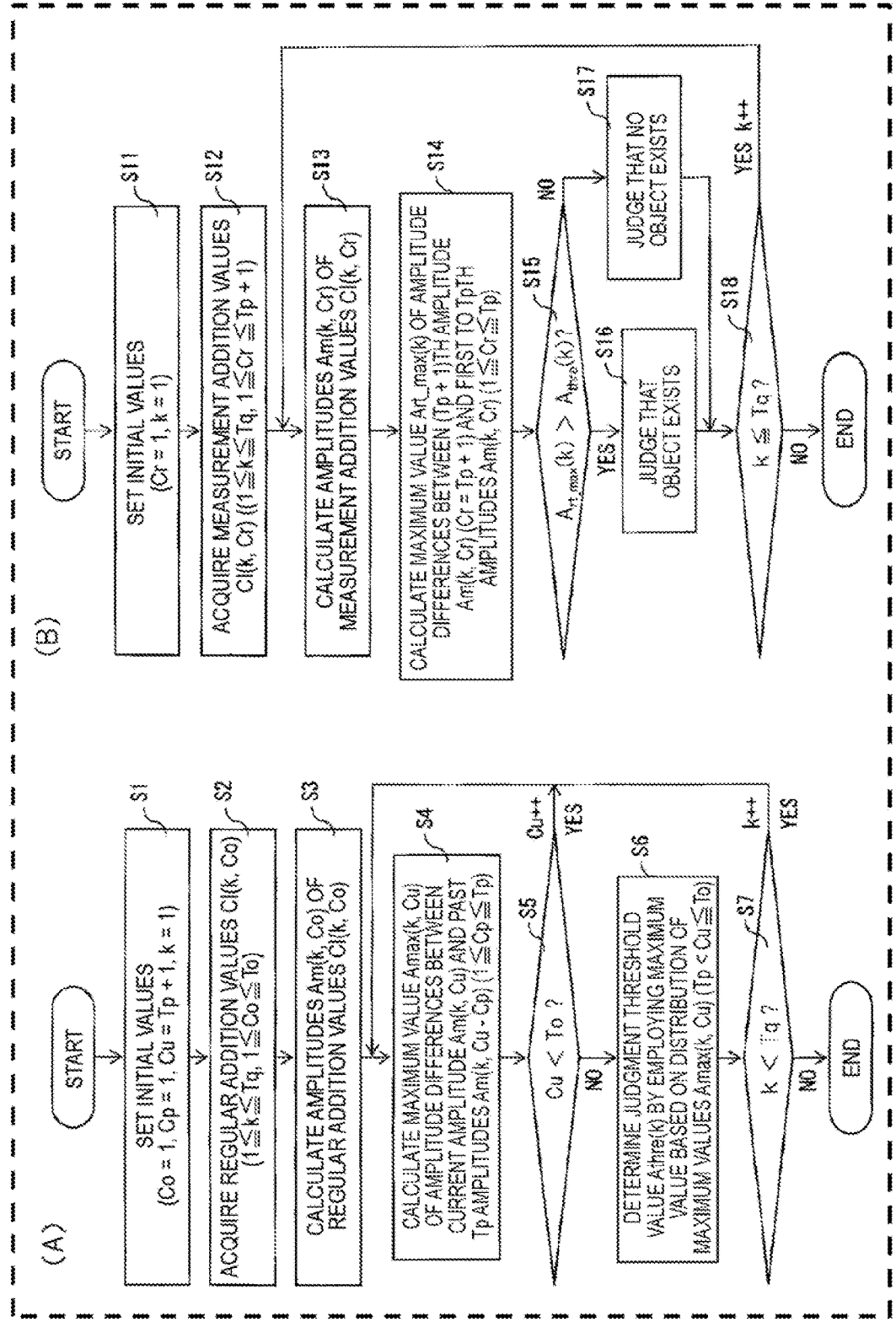
FIG. 10 includes (A) a flowchart of an operation procedure of a regular process of the radar apparatus according to the first embodiment which uses regular addition values CI(k, Co), and (B) a flowchart of an operation procedure of a successive process of the radar apparatus according to the first embodiment which uses measurement addition values CI(k, Cr).

Next, an operation procedure of the radar apparatus 1 according to the first embodiment will be described with reference to FIG. 10. FIG. 10(A) is a flowchart of an operation procedure of a regular process of the radar apparatus 1 according to the first embodiment which uses regular addition values CI(k, Co). FIG. 10(B) is a flowchart of an operation procedure of a successive process of the radar apparatus 1 according to the first embodiment which uses measurement addition values CI(k, Cr).

First, the regular process which is executed by the object detection processor 10 will be described with reference to FIG. 10(A).

Referring to FIG. 10(A), the regular data acquisition unit 20 sets parameter Co, parameter Cp, and the range bin k at an initial value "1" and sets parameter Cu at Tp+1 (step S1). Tp is an integer that is larger than or equal to 1. The regular data acquisition unit 20 acquires a regular addition value CI(k, Co) from the antenna branch processor D1 and stores them in the regular data memory 21 until parameter Co becomes equal to To and the range bin k becomes equal to Tq (step S2). Co is an integer that satisfies a relationship 1≤Co≤To, and Tq is a maximum value of the range bin k (1≤k≤Tq).

The amplitude variation width judgment threshold value generator 22 calculates, for each range bin k, amplitudes Am(k, Co) of the respective regular addition values CI(k, Co) stored in the regular data memory 21 according to Formula (7) (step S3). The amplitude variation width judgment threshold value generator 22 calculates, according to Formulae (8), a total of (To−Tp) amplitude differences between a Cu-th-calculated amplitude Am(k, Co) among a total of Co amplitudes Am(k, Co) calculated according to Formula (7) with latest Tp amplitudes Am(k, Cu−Cp) to Am(k, Cu−1) that have been calculated before the calculation of the amplitude Am(k, Cu).

The amplitude variation width judgment threshold value generator 22 calculates, according to Formula (9), a maximum amplitude difference (absolute value) $A_{max}$(k, Cu) of a total of (To−Tp) amplitude differences calculated according to Formulae (8) (step S4). After the execution of step S4, when parameter Cu (=Tp+1) is smaller than To (S5: yes), the amplitude variation width judgment threshold value generator 22 increments parameter Cu by 1 to repeatedly execute step S4 until parameter Cu becomes equal to To.

When parameter Cu has become equal to To (S5: no), the amplitude variation width judgment threshold value generator 22 calculates, for each range bin k, a judgment threshold value $A_{thre}$(k) for detection of presence or absence of an object using a total of (To−Tp) amplitude differences (absolute values) $A_{max}$(k, Cu) (step S6). After the execution of step S6, when the range bin k is smaller than Tq (S7: yes), the amplitude variation width judgment threshold value generator 22 increments the range bin k by 1 to repeatedly execute step S6 until the range bin k becomes equal to Tq. When the range bin k has become equal to Tq, the regular process of FIG. 10(A) is finished.

Next, the successive process which is executed by the object detection processor 10 will be described with reference to FIG. 10(B).

Referring to FIG. 10(B), the measurement data acquisition unit 23 sets parameter Cr and the range bin k at an initial value "1" (step S11). The measurement data acquisition unit 23 acquires a measurement addition value CI(k, Cr) successively from the antenna branch processor D1 until parameter Cr becomes equal to Tp+1 and range bin k becomes equal to Tq (step S12). The measurement data acquisition unit 23 stores a total of (Tp+1) measurement addition values CI(k, Cr) in the measurement data memory 24 for each time it acquires those data.

The amplitude variation width detection judgment unit 25 calculates, for each range bin k, amplitudes Am(k, Cr) of the respective measurement addition values CI(k, Cr) stored in the measurement data memory 24 (step S13).

The amplitude variation width detection judgment unit 25 calculates, according to Formulae (14), a total of Tp amplitude differences between a (Tp+1)-th-calculated amplitude Am(k, Tp+1) among a total of (Tp+1) amplitudes Am(k, Cr) calculated according to Formula (13) and latest Tp amplitudes Am(k, 1) to Am(k, Tp) that have been calculated before the calculation of the amplitude Am(k, Tp+1).

The amplitude variation width detection judgment unit 25 calculates, according to Formula (15), a maximum amplitude difference (absolute value) $A_{rt\_max}$(k) based on a total of Tp amplitude differences calculated according to Formulae (14) (step S14). And the amplitude variation width detection judgment unit 25 compares the maximum amplitude difference (absolute value) $A_{rt\_max}$(k) calculated according to Formula (15) with a judgment threshold value $A_{thre}$(k) calculated by the amplitude variation width judgment threshold value generator 22 according to Formula (11) (step S15).

When the maximum amplitude difference (absolute value) $A_{rt\_max}$(k) is larger than the judgment threshold value $A_{thre}$(k) (S15: yes), the amplitude variation width detection judgment unit 25 judges that an object has been detected (object (target) presence or absence detection result) (step S16). The amplitude variation width detection judgment unit 25 outputs the judgment result of step S16 to the object detection output unit 26.

On the other hand, when the maximum amplitude difference (absolute value) $A_{rt\_max}(k)$ is smaller than or equal to the judgment threshold value $A_{thre}(k)$ (S15: no), the amplitude variation width detection judgment unit 25 judges that no object exists (object (target) presence or absence detection result) (step S17). The amplitude variation width detection judgment unit 25 outputs the judgment result of step S17 to the object detection output unit 26.

After the execution of step S16 or S17, when the range bin k is smaller than Tq (S18: yes), the amplitude variation width detection judgment unit 25 increments the range bin k by 1 to repeatedly execute steps S13-S16 or S13-S17 until the range bin k becomes equal to Tq. When the range bin k has become equal to Tq, the successive process of FIG. 10(B) is finished.

Figure 11:
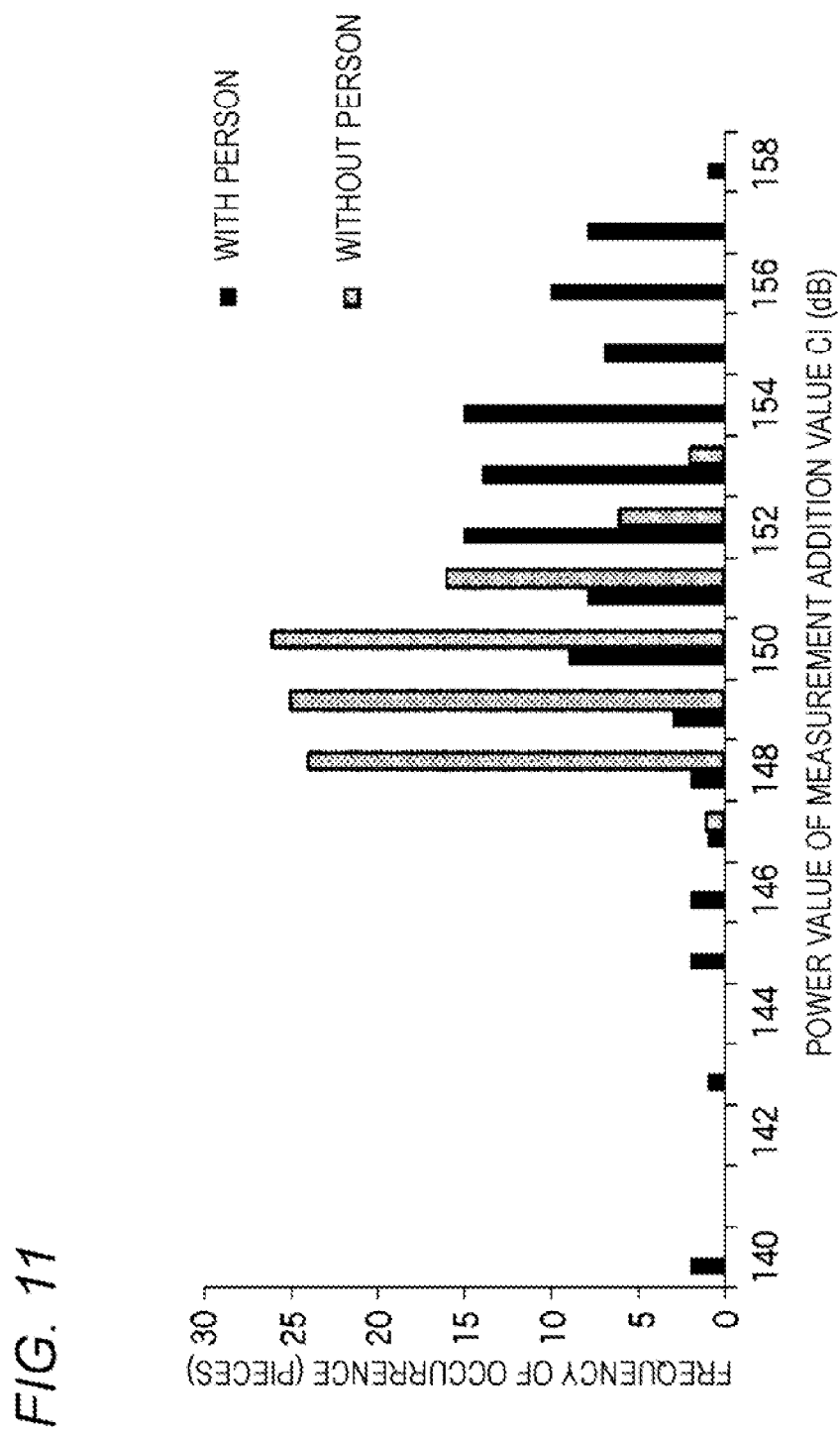
FIG. 11 is a graph showing a relationship between the power value of a measurement addition value CI(k, Co) and the frequency of occurrence of the power value.

FIG. 11 is a graph showing a relationship between the power value of a measurement addition value CI(k, Cr) and the frequency of occurrence of the power value. The horizontal axis of FIG. 11 represents the power value (dB) of a measurement addition value CI(k, Cr), and the vertical axis of FIG. 11 represents the frequency of occurrence of the power value. That is, FIG. 11 is a graph that is drawn using output values of the antenna branch processor D1, that is, data that have not been processed by the object detection processor 10 yet. FIG. 11 shows power values as measurement addition values CI(k, Cr) obtained in an actual environment. More specifically, FiG. FIG. 11 is a histogram of a total of 100 power values as measurement addition values CI(k, Cr) obtained in each of a case that a person exists at a location that is distant from the radar apparatus 1 by 70 m and a case that no person exists.

It is seen from FIG. 11 that an overlap exists between the data with a person and the data without a person because when a person (target) exists at a location that is far from the radar apparatus 1, power values as measurement addition values CI(k, Cr) are attenuated and affected by noise or clutter (reflection waves). Furthermore, the power values are larger as a whole (and frequencies of occurrence are higher in a high-power range) in the case where a person exists at a location far from the radar apparatus 1 than in the case where no person exists.

However, it is seen that the case with a person and the case without a person have the same measurement addition values CI(k, Cr) that correspond to about half of the total frequency 100. Therefore, when the radar apparatus 1 sets a judgment threshold value $A_{thre}(k)$ in an environment without a person, a problem arises that the radar apparatus 1 may not be able to detect a person though a person exists actually.

In view of the above, the inventors paid attention to the fact that when a person exists in the measurement range of the radar apparatus 1 the variation amount of the amplitude of the measurement addition value CI(k, Cr), for example, varies periodically and larger amplitudes of measurement addition values CI(k, Cr) than in the case without a person occur at high frequencies.

That is, when a person exists, the variation amount of the amplitude of the measurement addition value CI(k, Cr) varies periodically and larger amplitudes of measurement addition values CI(k, Cr) than in the case without a person occur at high frequencies.

Based on the above, a maximum amplitude difference is determined by determining a maximum value of variations of past Tp amplitudes (Tp corresponds to one cycle). Furthermore, since larger amplitude values occur when a person exists, large values are obtained when maximum values of amplitude differences from past Tp amplitudes are calculated (see FIG. 12). Thus, differences between a case with a person and a case without person are clarified.

In the radar apparatus 1 according to the embodiment, by executing the regular process (FIG. 10(A)) and the successive process (FIG. 10(B)), a judgment threshold value $A_{thre}(k)$ (e.g., 149 dB in FIG. 12) for judgment (detection) of presence or absence of an object (target) such as a person can be set and presence or absence of a person can be judged (detected) with high accuracy using the judgment threshold value $A_{thre}(k)$. Lowering of the accuracy of detection of a person can thus be suppressed (see FIG. 12).

Figure 12:
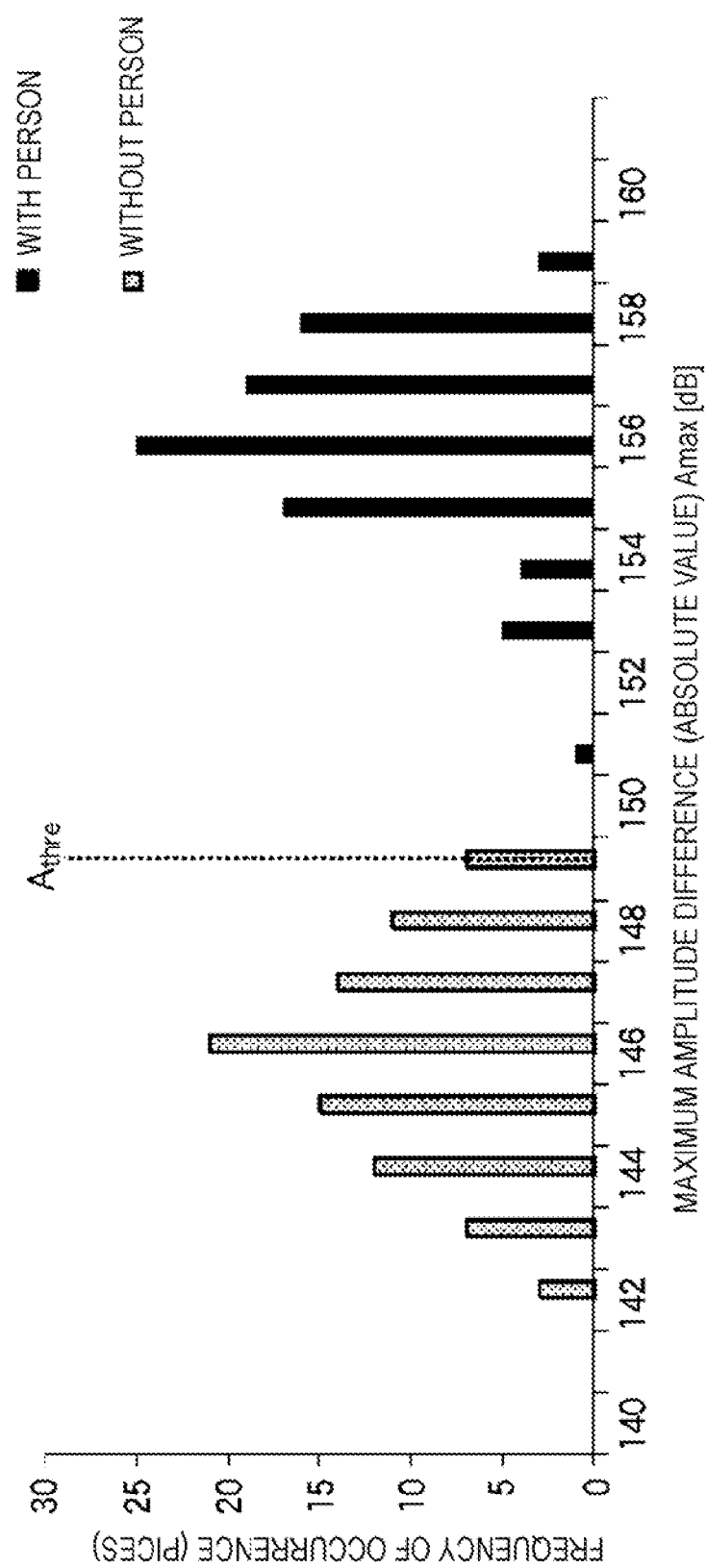
FIG. 12 is a graph showing a relationship between the maximum amplitude difference (absolute value) $A_{max}$ and the frequency of occurrence of the maximum amplitude difference (absolute value) $A_{max}$ in each of a case with a person and a case without a person.

FIG. 12 is a graph showing a relationship between the maximum amplitude difference (absolute value) $A_{rt\_max}$ and its frequency of occurrence in each of a case with a person and a case without a person. The horizontal axis of FIG. 12 represents the maximum value (power value) $A_{max}$(dB) of amplitude differences between a measurement addition value CI(k, Cr) and past Tp measurement addition values. The vertical axis of FIG. 12 represents the frequency of occurrence of the maximum value (power value). FIG. 12 shows power values as measurement addition values CI(k, Cr) obtained in an actual environment. More specifically, FIG. 12 is a histogram of a total of 100 power values as measurement addition values CI(k, Cr) obtained in each of a case that a person exists at a location that is distant from the radar apparatus 1 by 70 m and a case that no person exists.

As described above, in the radar apparatus 1 according to the embodiment, a judgment threshold value $A_{thre}(k)$ for judgment (detection) of presence or absence of an object (target) such as a person can be set by executing the regular process (FIG. 10(A)) which uses a total of To regular addition values CI(k, Co). Furthermore, presence or absence of a person can be judged (detected) by executing the successive process (FIG. 10(B)) using a total of (Tp+1) measurement addition values CI(k, Co).

As a result, utilizing the amplitude variation characteristics of a person that when a person exists the amplitude variation width (amplitude variation amount) of the measurement addition value CI(k, Cr), for example, varies periodically and larger amplitudes occur than in the case without a person, the radar apparatus 1 can suppress lowering of the accuracy of detection of an object including a person. As such, the radar apparatus 1 can detect an object such as a person in a shorter measurement period than measurement cycles found in the above-mentioned Patent Literature 1 and Non-patent document 1.

Although in the radar apparatus 1 according to the embodiment presence or absence of an object is judged (detected) using one variation cycle $T_{human}$ as one measurement cycle, it may be judged using several variation cycles $T_{human}$ rather than one variation cycle $T_{human}$.

Although in the radar apparatus 1 according to the embodiment presence or absence of an object is judged (detected) using variation widths of amplitudes Am of regular addition values CI(k, Co) and measurement addition values CI(k, Cr), the disclosure is not limited to the case of using variation widths of amplitudes Am. The same advantages can also be obtained by judging (detecting) presence or absence of an object using variation widths of power values Pm.

In this case, in the calculations performed in the radar apparatus 1, Formula (7) is replaced by Formula (17) and Formula (8) are replaced by Formulae (18). Formulae (10), (11), and (13) are replaced by Formulae (19), (20), and (21), respectively. Formulae (14) are replaced by Formulae (22) and Formula (15) is replaced by Formula (23).

[Formula 17]

$$Pm(k,Co) = I_{CI}(k,Co)^2 + Q_{CI}(k,Co)^2 \qquad (17)$$

[Formulae 18]

$$Pm(k, Cu) - Pm(k, Cu - Tp),$$
$$Pm(k, Cu) - Pm(k, Cu - Tp - 1),$$
$$Pm(k, Cu) - Pm(k, Cu - Tp - 2), \qquad (18)$$
$$\vdots$$
$$Pm(k, Cu) - Pm(k, Cu - 1)$$

[Formula 19]

$$P_{rt\_max}(k,Cu) = \max_{1 \leq Cp \leq Tp} |I_{CI}(k,Cu)^2 + Q_{CI}(k,Cu)^2 - I_{CI}(k,Cu-Cp)^2 + Q_{CI}(k,Cu-Cp)^2| \qquad (19)$$

[Formula 20]

$$A_{thre}(k) = \max_{Tp < Cu \leq To} |P_{rt\_max}(k,Cu)| \qquad (20)$$

[Formula 21]

$$Pm(k,Cr) = I_{CI}(k,Cr)^2 + Q_{CI}(k,Cr)^2 \qquad (21)$$

[Formulae 22]

$$Pm(k, Tp + 1) - Pm(k, 1),$$
$$Pm(k, Tp + 1) - Pm(k, 2),$$
$$Pm(k, Tp + 1) - Pm(k, 3), \qquad (22)$$
$$\vdots$$
$$Pm(k, Tp + 1) - Pm(k, Tp)$$

[Formula 23]

$$P_{rt\_max}(k) = \max_{1 \leq Cr \leq Tp} |I_{CI}(k,Tp+1)^2 + Q_{CI}(k,Tp+1)^2 - I_{CI}(k,Tp+1-Cr)^2 + Q_{CI}(k,Tp+1-Cr)^2| \qquad (23)$$

Although in the radar apparatus 1 according to the embodiment the radar receiver Rx has the one antenna branch processor D1, the radar receiver Rx may have plural antenna branch processors D1. In this case, the object detection processor 10 of the radar receiver Rx may either judge presence or absence of an object individually using sets of outputs (regular addition values and measurement addition values) of the respective antenna branch processors or judge presence or absence of an object when judgment results obtained by using sets of outputs of all the antenna branch processors coincide with each other.

(Embodiment 2)

Figure 13:
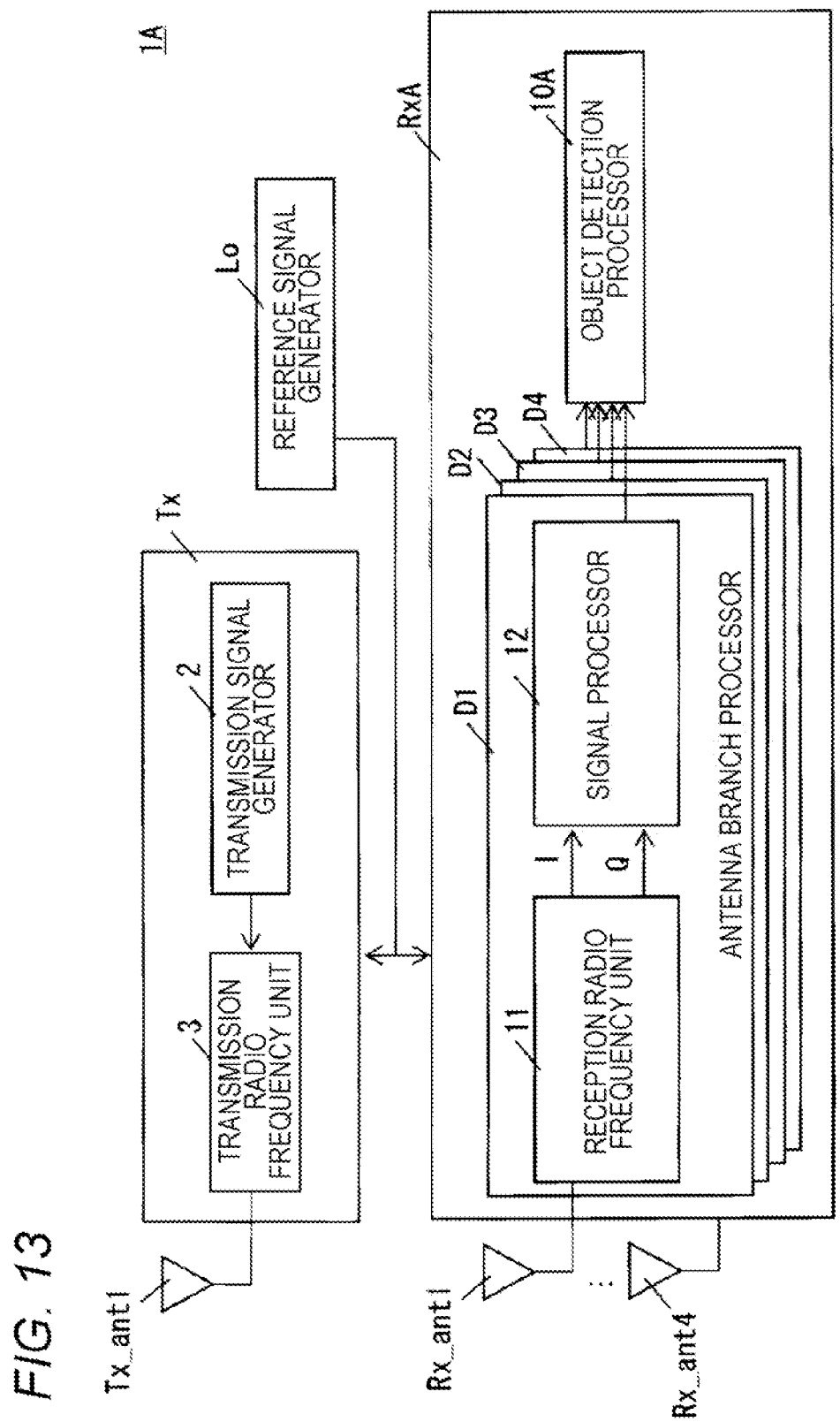
FIG. 13 is a block diagram showing, in a simplified manner, the internal configuration of a radar apparatus according to a second embodiment.
Figure 14:
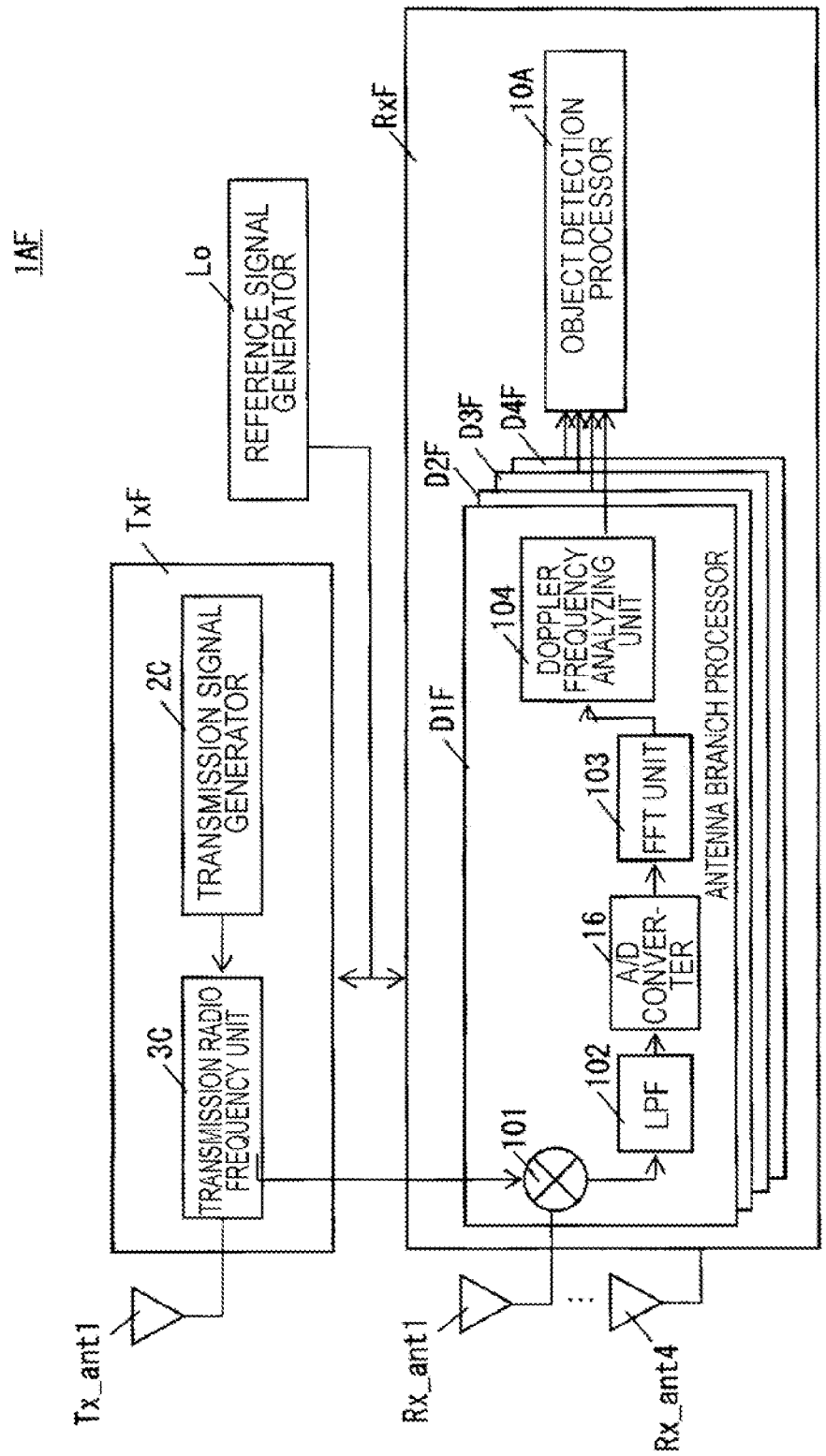
FIG. 14 is a block diagram showing, in a simplified manner, the internal configuration of a radar apparatus according to the second embodiment in which a radar transmitter transmits a frequency-modulated radar transmission signal.
Figure 15:
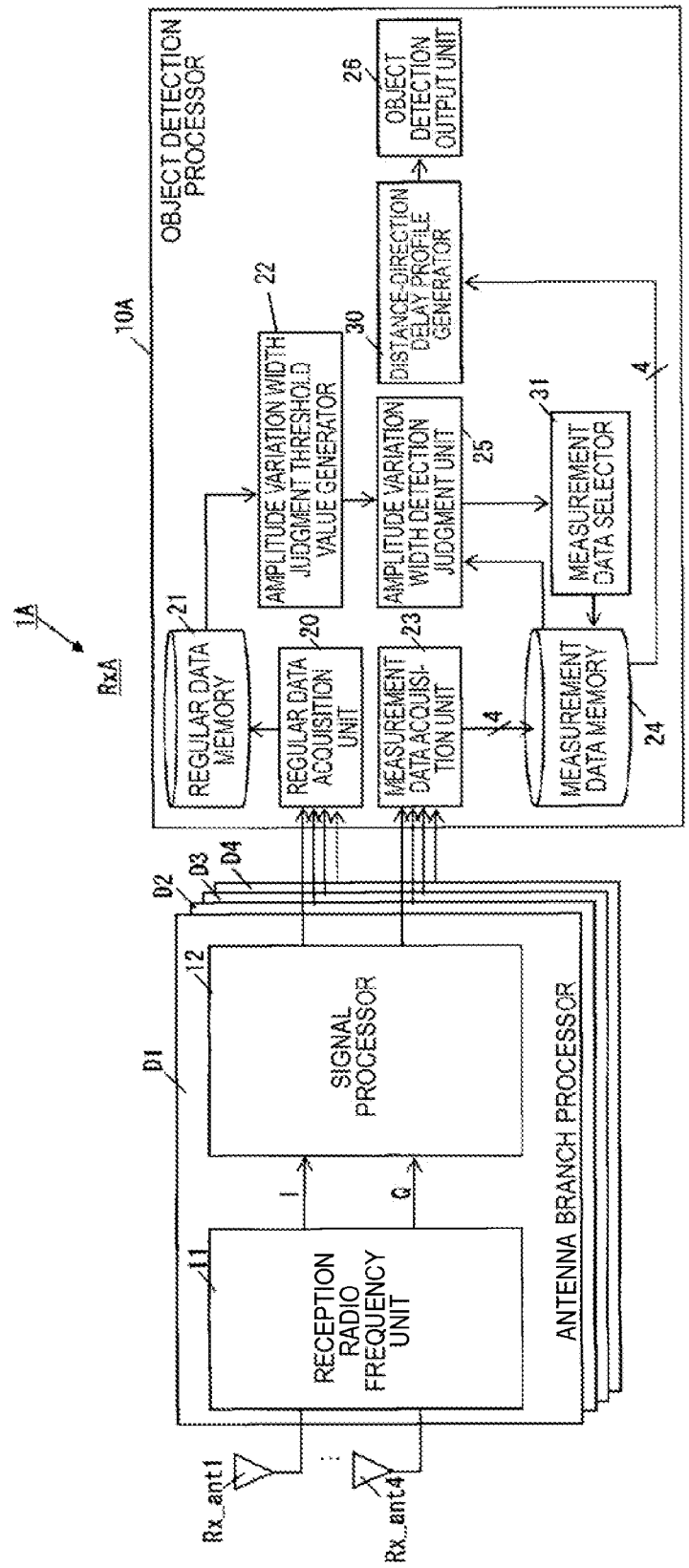
FIG. 15 is a block diagram showing, in detail, the internal configuration of a radar receiver of the radar apparatus according to the second embodiment.

A second embodiment is a mode in which the reception antenna of the radar apparatus 1 according to the first embodiment is replaced by a multiple antenna. The configuration and operation of the radar apparatus 1A according to the second embodiment will be described with reference to FIGS. 13-15. FIG. 13 is a block diagram showing, in a simplified manner, the internal configuration of the radar apparatus 1A according to the second embodiment. FIG. 14 is a block diagram showing, in a simplified manner, the internal configuration of a radar apparatus 1AF according to the second embodiment in which a radar transmitter TxF transmits a frequency-modulated radar transmission signal. FIG. 15 is a block diagram showing, in detail, the internal configuration of a radar receiver RxA of the radar apparatus 1A according to the second embodiment. In the following description of the configurations and operations of the individual units of the radar apparatus 1A according to this embodiment, units having the same ones in the radar apparatus 1 according to the first embodiment will be given the same symbols as the latter and descriptions therefore will be omitted or simplified; only different features will be described.

The radar apparatus 1A receives a reflection signal that is a radar transmission signal as reflected by an object (target; not shown) with plural antenna branch processors D1-D4 having respective reception antennas. The radar apparatus 1A detects presence or absence of an object (target) by performing signal processing on reflection signals received by the respective reception antennas.

The radar receiver RxA is equipped with a total of four antenna branch processors D1-D4 to each of which a single reception antenna is connected and an object detection processor 10A. However, the number of antenna branch processors of the radar receiver RxA of the radar apparatus 1A according to the embodiment is not limited to four; it suffices that the number of antenna branch processors be two or more.

Since the antenna branch processors D1-D4 have the same configuration, in the embodiment the antenna branch processor D1 will be described as an example. This also applies to each of the following embodiments.

In the second embodiment, a radar apparatus which uses a frequency-modulated radar transmission signal (e.g., chirp pulses) as in the radar apparatus shown in FIG. 2 may be configured as shown in FIG. 14.

By performing calculations according to Formula (24), each of antenna branch processors D1F-D4F produces, for each period (Tc×Nc) of Nc transmission cycles Tc, coherent addition results $FT\_CI^{Nant}(f_b, -Nf+1, w)$ to $FT\_CI^{Nant}(f_b, Nf, w)$ corresponding to 2Nf Doppler frequency components $f_s \Delta\theta$ of respective beat frequencies $f_b$.

[Formula 24]

$$FT\_CI^{Nant}(f_b, f_s, w) = \sum_{q=1}^{Nc} CI\_c(f_b, Nc(w-1)+q) \exp[-jq\theta(f_s)] \qquad (24)$$
$$= \sum_{q=1}^{Nc} CI\_c(f_b, Nc(w-1)+q) \exp[-jq2\pi f_s Tc)]$$

Next, the configurations and operations of the individual units of the radar receiver RxA will be described in detail with reference to FIG. 15.

The radar receiver Rx performs calculations cyclically in such a manner that each transmission cycle Tr of a radar transmission signal is made a signal processing internal of the signal processor of each of the antenna branch processors D1-D4. The operation of each of the antenna branch processors D1-D4 is the same as that of the antenna branch processor D1 of the radar receiver Rx of the radar apparatus 1 according to the first embodiment, and hence is not described here.

The object detection processor 10A is equipped with a regular data acquisition unit 20, a regular data memory 21, an amplitude variation width judgment threshold value generator 22, a measurement data acquisition unit 23, a measurement data memory 24, an amplitude variation width detection judgment unit 25, a measurement data selector 31, a distance-direction delay profile generator 30, and an object detection output unit 26.

Addition values $CI^1(k, m)$ to $CI^4(k, m)$ which are outputs of the adders of the signal processors of the antenna branch processors D1-D4, respectively, are input to the regular data acquisition unit 20 of the object detection processor 10A, the measurement data acquisition unit 23, the measurement data memory 24, and the distance-direction delay profile generator 30.

Also in each of the following embodiments, when the radar receiver has plural antenna branch processors, addition values $CI^1(k, m)$ to $CI^4(k, m)$ are input to the object detection processor in each embodiment from the respective antenna branch processors.

In this embodiment and each of the following embodiments, the regular data acquisition unit 20 may store, in the regular data memory 21, either one or all of regular addition values $CI^1(k, m)$ to $CI^4(k, m)$ received from the four respective antenna branch processors D1-D4.

In response to a judgment result to the effect that an object has been detected that is issued by the amplitude variation width detection judgment unit 25, the measurement data selector 31 selects a range bin k or a range bin k range corresponding to the judgment result and stores it in the measurement data memory 24.

The distance-direction delay profile generator 30 acquires measurement addition values $CI^1(k, m)$ to $CI^4(k, m)$ as outputs of the respective antenna branch processors D1-D4 corresponding to the selected range bin k from the measurement data memory 24 based on the range bin k selected by the measurement data selector 31.

Now, to simplify the description of the operations of the distance-direction delay profile generator 30, m of an example case of I=1 is replaced by an integer Co and a description will be made using Co (in this case, m varies in a range of 1 to To). However, the following description of the operation of distance-direction delay profile generator 30 is likewise applicable to the case that the integer I is larger than 1 in which the integer m varies in the range of To×(I−1)+1 to To×I. The measurement addition values $CI^1$ (k, Co) to $CI^4$(k, Co) acquired by the distance-direction delay profile generator 30 are expressed as a correlation vector h(k, Co) by Formula (25):

[Formula 25]

$$h(k, Co) = \begin{bmatrix} CI^1(k, Co) \\ CI^2(k, Co) \\ \vdots \\ CI^4(k, Co) \end{bmatrix} \quad (25)$$

The distance-direction delay profile generator 30 estimates an azimuth angle of an incoming direction of a reflection signal reflected from an object (target) using phase differences between the individual reception antennas of the reflection signal. Processing for estimating an azimuth angle in the distance-direction delay profile generator 30 will be described for an example case that it uses a Fourier method, the disclosure is not limited to such a case; for example a Capon method may be used.

More specifically, the distance-direction delay profile generator 30 calculates, according to Formula (26), a direction vector correlation power $F_{out}(k, Co, \theta_u)$ of a reflection reflected from an object by calculating the square of the inner product of the correlation vector h(k, Co) and a direction vector $a(\theta_u)$ which is stored in advance.

[Formula 26]

$$F_{out}(k, Co, \theta_u) = |a(\theta_u)^H h(k, Co)|^2 \quad (26)$$

In Formula (26), the direction vector $a(\theta_q)$ is an Na-th-order vector that represents complex responses of the respective reception antennas in a case that a reflection signal comes from a direction having an azimuth angle $\theta_u$. A direction vector $a(\theta_u)$ that represents complex responses of the respective reception antennas in each azimuth angle $\theta_u$ is determined in advance in, for example, an anechoic chamber and includes information relating to the coupling between the antenna elements of the reception antennas, and deviation information of amplitude errors and phase errors in addition to phase difference information that is calculated geometrically according to the intervals between the reception antennas. This applies to each of the following embodiments.

For example, where the elements of the reception antennas constituting an array antenna are arranged on a straight line at regular intervals d, an ideal direction vector $a(\theta_u)$ without any phase errors or amplitude errors between the reception antennas is given by Formula (27):

[Formula 27]

$$a(\theta_u) = \begin{bmatrix} 1 \\ \exp\{-j2\pi d\sin\theta_u/\lambda\} \\ \vdots \\ \exp\{-j2\pi(Na-1)d\sin\theta_u/\lambda\} \end{bmatrix} \quad (27)$$

The azimuth angle $\theta_u$ is a variable that varies for each predetermined interval $\Delta\theta$ in an estimation range [$\theta_{min}$, $\theta_{max}$] of a reflection signal incoming direction in the radar apparatus 1A and is given by Formula (28), for example. Parameter u is an integer that varies from 0 to NU, where NU is given by Formula (29). In Formula (29), floor[y] is a function that outputs a maximum integer that does not exceed an integer y.

[Formula 28]

$$\theta_u = \theta_{min} + u\Delta\theta \quad (28)$$

[Formula 29]

$$NU = \text{floor}[(\theta_{max} - \theta_{min})/\Delta\theta] + 1 \quad (29)$$

The distance-direction delay profile generator 30 detects a peak value (maximum value) of direction vector correlation power values $F_{DOA}(k, Co, \theta_u)$ in the azimuth angle $\theta_u$ range [$\theta_{min}$, $\theta_{max}$] for each range bin k selected by the measurement data selector 31. When a peak value of direction vector correlation power values $F_{DOA}(k, Co, \theta_u)$ corresponding to a selected range bin k is larger than or equal to a predetermined threshold value, the distance-direction delay profile generator 30 estimates that an azimuth angle $\theta_u$ that gives the peak value is an azimuth angle of an incoming direction of a reflection signal reflected from an object.

Furthermore, the distance-direction delay profile generator 30 calculates a distance D(k) from the radar apparatus 1A to the object (target) according to Formula (16) using the range bin k selected by the measurement data selector 31. The distance-direction delay profile generator 30 outputs data of the distance D(k) and the azimuth angle $\theta_u$ to the object detection output unit 26.

As is understood from the above description, the radar apparatus 1A according to this embodiment provides, in addition to the same advantages as the radar apparatus 1 according to the first embodiment does, an advantage that the radar apparatus 1A can estimate a distance D(k) from it to an object and an azimuth angle $\theta_u$ of the object with high accuracy based on direction vector correlation power values that are calculated using correlation vectors h(k, Co) each of which includes addition values CI(k, Co) that are outputs of the plural antenna branch processors D1-D4.

Furthermore, in the radar apparatus 1A, the range bin range for estimation of an azimuth angle $\theta_u$ can be restricted by the measurement data selector 31's selecting a range bin k that the amplitude variation width detection judgment unit 25 has used in making a judgment to the effect that an object exists, whereby the amount of calculation of the distance-direction delay profile generator 30 can be reduced, which means reduction of the power consumption of the radar apparatus 1A.

Although in the radar apparatus 1A direction vector correlation power values are calculated using a range bin k that the amplitude variation width detection judgment unit 25 has used in making a judgment to the effect that an object exists, direction vector correlation power values may be calculated using a range bin k that the amplitude variation width detection judgment unit 25 has used in making a judgment to the effect that no object exists. In this manner, by calculating direction vector correlation power values that reflect situations of the surroundings of the radar apparatus LA, the radar apparatus 1A can recognize situations of its broad surroundings.

(Embodiment 3)

A third embodiment is a mode in which unlike in the radar apparatus 1A according to the second embodiment a distance-direction delay profile is generated by calculating differences of additions values CI from a complex average of past 10 data, setting a judgment threshold value using regular data, and presence or absence of an object is judged (detected) using a distance-direction delay profile produced from data of complex differences-from-average. The configuration and operation of a radar apparatus 1B according to the third embodiment will be described below with reference to FIGS. 16-20.

Figure 16:
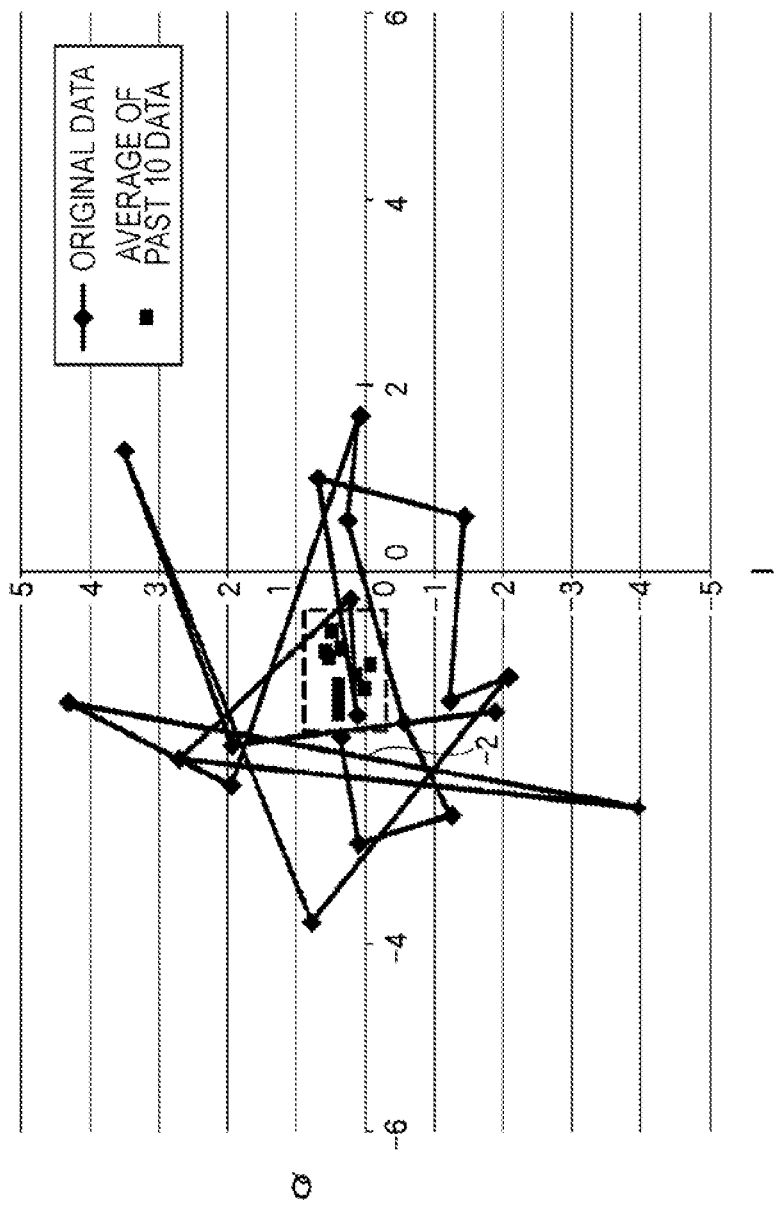
FIG. 16 is a graph showing an example set of addition values CI on the IQ plane in a case that a person exists.

FIG. 16 is a graph showing an example set of addition values CI on the IQ plane in a case that a person exists. The horizontal axis and the vertical axis of FIG. 16 represent the I axis and the Q axis of the IQ plane, respectively. When a person exists, there occurs a feature that amplitudes or power values of measurement addition values CI(k, Cs) (e.g., 1≤Cs≤50) fluctuate on the IQ plane. However, since the measurement addition values CI(k, Cs) include amplitudes or power values of ones without a person, the latter components need to be eliminated.

For example, in FIG. 16, diamond-shaped marks (connected to each other by solid lines) indicate measurement addition values CI(k, Cs) as original data and square marks (enclosed by a broken line) are complex averages $CI_{ave}$(k, Cs) of latest Ts (=10) measurement addition values CI(k, Cs) (e.g., 1≤Cs≤50).

The square marks are plotted in a certain restricted values (enclosed by a broken line) on the IQ plane and hence correspond to measurement addition values CI(k, Cs) without a person.

In view of the above, a complex averaging distance-direction delay profile generator 40b (described later) calculates complex differences-from-average by subtracting complex averages $CI_{ave}$(k, Cs) from measurement addition values CI(k, Cs) on the IQ plane as original data (e.g., 1≤Cs≤50), whereby components without a person are eliminated and fluctuations that occur in measurement addition values CI(k, Cs) when a person exists are thereby obtained. That is, components without a person can be eliminated by calculating averages of past 10 data and subtracts the calculated averages from the past 10 data.

Figure 17:
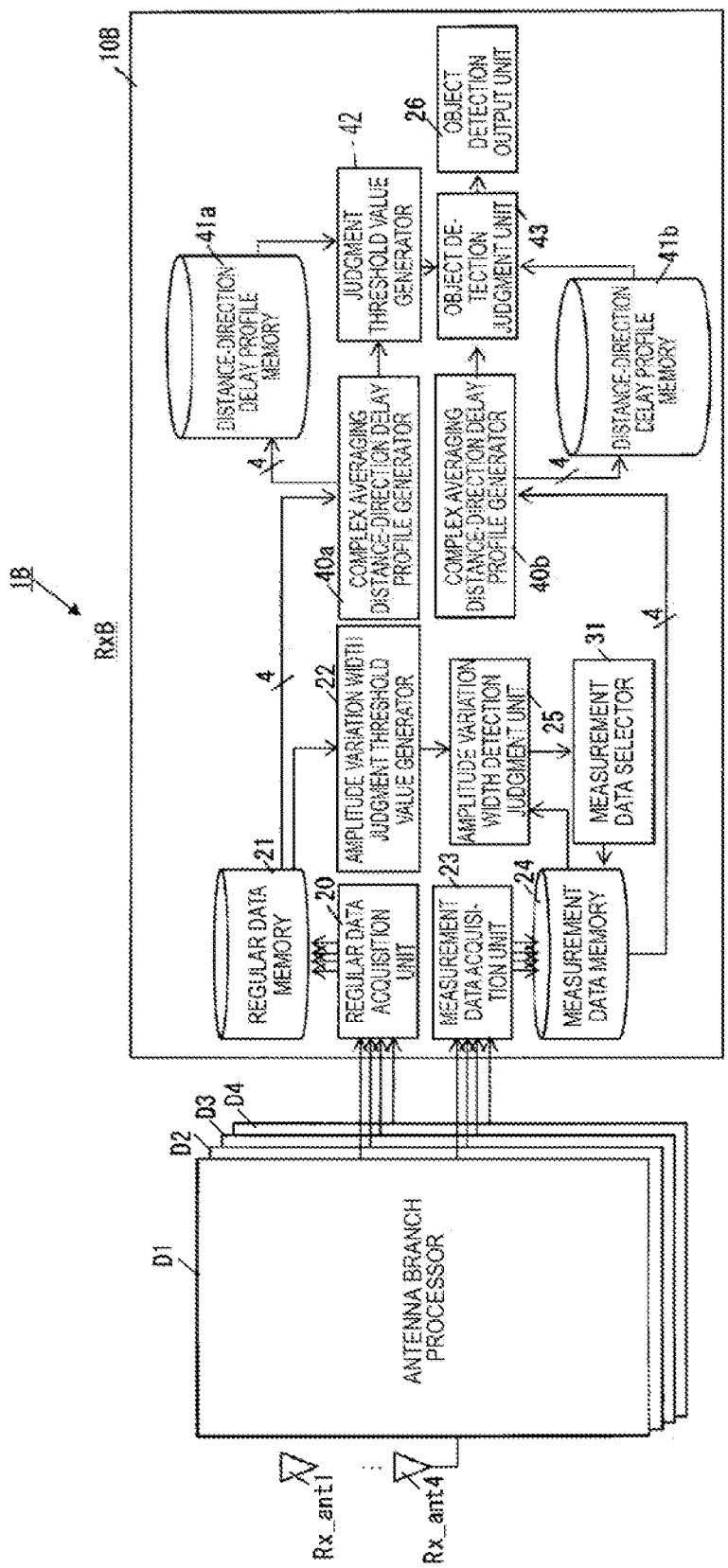
FIG. 17 is a block diagram showing, in detail, the internal configuration of a radar receiver of a radar apparatus according to a third embodiment.
Figure 18:
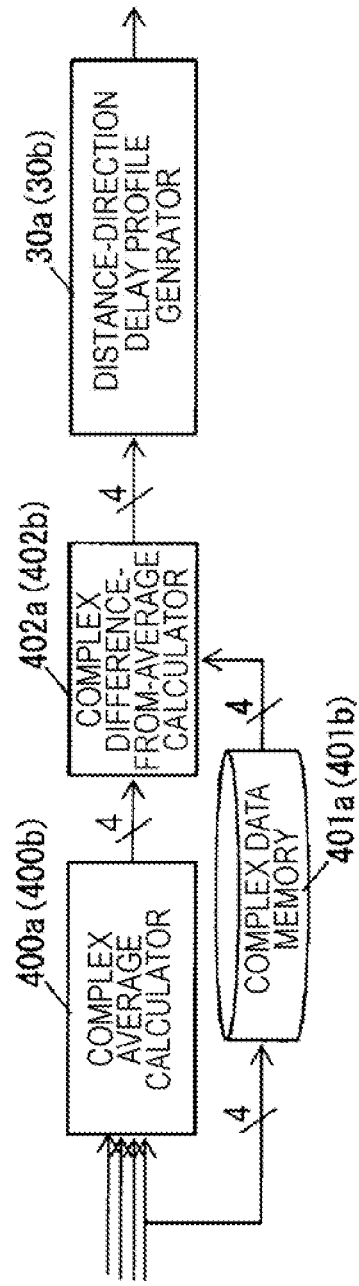
FIG. 18 is a block diagram showing, in detail, the internal configuration of each complex averaging distance-direction delay profile generator.

FIG. 17 is a block diagram showing, in detail, the internal configuration of a radar receiver RxB of the radar apparatus 1B according to the third embodiment. FIG. 18 is a block diagram showing, in detail, the internal configuration of each of complex averaging distance-direction delay profile generators 40a and 40b. In the following description of the configurations and operations of the radar apparatus 1A according to this embodiment, units having the same ones in the radar apparatus 1 according to the first embodiment or the radar apparatus 1A according to the second embodiment will be given the same symbols as the latter and descriptions therefore will be omitted or simplified; only different features will be described.

The radar apparatus 1B includes the reference signal generator Lo and the radar transmitter Tx shown in FIG. 1 or 13 and a radar receiver RxB shown in FIG. 17. The radar receiver RxB is equipped with the plural (e.g., four) antenna branch processors D1-D4 shown in FIG. 13 and an object detection processor 10B.

Next, the configurations and operations of the individual units of the radar receiver RxB will be described in detail with reference to FIGS. 17 and 18.

The operation of each of the antenna branch processors D1-D4 is the same as that of the radar receiver RxA of the radar apparatus 1A according to the second embodiment, and hence is not described here.

The object detection processor 10B is equipped with a regular data acquisition unit 20, a regular data memory 21, an amplitude variation width judgment threshold value generator 22, a measurement data acquisition unit 23, a measurement data memory 24, an amplitude variation width detection judgment unit 25, a measurement data selector 31, complex averaging distance-direction delay profile generators 40a and 40b, distance-direction delay profile memories 41a and 41b, a judgment threshold value generator 42, an object detection judgment unit 43, and an object detection output unit 26.

As shown in FIG. 18, the complex averaging distance-direction delay profile generator 40a (40b) is equipped with a complex average calculator 400a (400b), a complex data memory 401a (401b), a complex difference-from-average calculator 402a (402b), and a distance-direction delay profile generator 30a (30b).

The complex averaging distance-direction delay profile generator 40a, which is an example of a first distance-direction delay profile generator, calculates a distance-direction delay profile of regular addition values CI(k, Cs) that are outputs of the four antenna branch processors D1-D4 and stored in the regular data memory 21 by calculating their complex averages and complex differences-from-average. Cs is an integer that satisfies a relationship 1≤Cs≤Ts, where Ts is an integer that is smaller than or equal to To.

The complex average calculator 400a calculates complex averages $CI^{uu}_{ave}$(k) according to Formula (30) using Ts sets of regular addition values that are outputs of the four antenna branch processors D1-D4, that is, sets of regular addition values $CI^1$(k, Cs) to $CI^4$(k, Cs) obtained for each range bin k over transmission periods of Ts×Np×Tr. In Formula (30), uu represents the antenna branch processor number and, in the embodiment, is an integer that varies from 1 to 4. The complex average calculator 400a outputs the complex averages $CI^{uu}_{ave}$(k) calculated according to Formula (30) to a complex difference-from-average calculator 402a.

[Formula 30]

$$CI_{ave}^{uu}(k) = \frac{1}{Ts}\sum_{Cs=1}^{Ts} CI(k, Cs) \qquad (30)$$

The complex data memory 401a stores the Ts sets of regular addition values that are outputs of the four antenna branch processors D1-D4, that is, the sets of regular addition values $CI^1(k, Cs)$ to $CI^4(k, Cs)$ obtained for each range bin k over transmission periods of Ts×Np×Tr.

The complex difference-from-average calculator 402a calculates complex differences-from-average $CI^{uu}{}_{sa}(k, Cs)$ of the respective antenna branch processors according to Formula (31) using the complex averages $CI^{uu}{}_{ave}(k)$ and the sets of regular addition values $CI^1(k, Cs)$ to $CI^4(k, Cs)$ stored in the complex data memory 401a. The complex difference-from-average calculator 402a outputs the complex differences-from-average $CI^{uu}{}_{sa}(k, Cs)$ calculated according to Formula (31) to the distance-direction delay profile generator 30a.

[Formula 31]

$$CI^{uu}{}_{sa}(k,Cs) = CI^{uu}(k,Cs) - CI^{uu}{}_{ave}(k) \qquad (31)$$

The distance-direction delay profile generator 30a calculates, according to Formula (32), a distance-direction delay profile HM(k, Cs, cc) of a reflection signal reflected from an object by calculating the square of the inner product of a correlation vector h(k, Cs) (see Formula (25)) formed by a total of four complex average $CI^{uu}{}_{sa}(k)$ and a direction vector a(cc) stored in advance. The direction vector a(cc) is the same as the above-described direction vector $a(\theta_u)$ used in the second embodiment, and hence a description therefor will be omitted. Parameter cc represents the azimuth angle which corresponds to the azimuth angle $\theta_u$ used in the second embodiment.

[Formula 32]

$$HM(k,Cs,cc) = |a(cc)^H h(k,Cs)|^2 \qquad (32)$$

The distance-direction delay profile generator 30a stores, in the distance-direction delay profile memory 41a, (Tb−Ts) distance-direction delay profiles HM(k, Cs, cc) that have been calculated according to Formula (32) for each range bin k and each azimuth angle cc until parameter Co (used in the first embodiment) reaches To (see FIG. 5(B)).

The distance-direction delay profile memory 41a stores the (To−Ts) distance-direction delay profiles HM(k, Cs, cc) calculated by the complex averaging distance-direction delay profile generator 40a.

The judgment threshold value generator 42, which is an example of a second judgment threshold value generator, calculates a cumulative probability distribution of distance-direction delay profiles based on the distance-direction delay profiles for each range bin k and each azimuth angle cc that are stored in the distance-direction delay profile memory 41a. The judgment threshold value generator 42 sets a power value above which the cumulative probability distribution of distance-direction delay profiles for each range bin k and each azimuth angle cc is larger than or equal to a predetermined value (e.g., 98%) as a second judgment threshold value HM_bg(k, cc) for each range bin k and each azimuth angle cc which is to be used for detection of presence or absence of an object (target). The judgment threshold value generator 42 outputs the second judgment threshold value HM_bg(k, cc) to the object detection judgment unit 43.

The complex average calculator 400b, which is an example of a second distance-direction delay profile generator, calculates complex averages and complex differences-from-average of part, corresponding to each of range bins Cv(ii) selected by the measurement data selector 31, of measurement addition values CI(k, Cs) that are outputs of the four antenna branch processors D1-D4 and stored in the measurement data memory 24 and thereby calculates a distance-direction delay profile of the measurement addition values CI(k, Cs). Parameter ii is an integer that satisfies a relationship 1≤ii≤Tv, where Tv is a maximum value of the range bins selected by the measurement data selector 31.

The complex average calculator 400b calculates complex averages $CIU^{uu}{}_{ave}(Cv(ii))$ according to Formula (33) using Ts sets of measurement addition values that are outputs of the four antenna branch processors D1-D4, that is, sets of measurement addition values $CI^1(Cv(ii), Cs)$ to $CI^4(Cv(ii), Cs)$ obtained for each range bin Cv(ii) over transmission periods of Ts×Np×Tr. The complex average calculator 400b outputs the complex averages $CI^{uu}{}_{ave}(Cv(ii))$ calculated according to Formula (33) to a complex difference-from-average calculator 402b.

[Formula 33]

$$CI_{ave}^{uu}(Cv(ii)) = \frac{1}{Ts}\sum_{Cs=1}^{Ts} CI(Cv(ii), Cs) \qquad (33)$$

The complex data memory 401b stores the Ts sets of measurement addition values that are outputs of the four antenna branch processors D1-D4, that is, the sets of measurement addition values $CI^1(Cv(ii), Cs)$ to $CI^4(Cv(ii), Cs)$ obtained for each range bin Cv(ii) over transmission periods of Ts×Np×Tr.

The complex difference-from-average calculator 402b calculates complex differences-from-average $CI^{uu}{}_{sa}(Cv(ii), Cs)$ according to Formula (34) using the complex averages $CI^{uu}{}_{ave}(Cv(ii))$ and the sets of measurement addition values $CI^1(Cv(ii), Cs)$ to $CI^4(Cv(ii), Cs)$ stored in the complex data memory 401b. The complex difference-from-average calculator 402b outputs the complex average $CI^{uu}{}_{sa}(Cv(ii), Cs)$ calculated according to Formula (34) to a distance-direction delay profile generator 30b.

[Formula 34]

$$CI^{uu}{}_{sa}(Cv(ii),Cs) = CI^{uu}(Cv(ii),Cs) - CI^{uu}{}_{ave}(Cv(ii)) \qquad (34)$$

The distance-direction delay profile generator 30b calculates, according to Formula (35), a distance-direction delay profile HM(Cv(ii), Cs, cc) of a reflection signal reflected from an object by calculating the square of the inner product of a correlation vector h(Cv(ii), Cs) (see Formula (25)) formed by a total of four complex differences-from-average $CI^{uu}{}_{sa}(Cv(ii))$ and a direction vector a(cc) stored in advance.

[Formula 35]

$$HM(Cv(ii),Cs,cc) = |a(cc)^H h(Cv(ii),Cs)|^2 \qquad (35)$$

The distance-direction delay profile generator 30b stores, in the distance-direction delay profile memory 41b, distance-direction delay profiles HM(Cv(ii), Cs, cc) that have been calculated according to Formula (31) for each range bin Cv(ii) and each azimuth angle cc.

The distance-direction delay profile memory 41b stores the distance-direction delay profiles HM(Cv(ii), Cs, cc) calculated by the complex averaging distance-direction delay profile generator 40b.

The object detection judgment unit 43 compares the distance-direction delay profiles HM(Cv(ii), Cs, cc) stored in the distance-direction delay profile memory 41b with the second judgment threshold value HM_bg(k, cc) that has been set by the judgment threshold value generator 42. The object detection judgment unit 43 judges (detects) presence or absence of an object (target) according to results of the comparison between the distance-direction delay profiles HM(Cv(ii), Cs, cc) stored in the distance-direction delay profile memory 41b and the second judgment threshold value HM_bg(k, cc) that has been set by the judgment threshold value generator 42 (the details will be described later with reference to FIG. 20). The object detection judgment unit 43 outputs result of the judgment (detection) as to presence or absence of an object to the object detection output unit 26.

Figure 19:
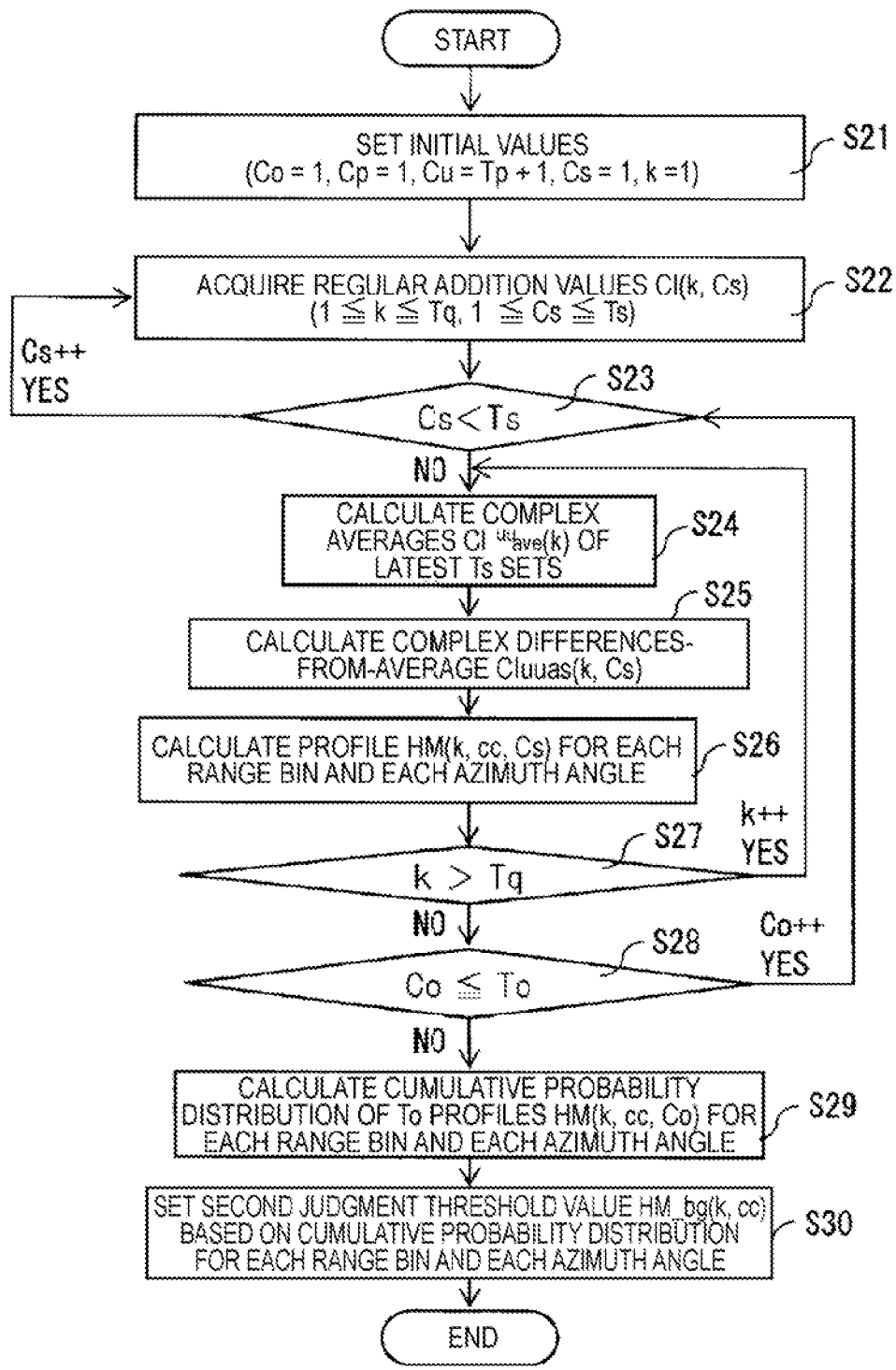
FIG. 19 is a flowchart of an operation procedure of a regular process of the radar apparatus according to the third embodiment which uses regular addition values.
Figure 20:
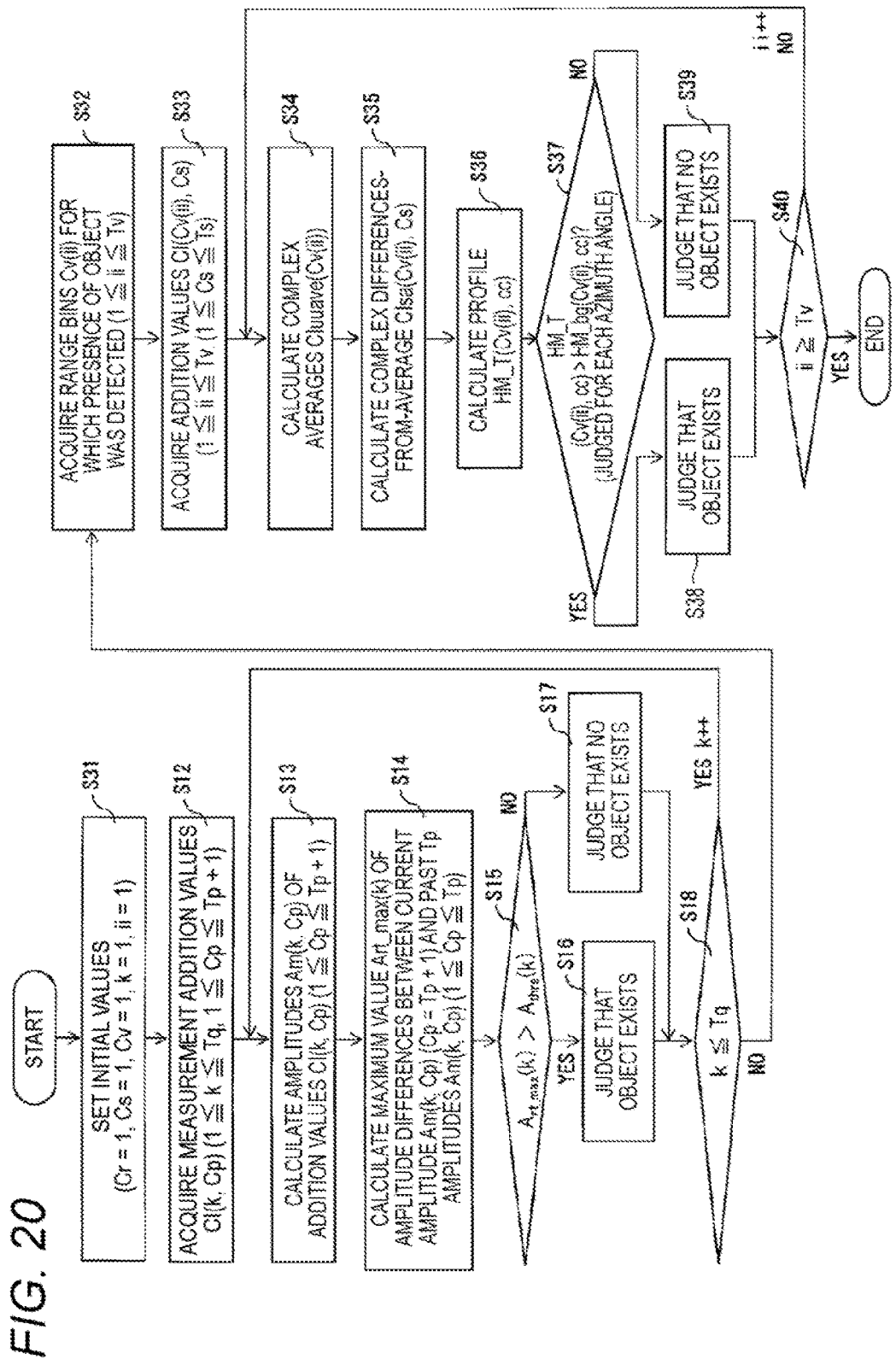
FIG. 20 is a flowchart of an operation procedure of a successive process of the radar apparatus according to the third embodiment which uses measurement addition values.

FIG. 19 is a flowchart of an operation procedure of a regular process of the radar apparatus according to the third embodiment which uses regular addition values. FIG. 20 is a flowchart of an operation procedure of a successive process of the radar apparatus according to the third embodiment which uses measurement addition values.

First, the regular process which is executed by the object detection processor 10B will be described with reference to FIG. 19. The process shown in the flowchart of FIG. 19 is executed following the regular process of FIG. 10(A).

Referring to FIG. 19, the regular data acquisition unit 20 sets parameter Co, parameter Cp, parameter Cs, and the range bin k at an initial value "1" and sets parameter Cu at Tp+1 (step S21). Tp is an integer that is larger than or equal to 1. Then the object detection processor 10B acquires a regular addition value CI(k, Co) from the regular data memory 21 until parameter Co becomes equal to Ts (step S22). Co is an integer that satisfies a relationship $1 \leq Co \leq To$, and Tq is a maximum value of the range bin k ($1 \leq k \leq Tq$).

When parameter Cs is smaller than Ts (S23: yes), the complex averaging distance-direction delay profile generator 40a increments parameter Cs by 1 to repeatedly execute step S22 until parameter Cs becomes equal to Ts.

When parameter Cs has become equal to Ts (S23: no), the complex averaging distance-direction delay profile generator 40a calculates complex averages $CI^{uu}_{ave}(k)$ according to Formula (30) using the Ts sets of regular addition values obtained from the antenna branch processors D1-D4 (step S24). Then the complex averaging distance-direction delay profile generator 40a calculates complex differences-from-average $CI^{uu}_{sa}(k, Cs)$ for the respective antenna branch processors according to Formula (31) using the complex averages $CI^{uu}_{ave}(k)$ and the regular addition values $CI^1(k, Cs)$ to $CI^4(k, Cs)$ stored in the complex data memory 401a (step S25).

Subsequently, the complex averaging distance-direction delay profile generator 40a calculates, according to Formula (32), a distance-direction delay profile HM(k, Cs, cc) of a reflection signal reflected from an object by calculating the square of the inner product of a correlation vector h(k, Cs) formed by a total of four complex average $CI^{uu}_{sa}(k)$ and a direction vector a(cc) stored in advance (step S26). After the execution of step S26, when the range bin k is smaller than Tq (S27: yes), the complex averaging distance-direction delay profile generator 40a increments the range bin k by 1 to repeatedly execute steps S24-S26 until the range bin k becomes equal to Tq.

After the range bin k has become equal to Tq (S27: no), when parameter Co is smaller than To, (S28: yes), the complex averaging distance-direction delay profile generator 40a increments parameter Co by 1 to repeatedly execute steps S24-S27 until parameter Co becomes equal to To while shifting the regular addition value CI(k, Co) used in steps S24-S27 one by one.

When parameter Co has become equal to To (S28: no), the judgment threshold value generator 42 calculates a cumulative probability distribution of distance-direction delay profiles based on distance-direction delay profiles for each range bin k and each azimuth angle cc that are stored in the distance-direction delay profile memory 41a (step S29).

The judgment threshold value generator 42 sets a power value above which the cumulative probability distribution of distance-direction delay profiles for each range bin k and each azimuth angle cc is larger than or equal to a predetermined value (e.g., 98%) as a second judgment threshold value HM_bg(k, cc) for each range bin k and each azimuth angle cc which is to be used for detection of presence or absence of an object (target) (step S30).

The judgment threshold value generator 42 outputs the second judgment threshold value HM_bg(k, cc) to the object detection judgment unit 43. Upon the execution of step S30, the regular process of FIG. 19 is finished.

Next, the successive process which is executed by the object detection processor 10B will be described with reference to FIG. 20. In the description to be made with reference to FIG. 20, steps having the same ones in FIG. 10(B) will be given the same step numbers as the latter and descriptions therefor will be omitted; only different features will be described.

Referring to FIG. 20, the measurement data acquisition unit 23 sets parameters Cr, Cs, Cv, k, and ii at an initial value "1" (step S31). Steps S12-S18 which follow step S31 are the same as steps S12-S18 shown in FIG. 10(B), descriptions therefor will be omitted.

After parameter k became equal to Tq at step S18 (S18: no), the complex averaging distance-direction delay profile generator 40b acquires range bins Cv(ii) that have been selected by the measurement data selector 31 among the range bins of the measurement addition values CI(k, Cs) which are outputs of the four antenna branch processors D1-D4 and are stored in the measurement data memory 24 (step S32). Parameter ii is an integer that satisfies a relationship $1 \leq Cs \leq Ts$.

The complex averaging distance-direction delay profile generator 40b acquires measurement addition values $CI^1(Cv(ii), Cs)$ to $CI^4(Cv(ii), Cs)$ corresponding to each of the range bins Cv(ii) acquired at step S32 until parameter Cs becomes equal to Ts (step S33). Parameter Cs is an integer that satisfies a relationship $1 \leq Cs \leq Ts$.

The complex averaging distance-direction delay profile generator 40b calculates complex averages $CI^{uu}_{ave}(Cv(ii))$ according to Formula (33) using Ts sets of measurement addition values $CI^1(Cv(ii), Cs)$ to $CI^4(Cv(ii), Cs)$ as outputs of the antenna branch processors D1-D4 (step S34).

Then the complex averaging distance-direction delay profile generator 40b calculates complex differences-from-average $CI^{uu}_{sa}(Cv(ii), Cs)$ according to Formula (34) using the complex averages $CI^{uu}_{ave}(Cv(ii))$ and sets of measurement addition values $CI^1(Cv(ii), Cs)$ to $CI^4(Cv(ii), Cs)$ stored in the complex data memory 401b (step S35).

Subsequently, the complex averaging distance-direction delay profile generator 40b calculates, according to Formula (35), a distance-direction delay profile HM(Cv(ii), Cs, cc) of a reflection signal reflected from an object by calculating the square of the inner product of a correlation vector h(Cv(ii), Cs) formed by a total of four complex average $CI^{uu}_{sa}(Cv(ii))$ and a direction vector a(cc) stored in advance (step S36).

The object detection judgment unit 43 compares, for each azimuth angle cc, the distance-direction delay profile HM(Cv(ii), Cs, cc) calculated at step S36 with the second judgment threshold value HM_bg(k, cc) that was set at step S30 shown in FIG. 19 (step S37).

When the distance-direction delay profile HM(Cv(ii), Cs, cc) is larger than the second judgment threshold value HM_bg(k, cc) (S37: yes), the object detection judgment unit 43 judges that an object (target) exists (i.e., an object has been detected) (step S38). The object detection judgment unit 43 outputs the judgment result of step S38 to the object detection output unit 26.

On the other hand, when the distance-direction delay profile HM(Cv(ii), Cs, cc) is smaller than or equal to the second judgment threshold value $HM_{13}$ bg(k, cc) (S37: no), the object detection judgment unit 43 judges that no object (target) exists (i.e., no object has been detected) (step S39). The amplitude variation width detection judgment unit 25 outputs the judgment result of step S17 to the object detection output unit 26.

After the execution of step S38 or S39, when parameter ii of the range bin Cv(ii) is smaller than Tv (S40: no), the complex averaging distance-direction delay profile generator 40b increments parameter ii by 1 to repeatedly execute steps S34-S36 until parameter ii of the range bin Cv(ii) becomes equal to Tv. When parameter ii of the range bin Cv(ii) has become equal to Tv, the successive process of FIG. 20 is finished.

Figure 21:
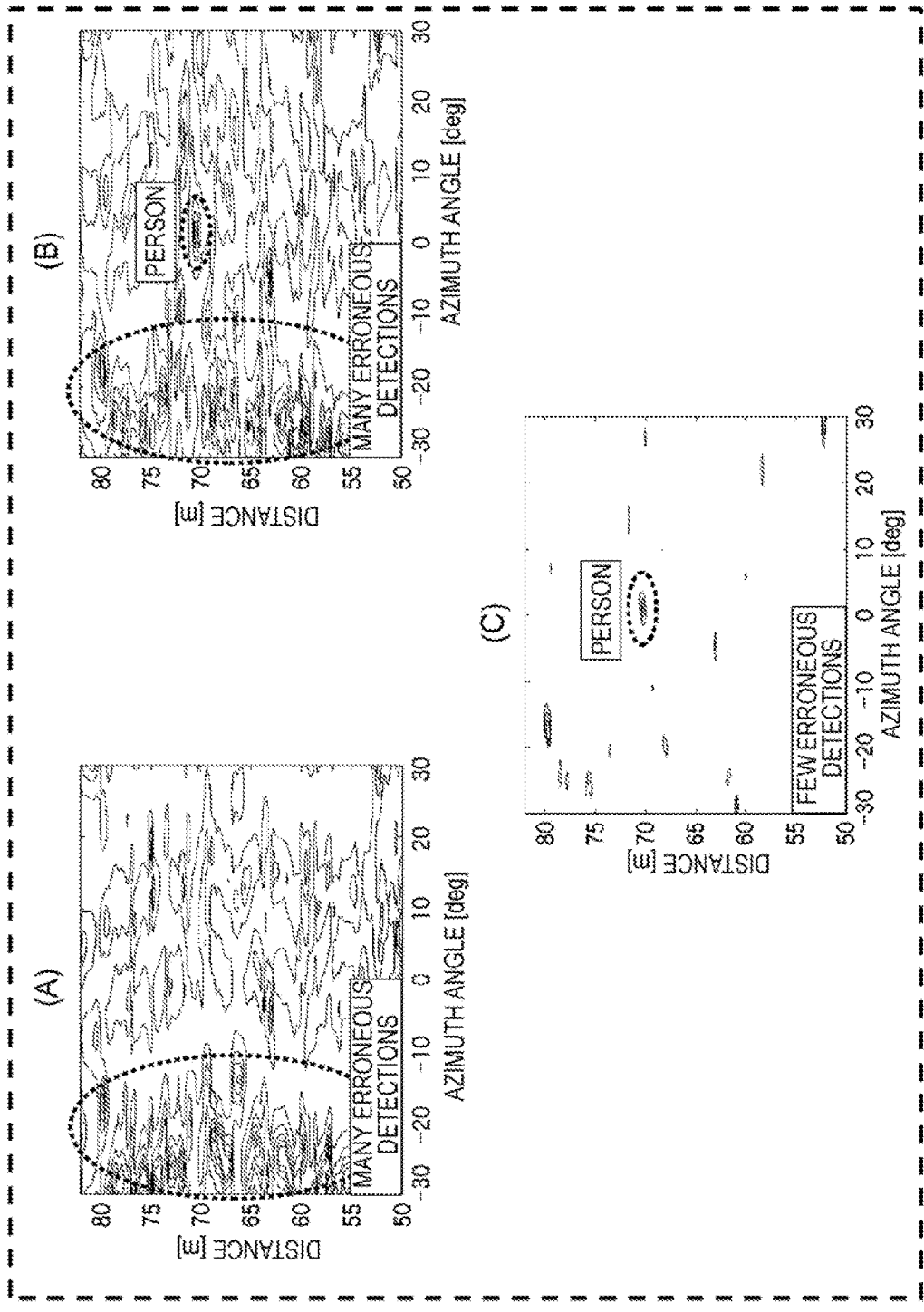
FIG. 21 includes (A) a graph showing an example measurement result of a person in a conventional radar apparatus, (B) a graph showing an example measurement result of a person of a case that the person is extracted by using complex averaging but the second judgment threshold value HM_bg(k, cc) of the radar apparatus according to the third embodiment is not used, and (C) a graph showing an example measurement result of a person of a case that the second judgment threshold value HM_bg(k, cc) of the radar apparatus according to the third embodiment is used.

FIG. 21(A) is a graph showing an example measurement result of a person in a conventional radar apparatus. FIG. 21(B) is a graph showing an example measurement result of a person of a case that the person is extracted by using complex averaging but the second judgment threshold value HM_bg(k, cc) of the radar apparatus according to the third embodiment is not used.

FIG. 21(C) is a graph showing an example measurement result of a person of a case that the second judgment threshold value HM_bg(k, cc) of the radar apparatus according to the third embodiment is used.

FIGS. 21(A)-21(C) show measurement data of a case that a person is exists at a location that is distant from the radar apparatus 1B by 70 m for example. As for the measurement data, for example, parameter uu of measurement addition values $CI^{uu}$(k, Cs) is 1 to 4, parameter Cs varies from 1 to 20, and the range bin Cv(ii) varies from 213 to 350. The horizontal axis of each of FIGS. 21(A)-21(C) represents the azimuth angle (deg.) and the vertical axis of each of FIGS. 21(A)-21(C) represents the distance (m).

In the description to be made with reference to FIGS. 21(A)-21(C), to clarify advantages of the radar apparatus 1B according to the embodiment, advantages that are provided by the same operations as of the radar apparatus 1 according to the first embodiment will be omitted and advantages obtained by the operations of the complex averaging distance-direction delay profile generators 40a and 40b, the distance-direction delay profile memories 41a and 41b, the judgment threshold value generator 42, and the object detection judgment unit 43 will be described.

In the example of FIG. 21(A), detection of a person is difficult because the person (target) exists at the location that is far from the radar apparatus 1B and hence the power values of measurement addition values CI(k, Cr) attenuate to be buried in noise or clutter.

In the example of FIG. 21(B), a complex average is subtracted from regular addition values or measurement addition values for each range bin k or Cv(ii) in the complex averaging distance-direction delay profile generator 40a or 40b and hence regular addition values or measurement addition values without a person are eliminated. Therefore, the graph of FIG. 21(B) is higher in the accuracy of detection of a person of the radar apparatus than the graph of FIG. 21(A).

FIG. 21(C) shows a result of detection of presence or absence of a person of a case that the object detection judgment unit 43 uses results of comparison between distance-direction delay profiles HM(Cv(ii), Cs, cc) of a reflection signal reflected from an object and a second judgment value HM_bg(k, cc). Therefore, in the graph of FIG. 21(C), influences of obstacles (e.g., buildings) other than the person that produce large power values are eliminated, as a result of which the accuracy of detection of a person of the radar apparatus is higher than in the graphs of FIGS. 21(A) 21(B).

As is understood from the above description, the radar apparatus 1B according to this embodiment not only provides the same advantages as the radar apparatus 1 according to the first embodiment, but also calculates a complex averaging distance-direction delay profile using a correlation vector including regular addition values or measurement addition values as outputs of the plural antenna branch processors D1-D4 and a direction vector and judges (detects) presence or absence of an object based on a result of comparison between a second threshold value the calculated complex averaging distance-direction delay profile.

As a result, in the radar apparatus 1B, influences of obstacles (e.g., buildings) other than, for example, person that produce large power values are eliminated, whereby the accuracy of detection of an object (target) such as a person can be increased further.

Although in the embodiment the judgment threshold value generator 42 sets, as a second judgment threshold value HM_bg(k, cc), a power value above which the of distance-direction delay profiles for each range bin k and each azimuth angle cc is larger than or equal to 98%, the criterion (e.g., one using a cumulative probability distribution) for setting of a second judgment threshold value HM_bg(k, cc) may be changed according to the situation of acquisition of regular data.

(Embodiment 4)

A fourth embodiment is a mode in which unlike in the radar apparatus 1 according to the first embodiment processing is performing using vehicle information. The configuration and operation of a radar apparatus 1C according to the fourth embodiment will be described with reference to FIGS. 19 and 20. FIG. 19 is a block diagram showing, in detail, the internal configuration of a radar receiver RxF of the radar apparatus 1C according to the fourth embodiment. In the following description of the configurations and operations of the individual units of the radar apparatus 1C according to this embodiment, units having the same ones in the radar apparatus 1 according to the first embodiment will be given the same symbols as the latter and descriptions therefore will be omitted or simplified; only different features will be described.

In the fourth embodiment, a mechanism for detecting an object with a low probability of occurrence of an erroneous detection even in a state that the radar apparatus 1C is moving. More specifically, in the radar apparatus 1C according to this embodiment, the judgment threshold value that is used in the radar apparatus 1 according to the first embodiment for object presence judgment (detection) is switched according to the situation in which the radar apparatus 1C is placed. As a result, a judgment threshold value is acquired from a database in a situation that it cannot be acquired from an environment (e.g., the vehicle is moving), whereby an object can be detected with a low probability of occurrence of an erroneous detection.

Furthermore, in the radar apparatus 1C according to the embodiment, a judgment threshold value suitable for an environment can be acquired in a situation that a judgment threshold value can be acquired from the environment.

With the above feature, by detecting a person using a judgment threshold value existing in a database, the radar apparatus 1C according to the embodiment can also be used in a situation that is it is not fixed, that is, in a situation that unlike in the first embodiment it is difficult to use data that are acquired regularly because of a movement.

Figure 22:
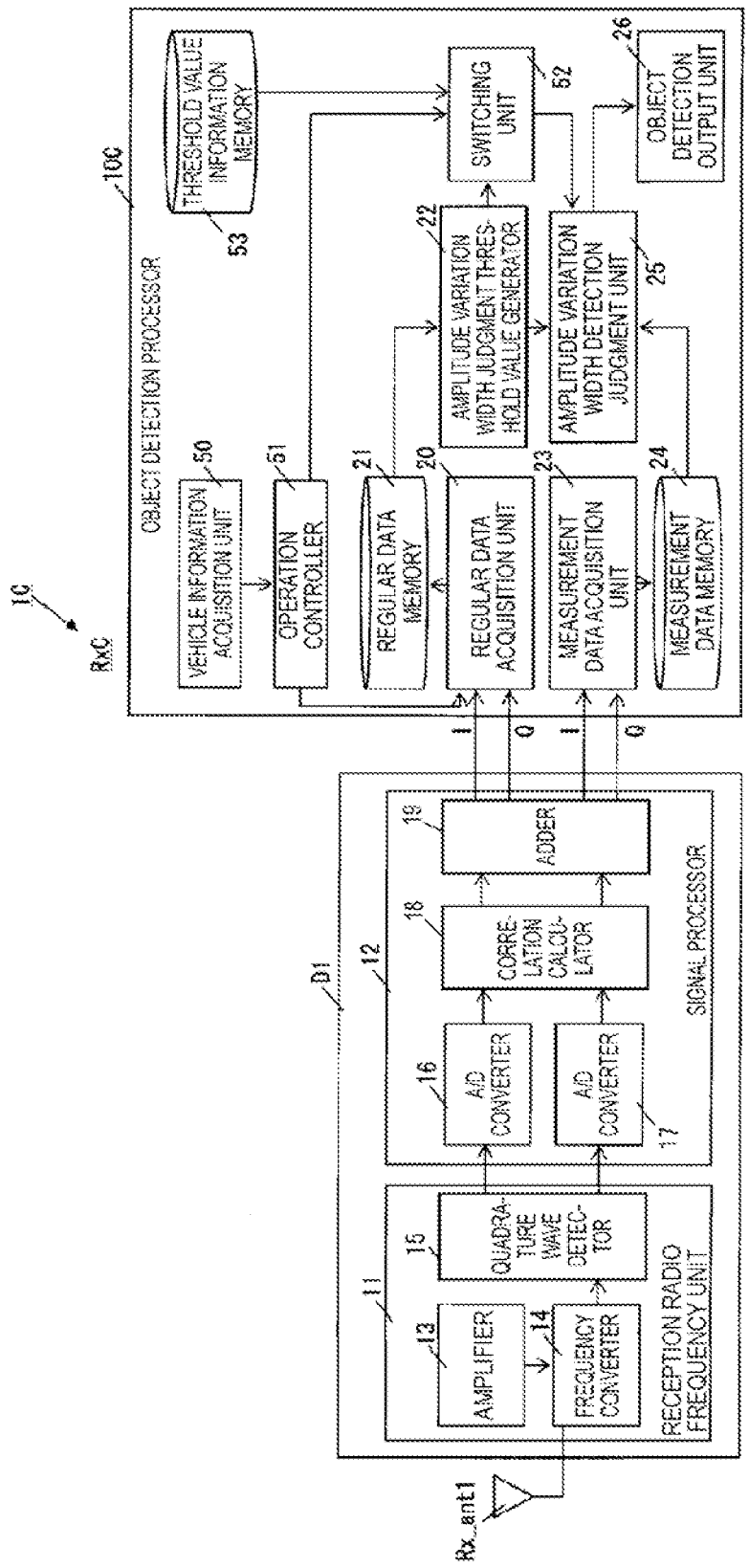
FIG. 22 is a block diagram showing, in detail, the internal configuration of a radar receiver of a radar apparatus according to a fourth embodiment.

The radar apparatus 1C is equipped with the reference signal generator Lo and the radar transmitter Tx shown in FIG. 1 and a radar receiver RxF shown in FIG. 22. As shown in FIG. 22, the radar receiver RxF is equipped with a single antenna branch processor D1 and an object detection processor 10C. The radar apparatus 1C is installed in a movable body (e.g., vehicle) as an example vehicular device. The movable body in each of the following embodiments is described as the vehicle, but the movable body is not limited to the vehicle.

Next, the configurations and operations of the individual units of the radar receiver RxF will be described in detail with reference to FIG. 22.

The operation of the antenna branch processor D1 is the same as that provided in the radar receiver Rx of the radar apparatus 1 according to the first embodiment, and a description therefor will be omitted.

The object detection processor 10C is equipped with a regular data acquisition unit 20, a regular data memory 21, an amplitude variation width judgment threshold value generator 22, a measurement data acquisition unit 23, a measurement data memory 24, an amplitude variation width detection judgment unit 25, an object detection output unit 26, a vehicle information acquisition unit 50, an operation controller 51, a switching unit 52, and a threshold value information memory 53.

The vehicle information acquisition unit 50, which is an example of a movement state acquisition unit, acquires information relating to the vehicle in which the radar apparatus 1C is installed. For example, the term "information relating to the vehicle" means such information as whether or not the engine is in operation or whether the vehicle is stopped or not. The vehicle information acquisition unit 50 outputs the information relating to the vehicle to the operation controller 51.

The operation controller 51 outputs, to the switching unit 52, according to the information relating to the vehicle received from the vehicle information acquisition unit 50, a control signal for switching the judgment threshold value for judgment (detection) of presence or absence of an object to a judgment threshold value $A_{thre}(k)$ calculated by the amplitude variation width judgment threshold value generator 22 or a judgment threshold value Z that is stored in advance in the threshold value information memory 53.

Furthermore, when having output, to the switching unit 52, a control signal for switching to a judgment threshold value $A_{thre}(k)$ calculated by the amplitude variation width judgment threshold value generator 22, the operation controller 51 causes the regular data acquisition unit 20 to acquire regular measurement values CI(k, Co) from the antenna branch processor D1.

The switching unit 52, which is an example of a first switching unit, switches, according to a control signal received from the operation controller 51, the judgment threshold value for judgment (detection) of presence or absence of an object to a judgment threshold value $A_{thre}(k)$ calculated by the amplitude variation width judgment threshold value generator 22 or the judgment threshold value Z that is stored in advance in threshold value information memory 53, and outputs the resulting judgment threshold value to the amplitude variation width detection judgment unit 25.

More specifically, for example, when the vehicle is in a state that its engine is not in operation, which means that the vehicle is stopped and hence it is highly probable that a judgment threshold value $A_{thre}(k)$ calculated by the amplitude variation width judgment threshold value generator 22 can be used, the switching unit 52 uses the judgment threshold value $A_{thre}(k)$. For another example, when the vehicle is in a state that its engine is in operation but the wheels operation state is a neutral state, the switching unit 52 uses the judgment threshold value Z stored in the threshold value information memory 53.

The threshold value information memory 53, which is an example of a first judgment threshold value storage unit, is stored with the judgment threshold value Z obtained by a simulation or an actual measurement in advance.

The amplitude variation width detection judgment unit 25 compares a maximum amplitude difference (absolute value) $A_{max}(k)$ calculated according to Formula (15) with the judgment threshold value $A_{thre}(k)$ or the judgment threshold value Z received from the switching unit 52. When the maximum amplitude difference (absolute value) $A_{max}(k)$ is larger than the judgment threshold value $A_{thre}(k)$ or the judgment threshold value Z, the amplitude variation width detection judgment unit 25 judges that an object (target) has been detected (object presence or absence detection result). The amplitude variation width detection judgment unit 25 outputs the judgment result to the object detection output unit 26.

On the other hand, when the maximum amplitude difference (absolute value) $A_{max}(k)$ is smaller than or equal to the judgment threshold value $A_{thre}(k)$ or the judgment threshold value Z, the amplitude variation width detection judgment unit 25 judges that no object (target) has been detected (object presence or absence detection result). The amplitude variation width detection judgment unit 25 outputs the judgment result to the object detection output unit 26.

Figure 23:
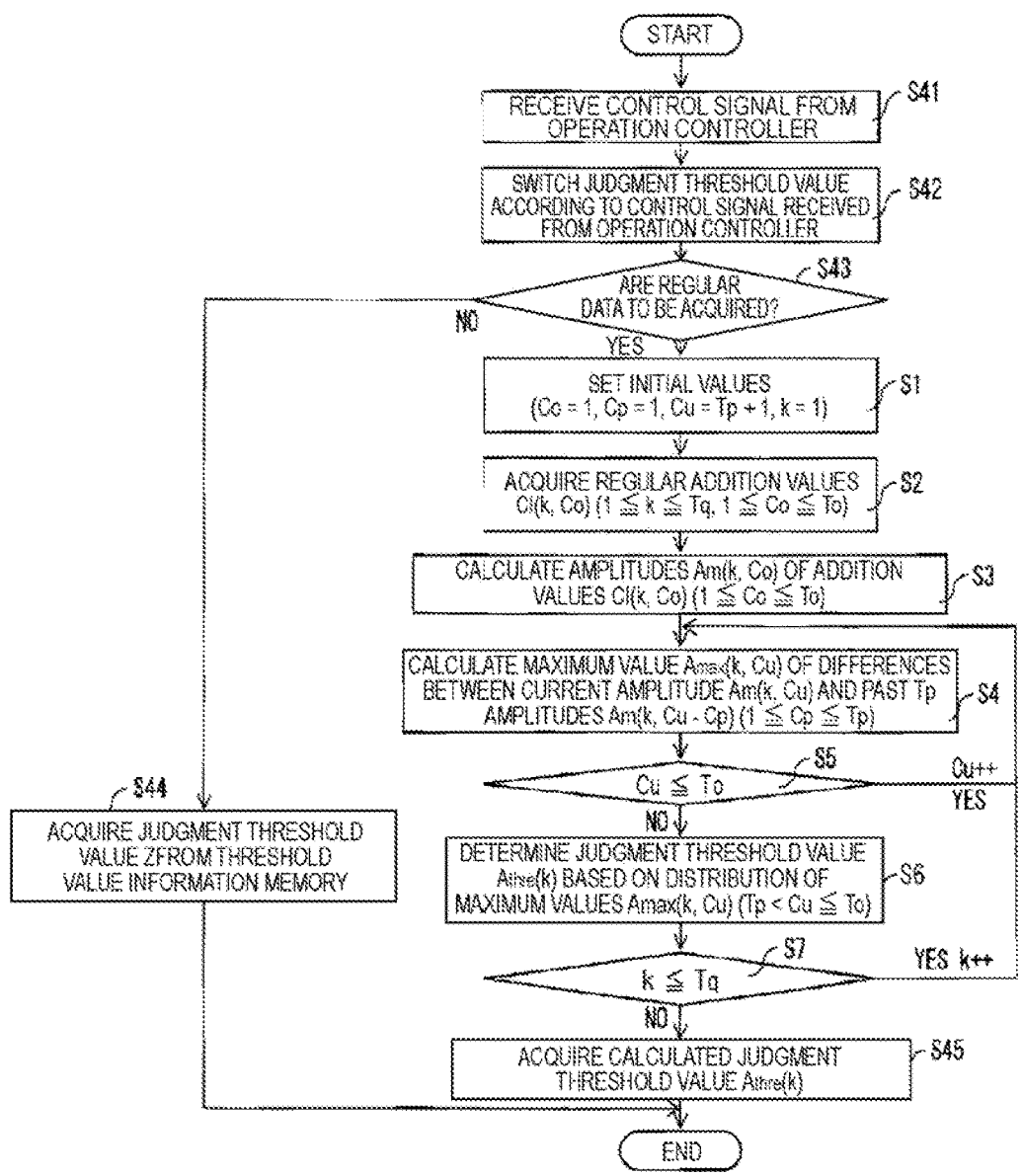
FIG. 23 is a flowchart of an operation procedure of a regular process that is executed by the radar apparatus according to the fourth embodiment using a regular data memory or a threshold value information memory.

Next, a regular process that is executed by the radar apparatus 10C will be described with reference to FIG. 23. FIG. 23 is a flowchart of an operation procedure of the regular process which is executed by the radar apparatus 1C using the regular data memory 21 or the threshold value information memory 53. In the description to be made with reference to FIG. 23, steps having the same ones in FIG. 10(A) will be given the same symbols as the latter and descriptions therefor will be simplified or omitted; only different features will be described.

The following assumptions are made for the description to be made with reference to FIG. 23. The vehicle information acquisition unit 50 acquires information relating to the vehicle in which the radar apparatus 1C is installed and outputs it to the operation controller 51. According to the information relating to the vehicle received from the vehicle information acquisition unit 50, the operation controller 51 outputs, to the switching unit 52, a control signal for switching the judgment threshold value for judgment (detection) of presence or absence of an object to a judgment threshold value $A_{thre}(k)$ calculated by the amplitude variation width judgment threshold value generator 22 or a judgment threshold value Z that is stored in advance in the threshold value information memory 53.

When having output, to the switching unit 52, a control signal for switching to a judgment threshold value $A_{thre}(k)$ calculated by the amplitude variation width judgment threshold value generator 22, the operation controller 51 causes the regular data acquisition unit 20 to acquire regular measurement values CI(k, Co) from the antenna branch processor D1.

Referring to FIG. 23, the switching unit 52 is configured to switch, according to the control signal received from the operation controller 51, the judgment threshold value for judgment (detection) of presence or absence of an object to a judgment threshold value $A_{thre}(k)$ calculated by the amplitude variation width judgment threshold value generator 22 or the judgment threshold value Z that is stored in advance in threshold value information memory 53, and to output the resulting judgment threshold value to the amplitude variation width detection judgment unit 25 (steps S41 and S42).

When the operation controller 51 is to cause the regular data acquisition unit 20 to acquire regular measurement values CI(k, Co) from the antenna branch processor D1 (S43: yes), steps S1-S7 shown in FIG. 10(B) are executed after the execution of step S43.

On the other hand, when the operation controller 51 is not to cause the regular data acquisition unit 20 to acquire regular measurement values CI(k, Co) from the antenna branch processor D1, that is, when the switching unit 52 has output the judgment threshold value Z to the amplitude variation width detection judgment unit 25 (S43: no), the amplitude variation width detection judgment unit 25 uses the judgment threshold value Z received from the switching unit 52 as a judgment threshold value for judgment (detection) of presence or absence of an object (step S44). The regular process of FIG. 23 is finished upon the execution of step S44.

After the execution of step S7, the amplitude variation width detection judgment unit 25 uses the judgment threshold value $A_{thre}(k)$ calculated by the amplitude variation width judgment threshold value generator 22 (step S45). The regular process of FIG. 23 is finished upon the execution of step S45.

On the other hand, a successive process that is executed by the object detection processor 10C according to the embodiment is similar to that of FIG. 10(B) and hence its flowchart is omitted. Only features that are not found in the process of FIG. 10(B) will be described with reference to FIG. 10(B).

In the successive process that is executed by the object detection processor 10C according to the embodiment, at step S15 shown in FIG. 10(B), the amplitude variation width detection judgment unit 25 compares a maximum amplitude difference (absolute value) $A_{max}(k)$ calculated according to Formula (15) with a judgment threshold value $A_{thre}(k)$ or the judgment threshold value Z that is received from the switching unit 52. When the maximum amplitude difference (absolute value) $A_{max}(k)$ is larger than the judgment threshold value $A_{thre}(k)$ or the judgment threshold value Z, the amplitude variation width detection judgment unit 25 judges that an object (target) has been detected (object presence or absence detection result). The amplitude variation width detection judgment unit 25 outputs the judgment result to the object detection output unit 26.

On the other hand, when the maximum amplitude difference (absolute value) $A_{max}(k)$ is smaller than or equal to the judgment threshold value $A_{thre}(k)$ or the judgment threshold value Z, the amplitude variation width detection judgment unit 25 judges that no object (target) has been detected (object presence or absence detection result). The amplitude variation width detection judgment unit 25 outputs the judgment result to the object detection output unit 26.

As is understood from the above description, the radar apparatus 1C according to this embodiment provides the following advantage in addition to the same advantages as the radar apparatus 1 according to the first embodiment does. Even where it is installed in a movable body (e.g., vehicle) as an example vehicular device, a proper judgment threshold value for judgment of presence or absence of an object can be obtained by switching the judgment threshold value of the regular process to a predetermined judgment threshold value Z or a judgment threshold value $A_{thre}(k)$ calculated by the amplitude variation width judgment threshold value generator 22.

As a result, in the radar apparatus 1C, the object (target) detection accuracy can be made higher than in the radar apparatus 1 according to the first embodiment even in a case that the radar apparatus 1C is installed in a movable body.

For example, in the radar apparatus 1C, in scenes in which a judgment threshold value cannot be acquired from an environment, object detection can be performed with a low probability of occurrence of an erroneous detection by switching the judgment threshold value. In scenes in which a judgment threshold value can be acquired from an environment, a judgment threshold value that is suitable for the environment can be acquired.

In a state that the vehicle is moving, it is difficult in the first embodiment to use regularly acquired data because of the movement and hence to acquire a judgment threshold value. In contrast, the radar apparatus 1C can be used in a situation that it is not fixed because a person is detected using the judgment threshold value existing in the database.

(Embodiment 5)

Figure 24:
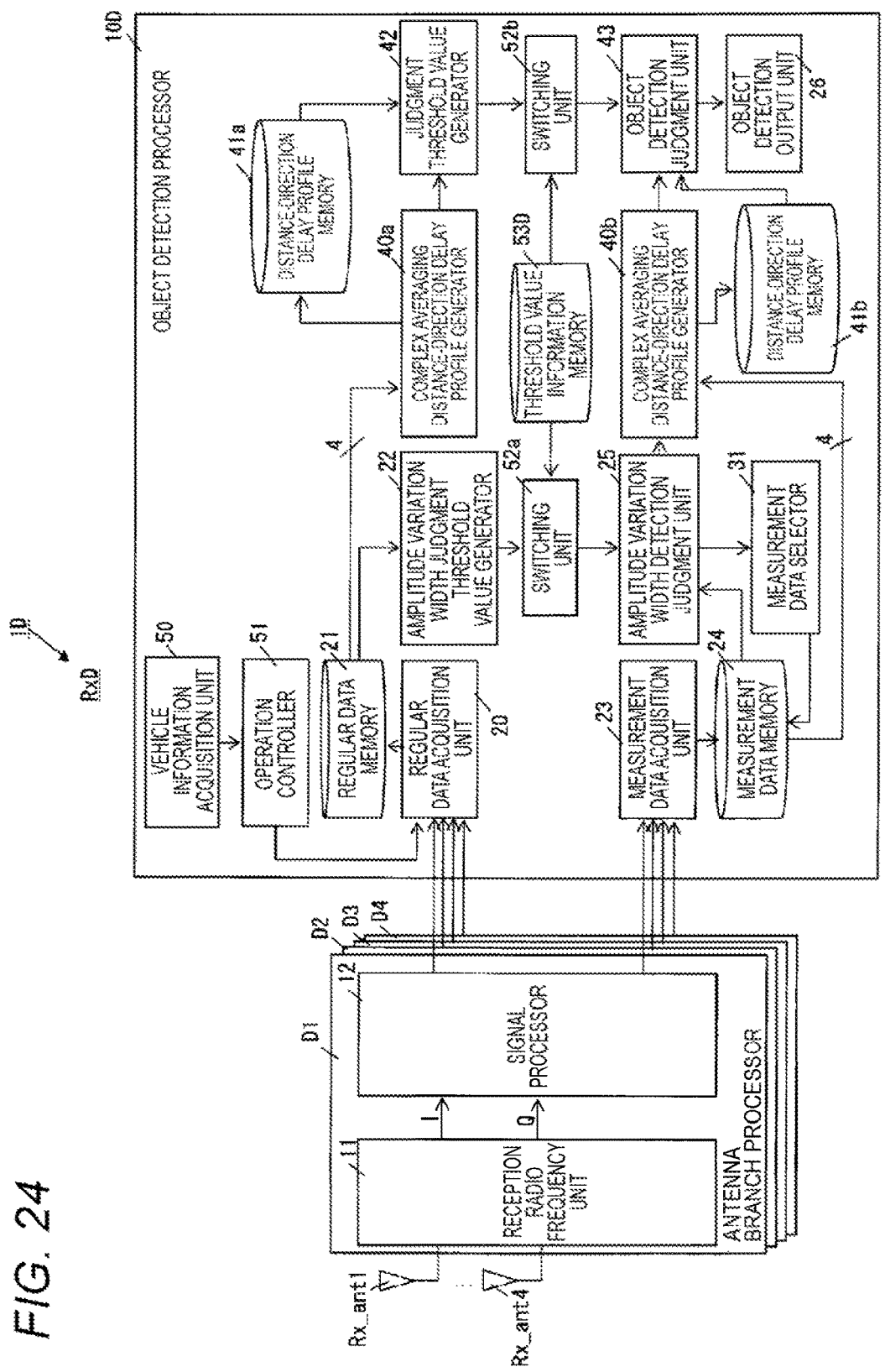
FIG. 24 is a block diagram showing, in detail, the internal configuration of a radar receiver of a radar apparatus according to a fifth embodiment.

Finally, the configuration and operation of a radar apparatus 1D according to a fifth embodiment will be described with reference to FIGS. 24 and 25. FIG. 24 is a block diagram showing, in detail, the internal configuration of a radar receiver RxD of the radar apparatus 1D according to the fifth embodiment.

The fifth embodiment is directed to an example case that the radar apparatus 1B according to the third embodiment is installed in a movable body (e.g., vehicle).

In the following description of the configurations and operations of the individual units of the radar apparatus 1D according to this embodiment, units having the same ones in the radar apparatus 1B according to the third embodiment will be given the same symbols as the latter and descriptions therefore will be omitted or simplified; only different features will be described.

In the fifth embodiment, a mechanism for performing object detection with a low probability of occurrence of an erroneous detection. More specifically, in the radar apparatus 1D according to this embodiment, the judgment threshold value that is used in the radar apparatus 1B according to the third embodiment for object presence judgment (detection) is switched according to the situation in which the radar apparatus 1D is placed. As a result, a judgment threshold value is acquired from a database in a situation that it cannot be acquired from an environment (e.g., the vehicle is moving), whereby an object can be detected with a low probability of occurrence of an erroneous detection.

Furthermore, in the radar apparatus 1D according to the embodiment, a judgment threshold value suitable for an environment can be acquired in a situation that a judgment threshold value can be acquired from the environment.

With the above feature, by detecting a person using a judgment threshold value existing in a database, the radar apparatus 1D according to the embodiment can also be used in a situation that is it is not fixed, that is, in a situation that unlike in the first embodiment it is difficult to use data that are acquired regularly because of a movement.

Equipped with plural antenna branch processors, the radar apparatus 1D according to the embodiment can detect a person in the angular direction.

The radar apparatus 1D is equipped with the reference signal generator Lo and the radar transmitter Tx shown in FIG. 1 and a radar receiver RxD shown in FIG. 24. As shown in FIG. 24, the radar receiver RxD is equipped with four antenna branch processors D1-D4 and an object detection processor 10D. The radar apparatus 1D is installed in a movable body (e.g., vehicle) as an example vehicular device.

Next, the configurations and operations of the individual units of the radar receiver RxD will be described in detail with reference to FIG. 24.

The operation of each of the antenna branch processors D1-D4 is the same as that of each of the antenna branch processors D1-D4 provided in the radar receiver Rx of the radar apparatus 1B according to the third embodiment, and a description therefor will be omitted.

The object detection processor 10D is equipped with a regular data acquisition unit 20, a regular data memory 21, an amplitude variation width judgment threshold value generator 22, a measurement data acquisition unit 23, a measurement data memory 24, a measurement data selector 31, an amplitude variation width detection judgment unit 25, an object detection output unit 26, complex averaging distance-direction delay profile generators 40a and 40b, distance-direction delay profile memories 41a and 41b, a judgment threshold value generator 42, an object detection judgment unit 43, a vehicle information acquisition unit 50, an operation controller 51, switching units 52a and 52, and a threshold value information memory 53.

The operations of the vehicle information acquisition unit 50 and the operation controller 51 are the same as those of the vehicle information acquisition unit 50 and the operation controller 51 of the object detection processor 10C of the radar receiver RxF of the radar apparatus 1C according to the fourth embodiment, and hence descriptions therefor will be omitted; only different features will be described.

The operation controller 51 outputs, to the switching unit 52a, according to information relating to the vehicle received from the vehicle information acquisition unit 50, a control signal for switching the judgment threshold value for judgment (detection) of presence or absence of an object to a judgment threshold value $A_{thre}(k)$ calculated by the amplitude variation width judgment threshold value generator 22 or a judgment threshold value Z that is stored in advance in the threshold value information memory 53D.

Furthermore, the operation controller 51 outputs, to the switching unit 52b, according to the information relating to the vehicle received from the vehicle information acquisition unit 50, a control signal for switching the second judgment threshold value for judgment (detection) of presence or absence of an object to a second judgment threshold value HM_bg(k, cc) calculated by the judgment threshold value generator 42 or a second judgment threshold value Z2 that is stored in advance in the threshold value information memory 53D.

The switching unit 52a, which is an example of a second switching unit, switches, according to a control signal received from the operation controller 51, the judgment threshold value for judgment (detection) of presence or absence of an object to a judgment threshold value $A_{thre}(k)$ calculated by the amplitude variation width judgment threshold value generator 22 or the judgment threshold value Z that is stored in advance in threshold value information memory 53, and outputs the resulting judgment threshold value to the amplitude variation width detection judgment unit 25. In FIG. 24, an arrow to lead from the operation controller 51 to the switching unit 52a is omitted.

The switching unit 52b, which is another example of the second switching unit, switches, according to a control signal received from the operation controller 51, the second judgment threshold value for judgment (detection) of presence or absence of an object to a second judgment threshold value HM_bg(k, cc) calculated by the judgment threshold value generator 42 or the second judgment threshold value Z2 that is stored in advance in threshold value information memory 53D, and outputs the resulting second judgment threshold value to the object detection judgment unit 43. In FIG. 24, an arrow to lead from the operation controller 51 to the switching unit 52b is omitted. The switching units 52a and 52b constitute the second switching unit.

The threshold value information memory 53D, which is an example of a second judgment threshold value storage unit, is stored with the judgment threshold value Z and the second judgment threshold value Z2 obtained by a simulation or an actual measurement in advance.

The amplitude variation width detection judgment unit 25 compares a maximum amplitude difference (absolute value) $A_{max}(k)$ calculated according to Formula (15) with the judgment threshold value $A_{thre}(k)$ or the judgment threshold value Z received from the switching unit 52a. When the maximum amplitude difference (absolute value) $A_{max}(k)$ is larger than the judgment threshold value $A_{thre}(k)$ or the judgment threshold value Z, the amplitude variation width detection judgment unit 25 judges that an object (target) has been detected (object presence or absence detection result). The amplitude variation width detection judgment unit 25 outputs the judgment result to the measurement data selector 31.

On the other hand, when the maximum amplitude difference (absolute value) $A_{max}(k)$ is smaller than or equal to the judgment threshold value $A_{thre}(k)$ or the judgment threshold value Z, the amplitude variation width detection judgment unit 25 judges that no object (target) has been detected (object presence or absence detection result). The amplitude variation width detection judgment unit 25 outputs the judgment result to the measurement data selector 31.

The object detection judgment unit 43 compares a distance-direction delay profile HM(Cv(ii), Cs, cc) calculated according to Formula (32) with the second judgment threshold value HM_bg(k, cc) or the second judgment threshold value Z2 received from the switching unit 52b. When the distance-direction delay profile HM(Cv(ii), Cs, cc) is larger than the second judgment threshold value HM_bg(k, cc) or the second judgment threshold value Z2, the object detection judgment unit 43 judges that an object (target) has been detected (object presence or absence detection result). The object detection judgment unit 43 outputs the judgment result to the object detection output unit 26.

On the other hand, when the distance-direction delay profile HM(Cv(ii), Cs, cc) is smaller than or equal to the second judgment threshold value HM_bg(k, cc) or the judgment threshold value Z2, the object detection judgment unit 43 judges that no object (target) has been detected (object presence or absence detection result). The object detection judgment unit 43 outputs the judgment result to the object detection output unit 26.

Next, a regular process that is executed by the radar apparatus 10D will be described with reference to FIG. 25. FIG. 25 is a flowchart of an operation procedure of the regular process which is executed by the radar apparatus 1D according to the fifth embodiment using the regular data memory 21 or the threshold value information memory 53D. In the description to be made with reference to FIG. 25, steps having the same ones in FIG. 19 will be given the same symbols as the latter and descriptions therefor will be simplified or omitted; only different features will be described.

Figure 25:
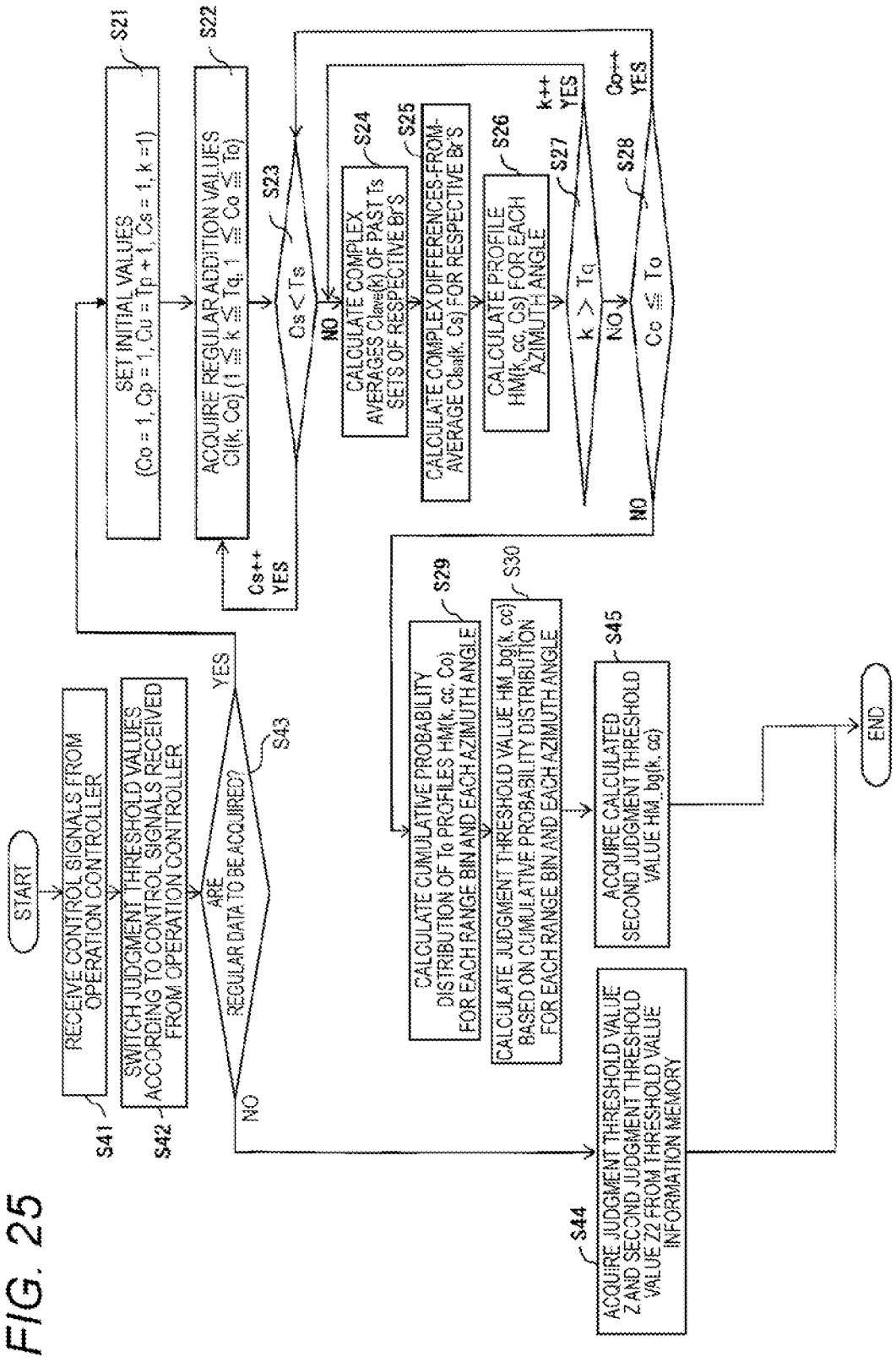
FIG. 25 is a flowchart of an operation procedure of a regular process that is executed by the radar apparatus according to the fifth embodiment using a regular data memory or a threshold value information memory.

The following assumptions are made for the description to be made with reference to FIG. 25. The vehicle information acquisition unit 50 acquires information relating to the vehicle in which the radar apparatus 1D is installed and outputs it to the operation controller 51. According to the information relating to the vehicle received from the vehicle information acquisition unit 50, the operation controller 51 outputs, to the switching unit 52a, a control signal for switching the judgment threshold value for judgment (detection) of presence or absence of an object to a judgment threshold value $A_{thre}(k)$ calculated by the amplitude variation width judgment threshold value generator 22 or a judgment threshold value Z that is stored in advance in the threshold value information memory 53D.

Furthermore, according to the information relating to the vehicle received from the vehicle information acquisition unit 50, the operation controller 51 outputs, to the switching unit 52b, a control signal for switching the second judgment threshold value for judgment (detection) of presence or absence of an object to a second judgment threshold value HM_bg(k, cc) calculated by the judgment threshold value generator 42 or a second judgment threshold value Z2 that is stored in advance in the threshold value information memory 53D.

Referring to FIG. 25, the switching unit 52a is configured to switch, according to the control signal received from the operation controller 51, the judgment threshold value for judgment (detection) of presence or absence of an object to a judgment threshold value $A_{thre}(k)$ calculated by the amplitude variation width judgment threshold value generator 22 or the judgment threshold value Z that is stored in advance in threshold value information memory 53, and outputs the resulting judgment threshold value to the amplitude variation width detection judgment unit 25 (steps S41 and S42).

Furthermore, the switching unit 52b is configured to switch, according to the control signal received from the operation controller 51, the second judgment threshold value for judgment (detection) of presence or absence of an object to a second judgment threshold value HM_bg(k, cc) calculated by the judgment threshold value generator 42 or the judgment threshold value Z2 that is stored in advance in threshold value information memory 53D, and to output the resulting second judgment threshold value to the object detection judgment unit 43 (steps S41 and S42).

When the operation controller 51 is to cause the regular data acquisition unit 20 to acquire sets of regular measurement values CI(k, Co) from the antenna branch processors D1 to D4 (S43: yes), steps S21 to S28 shown in FIG. 16 are executed after the execution of step S43.

On the other hand, when the operation controller 51 is not to cause the regular data acquisition unit 20 to acquire sets of regular measurement values CI(k, Co) from the antenna branch processors D1 to D4, that is, when the switching units 52a and 52b have output the judgment threshold value Z and the second judgment threshold value Z2 to the amplitude variation width detection judgment unit 25 and the object detection judgment unit 43, respectively (S43: no), the amplitude variation width detection judgment unit 25 uses the judgment threshold value Z received from the switching unit 52a as a judgment threshold value for judgment (detection) of presence or absence of an object (step S44). Furthermore, the object detection judgment unit 43 uses the judgment threshold value Z2 received from the switching unit 52b as a second judgment threshold value for judgment (detection) of presence or absence of an object (step S44). The regular process of FIG. 25 is finished upon the execution of step S44.

After the execution of step S28, the object detection judgment unit 43 uses a second judgment threshold value HM_bg(k, cc) calculated by the judgment threshold value generator 42 as a second judgment threshold value for judgment (detection) of presence or absence of an object (step S45). The regular process of FIG. 25 is finished upon the execution of step S45.

On the other hand, a successive process that is executed by the object detection processor 10D according to the embodiment is similar to that of FIG. 17 and hence its flowchart is omitted. Only features that are not found in the process of FIG. 20 will be described with reference to FIG. 20.

In the successive process that is executed by the object detection processor 10D according to the embodiment, at step S15 shown in FIG. 20, the amplitude variation width detection judgment unit 25 compares a maximum amplitude difference (absolute value) $A_{max}(k)$ calculated according to Formula (15) with a judgment threshold value $A_{thre}(k)$ or the judgment threshold value Z that is received from the switching unit 52a. When the maximum amplitude difference (absolute value) $A_{max}(k)$ is larger than the judgment threshold value $A_{thre}(k)$ or the judgment threshold value Z, the amplitude variation width detection judgment unit 25 judges that an object (target) has been detected (object presence or absence detection result). The amplitude variation width detection judgment unit 25 outputs the judgment result to the object detection output unit 26.

On the other hand, when the maximum amplitude difference (absolute value) $A_{max}(k)$ is smaller than or equal to the judgment threshold value $A_{thre}(k)$ or the judgment threshold value Z, the amplitude variation width detection judgment unit 25 judges that no object (target) has been detected (object presence or absence detection result). The amplitude variation width detection judgment unit 25 outputs the judgment result to the measurement data selector 31.

Furthermore, at step S37 shown in FIG. 20, the object detection judgment unit 43 compares a distance-direction delay profile HM(Cv(ii), Cs, cc) calculated according to Formula (32) with a second judgment threshold value HM_bk(k, cc) or the judgment threshold value Z2 that is received from the switching unit 52b. When the distance-direction delay profile HM(Cv(ii), Cs, cc) is larger than the second judgment threshold value HM_bk(k, cc) or the second judgment threshold value Z2, the object detection judgment unit 43 judges that an object (target) has been detected (object presence or absence detection result). The object detection judgment unit 43 outputs the judgment result to the object detection output unit 26.

On the other hand, when the distance-direction delay profile HM(Cv(ii), Cs, cc) is smaller than or equal to the second judgment threshold value HM_bk(k, cc) or the judgment threshold value Z2, the object detection judgment unit 43 judges that no object (target) has been detected (object presence or absence detection result). The amplitude variation width detection judgment unit 25 outputs the judgment result to the object detection output unit 26.

As is understood from the above description, the radar apparatus 1D according to this embodiment provides the following advantage in addition to the same advantages as the radar apparatus 1B according to the third embodiment does. Even where it is installed in a movable body (e.g., vehicle) as an example vehicular device, object detection can be performed with a low probability of occurrence of an erroneous detection by switching the judgment threshold values by acquiring judgment threshold values from the database in scenes in which judgment threshold values cannot be acquired from an environment by switching the judgment threshold values according to information relating the vehicle (e.g., vehicle movement state). In scenes in which judgment threshold values can be acquired from an environment, the radar apparatus 1D can acquire judgment threshold values that are suitable for the environment.

Producing distance-direction delay profiles, the radar apparatus 1D according to the fifth embodiment can output a result of detection of a person also in the distance direction.

In a state that the vehicle in which the radar apparatus is installed is moving, it is difficult in the third embodiment to use regularly acquired data because of the movement and hence to acquire judgment threshold values. In contrast, the radar apparatus 1D according to the embodiment can be used in a situation that it is not fixed because a person is detected using the judgment threshold values existing in the database.

In the regular process of the radar apparatus 1D, the judgment threshold value is switched to the predetermined judgment threshold value Z or a judgment threshold value $A_{thre}(k)$ calculated by the amplitude variation width judgment threshold value generator 22 and the second judgment threshold value is switched to the predetermined second judgment threshold value Z2 or a second judgment threshold value HM_bg(k, cc) calculated by the judgment threshold value generator 42. With this measure, a judgment threshold value and a second judgment threshold value that are suitable for judgment (detection) of presence or absence of an object can be obtained.

As a result, in the radar apparatus 1D, the object (target) detection accuracy can be made higher than in the radar apparatus 1B according to the third embodiment even in a case that the radar apparatus is installed in a movable body.

Although the various embodiments have been described above with reference to the drawings, it goes without saying that the present disclosure is not limited to those examples. It is apparent that those skilled in the art would conceive various changes or modifications within the confines of the claims. And such changes or modifications should naturally be construed as being included in the technical scope of the present disclosure.

The present application is based on Japanese Patent Application No. 2013-202228 filed on Sep. 27, 2013, the contents of which are incorporated herein by reference.

INDUSTRIAL APPLICABILITY

The present disclosure is useful when used as a radar apparatus in which a movement speed of a movable body can be detected with high detection accuracy irrespective of the movement state of the movable body.

REFERENCE SIGNS LIST 1, 1A, 1AF, 1B, 1C, 1D, 1F: Radar apparatus
2, 2C: Transmission signal generator
3, 3C: Transmission radio frequency unit
10, 10A, 10B, 10C, 10D: Object detection processor
11: Reception radio frequency unit
12: Signal processor
13: Amplifier
14: Frequency converter
15: Orthogonal wave detector
16, 17: A/D converter
18: Correlation calculator
19: Adder
20: Regular data acquisition unit
21: Regular data memory
22: Amplitude variation width judgment threshold value generator
23: Measurement data acquisition unit
24: Measurement data memory
25: Amplitude variation width detection judgment unit
26: Object detection output unit
30: Distance-direction delay profile generator
31: Measurement data selector
40a, 40b: Complex averaging distance-direction delay profile generator
41a, 41b: Distance-direction delay profile information memory
42: Judgment threshold value generator
43: Object detection judgment unit
400: Complex average calculator
401: Complex data memory
402: Complex difference-from-average calculator
50: Vehicle information acquisition unit
51: Operation controller
52, 52a, 52b: Switching unit
53: Threshold value information memory
D1, D1, D2, D2F, D3, D3F, D4, D4F: Antenna branch processor
Lo: Reference signal generator
Rx, RxA: Radar receiver
Tx: Radar transmitter

The invention claimed is:

1. A radar apparatus comprising:
   a radar transmitter which transmits, from a transmission antenna, a radar transmission signal having a radio-frequency, the radar transmission signal being repeatedly transmitted a plurality of times;
   an antenna branch processor which receives, by a reception antenna, a signal including a reflection signal produced by reflection, by an object, of the radar transmission signal, the signal including the reflection signal being repeatedly received a plurality of times, and samples the signal including the reflection signal for each predetermined discrete time; and
   an object detection processor which detects presence or absence of a target object based on the sampled signal including the reflection signal for each predetermined discrete time, wherein the object detection processor comprises:
      a regular data acquisition unit which regularly acquires To regular addition values, the To regular addition values being coherent addition values of sampling points regularly acquired by sampling each predetermined discrete time on the signal including the reflection signal, where To is an integer;
      a first judgment threshold value generator which calculates (To−Tp) sets of maximum amplitude differences, each of the maximum amplitude differences being a maximum of Tp set of differences between one of the To regular addition values and Tp of the To regular addition values immediately before the one of the To regular addition values, where Tp is an integer smaller than To, and generates a first judgment threshold value for detection of presence or absence of the target object using the (To−Tp) sets of maximum amplitude differences;

a measurement data acquisition unit which successively acquires (Tp+1) measurement addition values, the measurement addition values being coherent addition values of sampling points by sampling each predetermined discrete time on the signal including the reflection signal; and an amplitude difference judging unit which calculates another maximum amplitude difference, the other maximum amplitude difference being a maximum of Tp set of differences between last one of the (Tp+1) measurement addition values and Tp of the (Tp+1) measurement addition values immediately before the last one of the (Tp+1) measurement addition values, and detects the presence or absence of the target object based on a difference between the first judgment threshold value and the other maximum amplitude difference.

2. The radar apparatus according to claim 1, wherein:
the radar apparatus comprises a plurality of antenna branch processors each serving as the antenna branch processor; and
the object detection processor further comprises:
 a measurement data selector which selects a discrete time that is a range bin of signals, at which the target object is judged to be detected, including a plurality of reflection signals; and
 a distance-direction profile generator which calculates a distance-direction profile based on the signals, corresponding to the range bin, including the plurality of reflection signals and direction vectors including amplitude and phase difference information corresponding to an azimuth angle of an incoming direction of the reflection signals, and estimates a distance from the radar apparatus to the target object and an azimuth angle of the target object based on a peak value of the calculated distance-direction profiles.

3. The radar apparatus according to claim 1, wherein:
the radar apparatus comprises a plurality of antenna branch processors each serving as the antenna branch processor; and
the object detection processor further comprises:
 a first distance-direction profile generator which calculates first distance-direction profiles based on a complex signal mean value including a plurality of reflection signals and a direction vector including amplitude and phase difference information corresponding to an azimuth angle of an incoming direction of the reflection signals;
 a second judgment threshold value generator which generates a second judgment threshold value for detection of presence or absence of the object based on a cumulative probability distribution of the first distance-direction profiles;
 a measurement data selector which selects a discrete time that is a range bin of signals, at which the target object is judged to be detected, including a plurality of reflection signals;
 a second distance-direction profile generator which calculates a second distance-direction profile based on a complex average of the signals, corresponding to the range bin, including the plurality of reflection signals and the direction vector; and
 an object detection judging unit which estimates a distance from the radar apparatus to the target object and an azimuth angle of the target object based on a difference between the second distance-direction profile and the second judgment threshold value.

4. The radar apparatus according to claim 1, wherein:
the radar apparatus is installed in a movable body; and
the object detection processor further comprises:
 a movement state acquisition unit which acquires a movement state of the movable body;
 a first judgment threshold value storage which stores a predetermined judgment threshold value for detection of presence or absence of the object; and
 a first switch which switches between the predetermined judgment threshold value and the first judgment threshold value according to the movement state of the movable body, and outputs the resulting judgment threshold value to the amplitude difference judging unit.

5. The radar apparatus according to claim 3, wherein:
the radar apparatus is installed in a movable body; and
the object detection processor further comprises:
 a movement state acquisition unit which acquires a movement state of the movable body;
 a second judgment threshold value storage which stores predetermined third and fourth judgment threshold values, being different from each other, for detection of presence or absence of the target object; and
 a second switch which switches between the third predetermined judgment threshold value and the first judgment threshold value according to the movement state of the movable body and outputs the resulting judgment threshold value to the amplitude difference judging unit, and switches between the fourth predetermined judgment threshold value and the second judgment threshold value according to the movement state of the movable body and outputs the resulting judgment threshold value to the object detection judging unit.

6. An object detection method in a radar apparatus, the object detection method comprising the steps of:
transmitting, from a transmission antenna, a radar transmission signal having a radio-frequency, the radar transmission signal being repeatedly transmitted a plurality of times;
receiving, by a reception antenna, a signal including a reflection signal produced by reflection, by an object, of the radar transmission signal, the signal including the reflection signal being repeatedly received a plurality of times;
sampling the signal including the reflection signal for each predetermined discrete time; and
detecting presence or absence of a target object based on the sampled signal including the reflection signal for each predetermined discrete time,
wherein the detecting comprises:
 regularly acquiring To regular addition values, the To regular addition values being coherent addition values of sampling points by sampling each predetermined discrete time on the signal including the reflection signal, where To is an integer;
 calculating (To−Tp) sets of maximum amplitude differences, each of the maximum amplitude differences being a maximum of Tp set of differences between one of the To regular addition values and Tp of the To regular addition values immediately before the one of the To regular addition values, where Tp is an integer smaller than To;

generating a first judgment threshold value for detection of presence or absence of the target object using the (To−Tp) sets of maximum amplitude differences;

successively acquiring (Tp+1) measurement addition values, the measurement addition values being coherent addition values of sampling points by sampling each predetermined discrete time on the signal including the reflection signal;

calculating another maximum amplitude difference, the other maximum amplitude difference being a maximum of Tp set of differences between last one of the (Tp+1) measurement addition values and Tp of the (Tp+1) measurement addition values immediately before the last one of the (Tp+1) measurement addition values; and detecting the presence or absence of the target object based on a difference between the first judgment threshold value and the other maximum amplitude difference.

\* \* \* \* \*